(12) United States Patent
Bonalle et al.

(10) Patent No.: US 8,818,907 B2
(45) Date of Patent: Aug. 26, 2014

(54) LIMITING ACCESS TO ACCOUNT INFORMATION DURING A RADIO FREQUENCY TRANSACTION

(75) Inventors: David S Bonalle, New Rochelle, NY (US); Susan E Isenberg, London (GB); Peter D Saunders, Salt Lake City, UT (US)

(73) Assignee: Xatra Fund MX, LLC, Wilmington, DE (US)

( * ) Notice: Subject to any disclaimer, the term of this patent is extended or adjusted under 35 U.S.C. 154(b) by 1850 days.

(21) Appl. No.: 10/905,078

(22) Filed: Dec. 14, 2004

(65) Prior Publication Data
US 2005/0077349 A1 Apr. 14, 2005

Related U.S. Application Data

(63) Continuation of application No. 09/800,461, filed on Mar. 7, 2001, now Pat. No. 7,627,531, and a continuation-in-part of application No. 10/192,488, filed on Jul. 9, 2002, now Pat. No. 7,239,226.

(60) Provisional application No. 60/187,620, filed on Mar. 7, 2000, provisional application No. 60/200,625, filed on Apr. 28, 2000, provisional application No. 60/213,323, filed on Jun. 22, 2000, provisional application No. 60/304,216, filed on Jul. 10, 2001.

(51) Int. Cl.
*G06Q 20/00* (2012.01)
*G06Q 20/38* (2012.01)

(52) U.S. Cl.
CPC .................................... *G06Q 20/383* (2013.01)
USPC .......................................................... 705/65

(58) Field of Classification Search
USPC .......................................................... 705/65
See application file for complete search history.

(56) References Cited

U.S. PATENT DOCUMENTS

| | | | |
|---|---|---|---|
| 3,376,661 A | 4/1968 | Hulett |
| 3,914,762 A | 10/1975 | Klensch |
| 4,066,873 A | 1/1978 | Schatz |
| 4,206,965 A | 6/1980 | McGrew |
| 4,303,904 A | 12/1981 | Chasek |
| 4,318,554 A | 3/1982 | Anderson et al. |
| 4,421,380 A | 12/1983 | McGrew |
| 4,443,027 A | 4/1984 | McNeely et al. |
| 4,450,535 A | 5/1984 | de Pommery et al. |

(Continued)

FOREIGN PATENT DOCUMENTS

| | | |
|---|---|---|
| CH | 689070 | 8/1998 |
| CH | 689680 | 8/1999 |

(Continued)

OTHER PUBLICATIONS

Smart Card Hand book, 2nd edition, by W.Rankl & W. Effing.*

(Continued)

*Primary Examiner* — Calvin L Hewitt, II
*Assistant Examiner* — Zeshan Qayyum
(74) *Attorney, Agent, or Firm* — Brundidge & Stanger, P.C.

(57) ABSTRACT

The present invention provides a system and method for facilitating a RF transaction using a secondary transaction number that is associated with a user's primary transponder account. The user provides the secondary transaction number, often with limited-use conditions associated therewith, to a merchant to facilitate a more secure and confident transaction.

15 Claims, 23 Drawing Sheets

(56) References Cited

U.S. PATENT DOCUMENTS

| | | |
|---|---|---|
| 4,475,308 A | 10/1984 | Heise et al. |
| 4,558,211 A | 12/1985 | Berstein |
| 4,583,766 A | 4/1986 | Wessel |
| 4,589,686 A | 5/1986 | McGrew |
| 4,593,936 A | 6/1986 | Opel |
| 4,639,765 A | 1/1987 | dHont |
| 4,656,463 A | 4/1987 | Anders et al. |
| 4,663,518 A | 5/1987 | Borror et al. |
| 4,672,021 A | 6/1987 | Blumel et al. |
| 4,700,055 A | 10/1987 | Kashkashian, Jr. |
| 4,717,221 A | 1/1988 | McGrew |
| 4,736,094 A | 4/1988 | Yoshida |
| 4,739,328 A | 4/1988 | Koelle et al. |
| 4,744,497 A | 5/1988 | O'Neal |
| 4,795,894 A | 1/1989 | Sugimoto et al. |
| 4,829,690 A | 5/1989 | Andros |
| 4,837,422 A | 6/1989 | Dethloff et al. |
| 4,839,504 A | 6/1989 | Nakano |
| 4,849,617 A | 7/1989 | Ueda |
| 4,868,849 A | 9/1989 | Tamaoki |
| 4,884,507 A | 12/1989 | Levy |
| 4,918,432 A | 4/1990 | Pauley et al. |
| 4,961,142 A | 10/1990 | Elliott et al. |
| 4,984,270 A | 1/1991 | LaBounty |
| 4,998,753 A | 3/1991 | Wichael |
| 5,016,274 A | 5/1991 | Micali et al. |
| 5,023,782 A | 6/1991 | Lutz et al. |
| 5,023,908 A | 6/1991 | Weiss |
| 5,053,774 A | 10/1991 | Schuermann et al. |
| 5,099,226 A | 3/1992 | Andrews |
| 5,101,200 A | 3/1992 | Swett |
| 5,125,356 A | 6/1992 | Galante |
| 5,197,140 A | 3/1993 | Balmer |
| 5,198,647 A | 3/1993 | Mizuta |
| 5,206,488 A | 4/1993 | Teicher |
| 5,208,110 A | 5/1993 | Smith et al. |
| 5,212,777 A | 5/1993 | Gove et al. |
| 5,221,838 A | 6/1993 | Gutman et al. |
| 5,222,282 A | 6/1993 | Sukonnik et al. |
| 5,226,989 A | 7/1993 | Sukonnik |
| 5,234,624 A | 8/1993 | Bauer et al. |
| 5,239,654 A | 8/1993 | IngSimmons et al. |
| 5,247,304 A | 9/1993 | dHont |
| 5,257,656 A | 11/1993 | McLeroy |
| 5,259,649 A | 11/1993 | Shomron |
| 5,274,392 A | 12/1993 | dHont et al. |
| 5,276,311 A | 1/1994 | Hennige |
| 5,285,100 A | 2/1994 | Byatt |
| 5,304,789 A | 4/1994 | Lob et al. |
| 5,305,002 A | 4/1994 | Holodak et al. |
| 5,308,121 A | 5/1994 | Gunn |
| 5,326,964 A | 7/1994 | Risser |
| 5,329,617 A | 7/1994 | Asal |
| 5,331,138 A | 7/1994 | Saroya |
| 5,339,447 A | 8/1994 | Balmer |
| 5,349,357 A | 9/1994 | Schurmann et al. |
| 5,350,906 A | 9/1994 | Brody et al. |
| 5,351,052 A | 9/1994 | dHont et al. |
| 5,359,522 A | 10/1994 | Ryan |
| 5,365,551 A | 11/1994 | Snodgrass et al. |
| 5,371,896 A | 12/1994 | Gove et al. |
| 5,373,303 A | 12/1994 | dHont |
| 5,386,458 A * | 1/1995 | Nair et al. ............ 379/91.01 |
| 5,397,881 A | 3/1995 | Mannik |
| 5,407,893 A | 4/1995 | Koshizuka et al. |
| 5,408,243 A | 4/1995 | dHont |
| 5,410,649 A | 4/1995 | Gove |
| 5,412,192 A | 5/1995 | Hoss |
| 5,428,363 A | 6/1995 | dHont |
| 5,453,747 A | 9/1995 | dHont et al. |
| 5,461,217 A | 10/1995 | Claus |
| 5,471,592 A | 11/1995 | Gove et al. |
| 5,477,040 A | 12/1995 | Lalonde |
| 5,485,510 A | 1/1996 | Colbert |
| 5,488,376 A | 1/1996 | Hurta et al. |
| 5,489,411 A | 2/1996 | Jha et al. |
| 5,489,908 A | 2/1996 | Orthmann et al. |
| 5,490,079 A | 2/1996 | Sharpe et al. |
| 5,491,483 A | 2/1996 | dHont |
| 5,491,484 A | 2/1996 | Schuermann |
| 5,491,715 A | 2/1996 | Flaxl |
| 5,493,312 A | 2/1996 | Knebelkamp |
| 5,497,121 A | 3/1996 | dHont |
| 5,500,513 A | 3/1996 | Langhans et al. |
| 5,500,651 A | 3/1996 | Schuermann |
| 5,503,434 A | 4/1996 | Gunn |
| 5,504,808 A | 4/1996 | Hamrick, Jr. |
| 5,513,525 A | 5/1996 | Schurmann |
| 5,519,381 A | 5/1996 | Marsh et al. |
| 5,522,083 A | 5/1996 | Gove et al. |
| 5,525,992 A | 6/1996 | Froschermeier |
| 5,525,994 A | 6/1996 | Hurta et al. |
| 5,528,222 A | 6/1996 | Moskowitz et al. |
| 5,530,232 A | 6/1996 | Taylor |
| 5,533,656 A | 7/1996 | Bonaldi |
| 5,534,857 A | 7/1996 | Laing et al. |
| 5,541,604 A | 7/1996 | Meier |
| 5,543,798 A | 8/1996 | Schuermann |
| 5,544,246 A | 8/1996 | Mandelbaum et al. |
| 5,548,291 A | 8/1996 | Meier et al. |
| 5,550,536 A | 8/1996 | Flaxl |
| 5,550,548 A | 8/1996 | Schuermann |
| 5,552,789 A | 9/1996 | Schuermann |
| 5,555,877 A | 9/1996 | Lockwood et al. |
| 5,557,279 A | 9/1996 | dHont |
| 5,557,516 A | 9/1996 | Hogan |
| 5,561,430 A | 10/1996 | Knebelkamp |
| 5,563,582 A | 10/1996 | dHont |
| 5,569,187 A | 10/1996 | Kaiser |
| 5,569,897 A | 10/1996 | Masuda |
| 5,572,226 A | 11/1996 | Tuttle |
| 5,577,109 A | 11/1996 | Stimson et al. |
| 5,577,120 A | 11/1996 | Penzias |
| 5,578,808 A | 11/1996 | Taylor |
| 5,581,630 A | 12/1996 | Bonneau, Jr. |
| 5,585,787 A | 12/1996 | Wallerstein |
| 5,590,038 A | 12/1996 | Pitroda |
| 5,592,150 A | 1/1997 | dHont |
| 5,592,405 A | 1/1997 | Gove et al. |
| 5,592,767 A | 1/1997 | Treske |
| 5,594,227 A | 1/1997 | Deo |
| 5,594,233 A | 1/1997 | Kenneth et al. |
| 5,594,448 A | 1/1997 | dHont |
| 5,597,534 A | 1/1997 | Kaiser |
| 5,600,175 A | 2/1997 | Orthmann |
| 5,602,538 A | 2/1997 | Orthmann et al. |
| 5,602,919 A | 2/1997 | Hurta et al. |
| 5,604,342 A | 2/1997 | Fujioka |
| 5,606,520 A | 2/1997 | Gove et al. |
| 5,606,594 A | 2/1997 | Register et al. |
| 5,607,522 A | 3/1997 | McDonnell |
| 5,608,406 A | 3/1997 | Eberth et al. |
| 5,608,778 A | 3/1997 | Partridge, III |
| 5,613,146 A | 3/1997 | Gove et al. |
| 5,614,703 A | 3/1997 | Martin et al. |
| 5,619,207 A | 4/1997 | dHont |
| 5,621,396 A | 4/1997 | Flaxl |
| 5,621,411 A | 4/1997 | Hagl et al. |
| 5,621,412 A | 4/1997 | Sharpe et al. |
| 5,625,366 A | 4/1997 | dHont |
| 5,625,370 A | 4/1997 | dHont |
| 5,625,695 A | 4/1997 | MRaihi et al. |
| 5,629,981 A | 5/1997 | Nerlikar |
| 5,638,080 A | 6/1997 | Orthmann et al. |
| 5,640,002 A | 6/1997 | Ruppert et al. |
| 5,641,050 A | 6/1997 | Smith et al. |
| 5,646,607 A | 7/1997 | Schurmann et al. |
| 5,649,118 A | 7/1997 | Carlisle et al. |
| 5,657,388 A | 8/1997 | Weiss |
| 5,660,319 A | 8/1997 | Falcone et al. |
| 5,673,106 A | 9/1997 | Thompson |
| 5,675,342 A | 10/1997 | Sharpe |
| 5,686,920 A | 11/1997 | Hurta et al. |
| 5,691,731 A | 11/1997 | vanErven |

(56) References Cited

U.S. PATENT DOCUMENTS

| | | | |
|---|---|---|---|
| 5,692,132 | A | 11/1997 | Hogan |
| 5,694,596 | A | 12/1997 | Campbell |
| 5,696,913 | A | 12/1997 | Gove et al. |
| 5,698,837 | A | 12/1997 | Furuta |
| 5,699,528 | A | 12/1997 | Hogan |
| 5,700,037 | A | 12/1997 | Keller |
| 5,701,127 | A | 12/1997 | Sharpe |
| 5,704,046 | A | 12/1997 | Hogan |
| 5,705,798 | A | 1/1998 | Tarbox |
| 5,705,852 | A | 1/1998 | Orihara et al. |
| 5,710,421 | A | 1/1998 | Kokubu |
| 5,715,314 | A * | 2/1998 | Payne et al. .................. 705/78 |
| 5,715,399 | A | 2/1998 | Bezos |
| 5,721,781 | A | 2/1998 | Deo et al. |
| 5,724,424 | A | 3/1998 | Gifford |
| 5,725,098 | A | 3/1998 | Seifert et al. |
| 5,729,053 | A | 3/1998 | Orthmann |
| 5,729,236 | A | 3/1998 | Flaxl |
| 5,731,957 | A | 3/1998 | Brennan |
| 5,732,579 | A | 3/1998 | dHont et al. |
| 5,742,756 | A | 4/1998 | Dillaway et al. |
| 5,742,845 | A | 4/1998 | Wagner |
| 5,748,137 | A | 5/1998 | dHont |
| 5,748,737 | A | 5/1998 | Daggar |
| 5,758,195 | A | 5/1998 | Balmer |
| 5,761,306 | A | 6/1998 | Lewis |
| 5,761,493 | A | 6/1998 | Blakeley et al. |
| 5,764,789 | A * | 6/1998 | Pare et al. .................. 382/115 |
| 5,768,385 | A | 6/1998 | Simon |
| 5,768,609 | A | 6/1998 | Gove et al. |
| 5,769,457 | A | 6/1998 | Warther |
| 5,770,843 | A | 6/1998 | Rose et al. |
| 5,773,812 | A | 6/1998 | Kreft |
| 5,774,882 | A | 6/1998 | Keen et al. |
| 5,777,903 | A | 7/1998 | Piosenka |
| 5,778,067 | A | 7/1998 | Jones et al. |
| 5,778,069 | A | 7/1998 | Thomlinson et al. |
| 5,785,680 | A | 7/1998 | Niezink et al. |
| 5,789,733 | A | 8/1998 | Jachimowicz et al. |
| 5,792,337 | A | 8/1998 | Padovani et al. |
| 5,793,324 | A | 8/1998 | Aslanidis et al. |
| 5,794,095 | A | 8/1998 | Thompson |
| 5,797,060 | A | 8/1998 | Thompson |
| 5,797,085 | A | 8/1998 | Buek et al. |
| 5,797,133 | A | 8/1998 | Jones et al. |
| 5,798,709 | A | 8/1998 | Flaxl |
| 5,809,142 | A | 9/1998 | Hurta et al. |
| 5,809,288 | A | 9/1998 | Balmer |
| 5,809,633 | A | 9/1998 | Mundigl et al. |
| 5,825,007 | A | 10/1998 | Jesadanont |
| 5,825,302 | A | 10/1998 | Stafford |
| 5,826,077 | A | 10/1998 | Blakeley et al. |
| 5,826,242 | A | 10/1998 | Montulli |
| 5,826,243 | A | 10/1998 | Musmanno et al. |
| 5,828,044 | A | 10/1998 | Jun et al. |
| 5,834,756 | A | 11/1998 | Gutman et al. |
| 5,838,257 | A | 11/1998 | Lambropoulos |
| 5,838,720 | A | 11/1998 | Morelli |
| 5,841,364 | A | 11/1998 | Hagl et al. |
| 5,842,088 | A | 11/1998 | Thompson |
| 5,844,218 | A | 12/1998 | Kawan et al. |
| 5,844,230 | A | 12/1998 | Lalonde |
| 5,845,267 | A | 12/1998 | Ronen |
| 5,851,149 | A | 12/1998 | Xidos et al. |
| 5,852,812 | A | 12/1998 | Reeder |
| 5,854,891 | A | 12/1998 | Postlewaite et al. |
| 5,857,152 | A | 1/1999 | Everett |
| 5,858,006 | A | 1/1999 | Van der AA et al. |
| 5,859,419 | A | 1/1999 | Wynn |
| 5,859,587 | A | 1/1999 | Alicot et al. |
| 5,859,779 | A | 1/1999 | Giordano et al. |
| 5,862,325 | A | 1/1999 | Reed et al. |
| 5,864,306 | A | 1/1999 | Dwyer et al. |
| 5,864,323 | A | 1/1999 | Berthon |
| 5,864,830 | A | 1/1999 | Armetta et al. |
| 5,867,100 | A | 2/1999 | dHont |
| 5,870,031 | A | 2/1999 | Kaiser et al. |
| 5,870,915 | A | 2/1999 | dHont |
| 5,878,138 | A | 3/1999 | Yacobi |
| 5,878,141 | A | 3/1999 | Daly et al. |
| 5,878,215 | A | 3/1999 | Kling et al. |
| 5,878,337 | A | 3/1999 | Joao et al. |
| 5,878,403 | A | 3/1999 | DeFrancesco et al. |
| 5,880,675 | A | 3/1999 | Trautner |
| 5,881,272 | A | 3/1999 | Balmer |
| 5,883,377 | A | 3/1999 | Chapin, Jr. |
| 5,883,810 | A * | 3/1999 | Franklin et al. .................. 700/232 |
| 5,884,280 | A | 3/1999 | Yoshioka et al. |
| 5,887,266 | A | 3/1999 | Heinonen et al. |
| 5,890,137 | A | 3/1999 | Koreeda |
| 5,897,622 | A | 4/1999 | Blinn et al. |
| 5,898,783 | A | 4/1999 | Rohrbach |
| 5,898,838 | A | 4/1999 | Wagner |
| 5,903,830 | A | 5/1999 | Joao et al. |
| 5,903,875 | A | 5/1999 | Kohara |
| 5,903,880 | A | 5/1999 | Biffar |
| 5,905,798 | A | 5/1999 | Nerlikar et al. |
| 5,905,908 | A | 5/1999 | Wagner |
| 5,909,492 | A | 6/1999 | Payne et al. |
| 5,912,678 | A | 6/1999 | Saxena et al. |
| 5,913,203 | A | 6/1999 | Wong et al. |
| 5,914,472 | A | 6/1999 | Foladare et al. |
| 5,915,023 | A | 6/1999 | Bernstein |
| 5,917,168 | A | 6/1999 | Nakamura et al. |
| 5,918,216 | A | 6/1999 | Miksovsky et al. |
| 5,920,628 | A | 7/1999 | Indeck et al. |
| 5,923,734 | A | 7/1999 | Taskett |
| 5,923,884 | A | 7/1999 | Peyret et al. |
| 5,924,080 | A | 7/1999 | Johnson |
| 5,929,801 | A | 7/1999 | Aslanidis et al. |
| 5,930,767 | A | 7/1999 | Reber et al. |
| 5,930,777 | A | 7/1999 | Barber |
| 5,931,917 | A | 8/1999 | Nguyen et al. |
| 5,933,624 | A | 8/1999 | Balmer |
| 5,943,624 | A | 8/1999 | Fox et al. |
| 5,945,653 | A | 8/1999 | Walker et al. |
| 5,948,116 | A | 9/1999 | Aslanidis et al. |
| 5,949,044 | A | 9/1999 | Walker et al. |
| 5,949,876 | A | 9/1999 | Ginter et al. |
| 5,950,174 | A | 9/1999 | Brendzel |
| 5,950,179 | A | 9/1999 | Buchanan |
| 5,953,512 | A | 9/1999 | Cai et al. |
| 5,953,710 | A | 9/1999 | Fleming |
| 5,955,717 | A | 9/1999 | Vanstone |
| 5,955,951 | A | 9/1999 | Wischerop et al. |
| 5,955,969 | A | 9/1999 | dHont |
| 5,956,024 | A | 9/1999 | Strickland et al. |
| 5,956,693 | A | 9/1999 | Geerlings |
| 5,956,699 | A | 9/1999 | Wong et al. |
| 5,958,004 | A | 9/1999 | Helland et al. |
| 5,960,411 | A | 9/1999 | Hartman et al. |
| 5,960,416 | A | 9/1999 | Block |
| 5,963,915 | A | 10/1999 | Kirsch |
| 5,963,924 | A | 10/1999 | Williams et al. |
| 5,966,697 | A | 10/1999 | Fergerson et al. |
| 5,969,318 | A | 10/1999 | Mackenthun |
| 5,970,148 | A | 10/1999 | Meier |
| 5,970,470 | A | 10/1999 | Walker |
| 5,970,471 | A | 10/1999 | Hill |
| 5,970,472 | A | 10/1999 | Allsop et al. |
| 5,970,473 | A | 10/1999 | Gerszberg et al. |
| 5,970,475 | A | 10/1999 | Barnes et al. |
| 5,974,238 | A | 10/1999 | Chase, Jr. |
| RE36,365 | E | 11/1999 | Levine et al. |
| 5,978,840 | A | 11/1999 | Nguyen et al. |
| 5,979,757 | A | 11/1999 | Tracy et al. |
| 5,982,293 | A | 11/1999 | Everett et al. |
| 5,983,200 | A | 11/1999 | Slotznick |
| 5,983,207 | A | 11/1999 | Turk et al. |
| 5,983,208 | A | 11/1999 | Haller |
| 5,987,140 | A | 11/1999 | Rowney et al. |
| 5,987,155 | A | 11/1999 | Dunn et al. |
| 5,987,498 | A | 11/1999 | Athing et al. |
| 5,988,510 | A | 11/1999 | Tuttle |

(56) References Cited

U.S. PATENT DOCUMENTS

| | | |
|---|---|---|
| 5,989,950 A | 11/1999 | Wu |
| 5,991,413 A | 11/1999 | Arditti et al. |
| 5,991,608 A | 11/1999 | Leyten |
| 5,991,748 A | 11/1999 | Taskett |
| 5,991,750 A | 11/1999 | Watson |
| 5,996,076 A | 11/1999 | Rowney et al. |
| 5,999,914 A | 12/1999 | Blinn et al. |
| 6,000,832 A | 12/1999 | Franklin et al. |
| 6,002,438 A | 12/1999 | Hocevar et al. |
| 6,002,767 A | 12/1999 | Kramer |
| 6,003,014 A | 12/1999 | Lee et al. |
| 6,005,942 A | 12/1999 | Chan et al. |
| 6,006,216 A | 12/1999 | Griffin et al. |
| 6,009,412 A | 12/1999 | Storey |
| 6,011,487 A | 1/2000 | Plocher |
| 6,012,049 A | 1/2000 | Kawan |
| 6,012,143 A | 1/2000 | Tanaka |
| 6,012,636 A | 1/2000 | Smith |
| 6,014,634 A | 1/2000 | Scroggie et al. |
| 6,014,635 A | 1/2000 | Harris et al. |
| 6,014,636 A | 1/2000 | Reeder |
| 6,014,645 A | 1/2000 | Cunningham |
| 6,014,646 A | 1/2000 | Vallee et al. |
| 6,014,648 A | 1/2000 | Brennan |
| 6,014,650 A | 1/2000 | Zampese |
| 6,014,748 A | 1/2000 | Tushie et al. |
| 6,016,476 A | 1/2000 | Maes et al. |
| 6,016,482 A | 1/2000 | Molinari et al. |
| 6,016,484 A | 1/2000 | Williams et al. |
| 6,018,717 A | 1/2000 | Lee et al. |
| 6,021,943 A | 2/2000 | Chastain |
| 6,023,510 A | 2/2000 | Epstein |
| 6,024,286 A | 2/2000 | Bradley et al. |
| 6,029,147 A | 2/2000 | Horadan et al. |
| 6,029,149 A | 2/2000 | Dykstra et al. |
| 6,029,150 A | 2/2000 | Kravitz |
| 6,029,175 A | 2/2000 | Chow |
| 6,029,890 A | 2/2000 | Austin |
| 6,029,892 A | 2/2000 | Miyake |
| 6,032,136 A | 2/2000 | Brake, Jr. et al. |
| 6,036,100 A | 3/2000 | Asami |
| 6,038,292 A | 3/2000 | Thomas |
| 6,038,551 A | 3/2000 | Barlow et al. |
| 6,038,584 A | 3/2000 | Balmer |
| 6,041,308 A | 3/2000 | Walker et al. |
| 6,044,360 A | 3/2000 | Picciallo |
| 6,047,888 A | 4/2000 | Dethloff |
| 6,050,494 A | 4/2000 | Song et al. |
| 6,052,675 A | 4/2000 | Checchio |
| 6,058,418 A | 5/2000 | Kobata |
| 6,061,344 A | 5/2000 | Wood, Jr. |
| 6,061,789 A | 5/2000 | Hauser et al. |
| 6,064,320 A | 5/2000 | dHont et al. |
| 6,064,981 A | 5/2000 | Barni et al. |
| 6,065,675 A | 5/2000 | Teicher |
| 6,068,184 A | 5/2000 | Barnett |
| 6,068,193 A | 5/2000 | Kreft |
| 6,070,003 A | 5/2000 | Gove et al. |
| 6,070,150 A | 5/2000 | Remington et al. |
| 6,070,154 A | 5/2000 | Tavor et al. |
| 6,072,870 A | 6/2000 | Nguyen et al. |
| 6,073,112 A | 6/2000 | Geerlings |
| 6,073,236 A | 6/2000 | Kusakabe et al. |
| 6,073,840 A | 6/2000 | Marion |
| 6,076,078 A | 6/2000 | Camp et al. |
| 6,076,296 A | 6/2000 | Schaeffer |
| 6,078,888 A | 6/2000 | Johnson, Jr. |
| 6,078,906 A | 6/2000 | Huberman |
| 6,078,908 A | 6/2000 | Schmitz |
| 6,081,790 A | 6/2000 | Rosen |
| RE36,788 E | 7/2000 | Mansvelt et al. |
| 6,085,976 A | 7/2000 | Sehr |
| 6,088,683 A | 7/2000 | Jalili |
| 6,088,686 A | 7/2000 | Walker et al. |
| 6,088,717 A | 7/2000 | Reed et al. |
| 6,088,755 A | 7/2000 | Kobayashi et al. |
| 6,088,797 A | 7/2000 | Rosen |
| 6,089,611 A | 7/2000 | Blank |
| 6,092,057 A | 7/2000 | Zimmerman et al. |
| 6,092,198 A | 7/2000 | Lanzy et al. |
| 6,095,567 A | 8/2000 | Buell |
| 6,098,053 A | 8/2000 | Slater |
| 6,098,879 A | 8/2000 | Terranova |
| 6,099,043 A | 8/2000 | Story |
| 6,100,804 A | 8/2000 | Brady et al. |
| 6,101,174 A | 8/2000 | Langston |
| 6,101,477 A | 8/2000 | Hohle et al. |
| 6,102,162 A | 8/2000 | Teicher |
| 6,102,672 A | 8/2000 | Woollenweber |
| 6,105,008 A | 8/2000 | Davis et al. |
| 6,105,013 A | 8/2000 | Curry et al. |
| 6,105,865 A | 8/2000 | Hardesty |
| 6,107,920 A | 8/2000 | Eberhardt et al. |
| 6,108,641 A | 8/2000 | Kenna et al. |
| 6,109,525 A | 8/2000 | Blomqvist et al. |
| 6,112,152 A | 8/2000 | Tuttle |
| 6,112,191 A | 8/2000 | Burke |
| 6,112,984 A | 9/2000 | Snavely |
| 6,115,040 A | 9/2000 | Bladow et al. |
| 6,115,360 A | 9/2000 | Quay et al. |
| 6,115,458 A | 9/2000 | Taskett |
| 6,116,423 A | 9/2000 | Troxtell, Jr. et al. |
| 6,116,505 A | 9/2000 | Withrow |
| 6,118,189 A | 9/2000 | Flaxl |
| 6,121,544 A | 9/2000 | Petsinger |
| 6,122,625 A | 9/2000 | Rosen |
| 6,123,223 A | 9/2000 | Watkins |
| 6,125,352 A | 9/2000 | Franklin et al. |
| 6,129,274 A | 10/2000 | Suzuki |
| 6,130,623 A | 10/2000 | MacLellan et al. |
| 6,133,834 A | 10/2000 | Eberth et al. |
| 6,138,913 A | 10/2000 | Cyr et al. |
| 6,138,917 A | 10/2000 | Chapin, Jr. |
| 6,141,651 A | 10/2000 | Riley et al. |
| 6,141,752 A | 10/2000 | Dancs et al. |
| 6,144,916 A | 11/2000 | Wood et al. |
| 6,144,948 A | 11/2000 | Walker et al. |
| 6,157,824 A | 12/2000 | Bailey |
| 6,163,771 A * | 12/2000 | Walker et al. .................. 705/18 |
| 6,167,236 A | 12/2000 | Kaiser et al. |
| 6,168,083 B1 | 1/2001 | Berger et al. |
| 6,173,269 B1 | 1/2001 | Solokl et al. |
| 6,173,897 B1 | 1/2001 | Halpern |
| 6,173,898 B1 | 1/2001 | Mande |
| 6,173,899 B1 | 1/2001 | Rozin |
| 6,177,859 B1 | 1/2001 | Tuttle et al. |
| 6,177,860 B1 | 1/2001 | Cromer et al. |
| 6,179,205 B1 | 1/2001 | Sloan |
| 6,179,206 B1 | 1/2001 | Matsumori |
| 6,181,287 B1 | 1/2001 | Beigel |
| 6,185,307 B1 | 2/2001 | Johnson |
| 6,188,994 B1 | 2/2001 | Egendorf |
| 6,189,787 B1 | 2/2001 | Dorf |
| 6,192,255 B1 | 2/2001 | Lewis et al. |
| 6,195,006 B1 | 2/2001 | Bowers et al. |
| 6,198,728 B1 | 3/2001 | Hulyalkar et al. |
| 6,198,875 B1 | 3/2001 | Edenson et al. |
| 6,202,927 B1 | 3/2001 | Bashan et al. |
| 6,205,151 B1 | 3/2001 | Quay et al. |
| 6,206,293 B1 | 3/2001 | Gutman et al. |
| 6,213,390 B1 | 4/2001 | Oneda |
| 6,213,391 B1 | 4/2001 | Lewis |
| 6,215,437 B1 | 4/2001 | Schurmann et al. |
| 6,216,219 B1 | 4/2001 | Cai et al. |
| 6,219,439 B1 | 4/2001 | Burger |
| 6,220,510 B1 | 4/2001 | Everett et al. |
| D442,627 S | 5/2001 | Webb et al. |
| D442,629 S | 5/2001 | Webb et al. |
| 6,223,984 B1 | 5/2001 | Renner et al. |
| 6,224,109 B1 | 5/2001 | Yang |
| 6,226,382 B1 | 5/2001 | MRaihi et al. |
| 6,227,447 B1 | 5/2001 | Campisano |
| 6,230,270 B1 | 5/2001 | Laczko, Sr. |
| 6,232,917 B1 | 5/2001 | Baumer et al. |

(56) References Cited

U.S. PATENT DOCUMENTS

| | | |
|---|---|---|
| 6,233,683 B1 | 5/2001 | Chan et al. |
| 6,237,848 B1 | 5/2001 | Everett |
| 6,239,675 B1 | 5/2001 | Flaxl |
| 6,240,187 B1 | 5/2001 | Lewis |
| 6,240,989 B1 | 6/2001 | Masoud |
| 6,248,199 B1 | 6/2001 | Smulson |
| 6,250,554 B1 | 6/2001 | Leo et al. |
| 6,250,557 B1 | 6/2001 | Forslund et al. |
| 6,257,486 B1 | 7/2001 | Teicher et al. |
| 6,259,769 B1 | 7/2001 | Page |
| 6,260,026 B1 | 7/2001 | Tomida et al. |
| 6,260,088 B1 | 7/2001 | Gove et al. |
| 6,263,316 B1 | 7/2001 | Khan et al. |
| 6,264,106 B1 | 7/2001 | Bridgelall |
| 6,266,754 B1 | 7/2001 | Laczko, Sr. et al. |
| 6,267,292 B1 | 7/2001 | Walker et al. |
| 6,273,335 B1 | 8/2001 | Sloan |
| 6,282,522 B1 | 8/2001 | Davis et al. |
| D447,515 S | 9/2001 | Faenza, Jr. et al. |
| 6,286,763 B1 | 9/2001 | Reynolds et al. |
| 6,289,324 B1 | 9/2001 | Kawan |
| 6,290,137 B1 | 9/2001 | Kiekhaefer |
| 6,293,462 B1 | 9/2001 | Gangi |
| 6,297,727 B1 | 10/2001 | Nelson, Jr. |
| 6,304,223 B1 | 10/2001 | Hilton et al. |
| 6,309,098 B1 | 10/2001 | Wong |
| 6,315,193 B1 | 11/2001 | Hogan |
| 6,315,195 B1 | 11/2001 | Ramachandran |
| 6,317,721 B1 | 11/2001 | Hurta et al. |
| 6,317,755 B1 | 11/2001 | Rakers et al. |
| 6,318,636 B1 | 11/2001 | Reynolds et al. |
| 6,323,566 B1 | 11/2001 | Meier |
| 6,325,285 B1 | 12/2001 | Baratelli |
| 6,325,293 B1 | 12/2001 | Moreno |
| 6,326,934 B1 | 12/2001 | Kinzie |
| 6,327,573 B1 | 12/2001 | Walker et al. |
| 6,329,920 B1 | 12/2001 | Morrison et al. |
| 6,331,972 B1 | 12/2001 | Harris et al. |
| 6,339,384 B1 | 1/2002 | Valdes-Rodriguez |
| 6,342,844 B1 | 1/2002 | Rozin |
| 6,353,420 B1 | 3/2002 | Chung |
| 6,353,811 B1 | 3/2002 | Weissman |
| 6,364,208 B1 | 4/2002 | Stanford et al. |
| 6,367,011 B1 | 4/2002 | Lee et al. |
| 6,374,245 B1 | 4/2002 | Park |
| 6,377,034 B1 | 4/2002 | Ivanov |
| 6,378,073 B1 | 4/2002 | Davis et al. |
| 6,386,444 B1 | 5/2002 | Sullivan |
| 6,388,533 B2 | 5/2002 | Swoboda |
| 6,390,375 B2 | 5/2002 | Kayanakis |
| 6,400,272 B1 | 6/2002 | Holtzman et al. |
| 6,402,026 B1 | 6/2002 | Schwier |
| 6,402,028 B1 | 6/2002 | Graham, Jr. et al. |
| 6,404,341 B1 | 6/2002 | Reid |
| 6,406,935 B2 | 6/2002 | Kayanakis et al. |
| 6,411,611 B1 | 6/2002 | Van der Tuijn |
| 6,415,978 B1 | 7/2002 | McAllister |
| 6,421,650 B1 | 7/2002 | Goetz et al. |
| 6,422,464 B1 | 7/2002 | Terranova |
| 6,422,472 B1 | 7/2002 | Thevenot et al. |
| 6,424,029 B1 | 7/2002 | Giesler |
| RE37,822 E | 8/2002 | Anthonyson |
| 6,427,910 B1 | 8/2002 | Barnes et al. |
| 6,434,159 B1 | 8/2002 | Woodward et al. |
| 6,435,415 B1 | 8/2002 | Catte |
| 6,438,235 B2 | 8/2002 | Sims, III |
| 6,439,455 B1 | 8/2002 | Everett et al. |
| 6,442,532 B1 | 8/2002 | Kawan |
| 6,445,794 B1 | 9/2002 | Shefi |
| 6,457,996 B1 | 10/2002 | Shih |
| 6,466,804 B1 | 10/2002 | Pecen et al. |
| 6,471,127 B2 | 10/2002 | Pentz et al. |
| 6,473,500 B1 | 10/2002 | Risafi et al. |
| 6,480,100 B1 | 11/2002 | Frieden et al. |
| 6,480,101 B1 | 11/2002 | Kelly et al. |
| 6,480,869 B1 | 11/2002 | Fujioka |
| 6,481,621 B1 | 11/2002 | Herrendoerfer et al. |
| 6,481,632 B2 | 11/2002 | Wentker et al. |
| 6,483,427 B1 | 11/2002 | Werb |
| 6,483,477 B1 | 11/2002 | Plonka |
| 6,484,937 B1 | 11/2002 | Devaux et al. |
| 6,490,443 B1 | 12/2002 | Freeny, Jr. |
| 6,491,229 B1 | 12/2002 | Berney |
| 6,494,367 B1 | 12/2002 | Zacharias |
| 6,494,380 B2 | 12/2002 | Jarosz |
| 6,505,772 B1 | 1/2003 | Mollett et al. |
| 6,507,762 B1 | 1/2003 | Amro et al. |
| 6,510,983 B2 | 1/2003 | Horowitz et al. |
| 6,510,998 B1 | 1/2003 | Stanford et al. |
| 6,513,015 B2 | 1/2003 | Ogasawara |
| 6,520,542 B2 | 2/2003 | Thompson et al. |
| 6,529,880 B1 | 3/2003 | McKeen et al. |
| 6,535,726 B1 | 3/2003 | Johnson |
| 6,546,373 B1 | 4/2003 | Cerra |
| 6,547,133 B1 | 4/2003 | DeVries, Jr. et al. |
| 6,549,912 B1 | 4/2003 | Chen |
| 6,560,581 B1 | 5/2003 | Fox et al. |
| 6,575,361 B1 | 6/2003 | Graves et al. |
| 6,577,229 B1 | 6/2003 | Bonneau et al. |
| 6,578,768 B1 | 6/2003 | Binder et al. |
| 6,581,839 B1 | 6/2003 | Lasch et al. |
| 6,587,835 B1 | 7/2003 | Treyz et al. |
| 6,588,660 B1 | 7/2003 | Buescher et al. |
| 6,589,119 B1 | 7/2003 | Orus et al. |
| 6,598,024 B1 | 7/2003 | Walker et al. |
| 6,608,551 B1 | 8/2003 | Anderson et al. |
| 6,608,995 B1 | 8/2003 | Kawasaki et al. |
| 6,609,655 B1 | 8/2003 | Harrell |
| 6,623,039 B2 | 9/2003 | Thompson et al. |
| 6,626,356 B2 | 9/2003 | Davenport et al. |
| 6,628,961 B1 | 9/2003 | Ho et al. |
| 6,631,849 B2 | 10/2003 | Blossom |
| 6,636,833 B1 | 10/2003 | Flitcroft et al. |
| 6,650,887 B2 | 11/2003 | McGregor et al. |
| 6,665,405 B1 | 12/2003 | Lenstra |
| 6,671,358 B1 | 12/2003 | Seidman et al. |
| 6,674,786 B1 | 1/2004 | Nakamura et al. |
| 6,679,427 B1 | 1/2004 | Kuroiwa |
| 6,681,328 B1 | 1/2004 | Harris et al. |
| 6,684,269 B2 | 1/2004 | Wagner |
| 6,685,089 B2 | 2/2004 | Terranova et al. |
| 6,686,847 B1 | 2/2004 | Mittler |
| 6,687,714 B1 | 2/2004 | Kogen et al. |
| 6,690,930 B1 | 2/2004 | Dupre |
| 6,693,513 B2 | 2/2004 | Tuttle |
| 6,705,530 B2 | 3/2004 | Kiekhaefer |
| 6,708,375 B1 | 3/2004 | Johnson |
| 6,711,262 B1 | 3/2004 | Watanen |
| 6,725,202 B1 | 4/2004 | Hurta et al. |
| 6,732,919 B2 | 5/2004 | Macklin et al. |
| 6,732,936 B1 | 5/2004 | Kiekhaefer |
| 6,742,120 B1 | 5/2004 | Markakis et al. |
| 6,747,546 B1 | 6/2004 | Hikita et al. |
| 6,749,123 B2 | 6/2004 | Lasch et al. |
| 6,760,581 B2 | 7/2004 | Dutta |
| 6,764,014 B2 | 7/2004 | Lasch et al. |
| 6,769,718 B1 | 8/2004 | Warther et al. |
| 6,771,981 B1 | 8/2004 | Zalewski et al. |
| 6,789,012 B1 | 9/2004 | Childs et al. |
| 6,789,733 B2 | 9/2004 | Terranova et al. |
| 6,793,141 B1 | 9/2004 | Graham |
| 6,799,726 B2 | 10/2004 | Stockhammer |
| 6,830,193 B2 | 12/2004 | Tanaka |
| 6,842,106 B2 | 1/2005 | Hughes et al. |
| 6,851,617 B2 | 2/2005 | Saint et al. |
| 6,853,087 B2 | 2/2005 | Neuhaus et al. |
| 6,853,894 B1 | 2/2005 | Kolls |
| 6,857,566 B2 | 2/2005 | Wankmueller |
| 6,859,672 B2 | 2/2005 | Roberts et al. |
| 6,895,310 B1 | 5/2005 | Kolls |
| 6,915,277 B1 | 7/2005 | Manchester et al. |
| 6,924,729 B1 | 8/2005 | Aschauer et al. |
| 6,925,565 B2 | 8/2005 | Black |
| D509,243 S | 9/2005 | Hunter, Jr. et al. |

(56) References Cited

U.S. PATENT DOCUMENTS

| | | |
|---|---|---|
| 6,978,933 B2 | 12/2005 | Yap et al. |
| 6,994,262 B1 | 2/2006 | Warther |
| 7,004,385 B1 | 2/2006 | Douglass |
| 7,069,444 B2 | 6/2006 | Lowensohn et al. |
| 7,070,112 B2 | 7/2006 | Beenau et al. |
| 7,093,767 B2 | 8/2006 | Faenza |
| 7,103,575 B1 | 9/2006 | Linehan |
| 7,119,659 B2 | 10/2006 | Bonalle et al. |
| 7,172,112 B2 | 2/2007 | Bonalle et al. |
| 7,287,695 B2 | 10/2007 | Wankmueller |
| 7,363,505 B2 | 4/2008 | Black |
| 7,419,093 B1 | 9/2008 | Blackson et al. |
| 2001/0013542 A1 | 8/2001 | Horowitz et al. |
| 2001/0024157 A1 | 9/2001 | Hansmann et al. |
| 2001/0030238 A1 | 10/2001 | Arisawa |
| 2001/0034565 A1 | 10/2001 | Leatherman |
| 2001/0034720 A1 | 10/2001 | Armes et al. |
| 2001/0039617 A1 | 11/2001 | Buhrlen et al. |
| 2002/0011519 A1 | 1/2002 | Shults |
| 2002/0019807 A1 | 2/2002 | Halpern |
| 2002/0028704 A1 | 3/2002 | Bloomfield et al. |
| 2002/0035548 A1 | 3/2002 | Hogan et al. |
| 2002/0040935 A1 | 4/2002 | Weyant |
| 2002/0040936 A1 | 4/2002 | Wentker et al. |
| 2002/0043566 A1 | 4/2002 | Goodman et al. |
| 2002/0052839 A1 | 5/2002 | Takatori |
| 2002/0062284 A1 | 5/2002 | Kawan |
| 2002/0074398 A1 | 6/2002 | Lancos et al. |
| 2002/0077837 A1 | 6/2002 | Krueger et al. |
| 2002/0077895 A1 | 6/2002 | Howell |
| 2002/0077992 A1 | 6/2002 | Tobin |
| 2002/0079367 A1 | 6/2002 | Montani |
| 2002/0092914 A1 | 7/2002 | Pentz et al. |
| 2002/0095343 A1 | 7/2002 | Barton et al. |
| 2002/0095389 A1 | 7/2002 | Gaines |
| 2002/0095587 A1 | 7/2002 | Doyle et al. |
| 2002/0097144 A1 | 7/2002 | Collins et al. |
| 2002/0107007 A1 | 8/2002 | Gerson |
| 2002/0107742 A1 | 8/2002 | Magill |
| 2002/0109580 A1 | 8/2002 | Shreve et al. |
| 2002/0111210 A1 | 8/2002 | Luciano, Jr. et al. |
| 2002/0113082 A1 | 8/2002 | Leatherman et al. |
| 2002/0116274 A1 | 8/2002 | Hind et al. |
| 2002/0120584 A1 | 8/2002 | Hogan et al. |
| 2002/0126010 A1 | 9/2002 | Trimble et al. |
| 2002/0131567 A1 | 9/2002 | Maginas |
| 2002/0138425 A1 | 9/2002 | Shimizu et al. |
| 2002/0138438 A1 | 9/2002 | Bardwell |
| 2002/0140542 A1 | 10/2002 | Prokoski et al. |
| 2002/0145043 A1 | 10/2002 | Challa et al. |
| 2002/0147913 A1 | 10/2002 | Lun Yip |
| 2002/0148892 A1 | 10/2002 | Bardwell |
| 2002/0152123 A1 | 10/2002 | Giordano et al. |
| 2002/0165931 A1 | 11/2002 | Greer et al. |
| 2002/0166891 A1 | 11/2002 | Stoutenburg et al. |
| 2002/0176522 A1 | 11/2002 | Fan |
| 2002/0178063 A1 | 11/2002 | Gravelle et al. |
| 2002/0178369 A1 | 11/2002 | Black |
| 2002/0179704 A1 | 12/2002 | Deaton |
| 2002/0185543 A1 | 12/2002 | Pentz et al. |
| 2002/0188501 A1 | 12/2002 | Lefkowith |
| 2002/0190125 A1 | 12/2002 | Stockhammer |
| 2002/0192856 A1 | 12/2002 | Halope et al. |
| 2002/0193102 A1 | 12/2002 | Hyyppa et al. |
| 2002/0194303 A1 | 12/2002 | Suila et al. |
| 2002/0194503 A1 | 12/2002 | Faith et al. |
| 2002/0196963 A1 | 12/2002 | Bardwell |
| 2003/0001459 A1 | 1/2003 | Scott |
| 2003/0005310 A1 | 1/2003 | Shinzaki |
| 2003/0009382 A1 | 1/2003 | DArbeloff et al. |
| 2003/0014307 A1 | 1/2003 | Heng |
| 2003/0014357 A1 | 1/2003 | Chrisekos et al. |
| 2003/0014891 A1 | 1/2003 | Nelms et al. |
| 2003/0018532 A1 | 1/2003 | Dudek et al. |
| 2003/0025600 A1 | 2/2003 | Blanchard |
| 2003/0028481 A1 | 2/2003 | Flitcroft et al. |
| 2003/0033697 A1 | 2/2003 | Hicks et al. |
| 2003/0037851 A1 | 2/2003 | Hogganvik |
| 2003/0046228 A1 | 3/2003 | Berney |
| 2003/0054836 A1 | 3/2003 | Michot |
| 2003/0055727 A1 | 3/2003 | Walker et al. |
| 2003/0057226 A1 | 3/2003 | Long |
| 2003/0057278 A1 | 3/2003 | Wong |
| 2003/0069828 A1 | 4/2003 | Blazey et al. |
| 2003/0069846 A1 | 4/2003 | Marcon |
| 2003/0112972 A1 | 6/2003 | Hattick et al. |
| 2003/0115126 A1 | 6/2003 | Pitroda |
| 2003/0120554 A1 | 6/2003 | Hogan et al. |
| 2003/0121969 A1 | 7/2003 | Wankmueller |
| 2003/0130820 A1 | 7/2003 | Lane, III |
| 2003/0132284 A1 | 7/2003 | Reynolds et al. |
| 2003/0140228 A1 | 7/2003 | Binder |
| 2003/0149662 A1 | 8/2003 | Shore |
| 2003/0160074 A1 | 8/2003 | Pineda |
| 2003/0163699 A1 | 8/2003 | Pailles et al. |
| 2003/0167207 A1 | 9/2003 | Berardi et al. |
| 2003/0177347 A1 | 9/2003 | Schneier et al. |
| 2003/0183689 A1 | 10/2003 | Swift et al. |
| 2003/0183695 A1 | 10/2003 | Labrec et al. |
| 2003/0183699 A1 | 10/2003 | Masui |
| 2003/0187786 A1 | 10/2003 | Swift et al. |
| 2003/0187787 A1 | 10/2003 | Freund |
| 2003/0187790 A1 | 10/2003 | Swift et al. |
| 2003/0187796 A1 | 10/2003 | Swift et al. |
| 2003/0195037 A1 | 10/2003 | Vuong et al. |
| 2003/0195842 A1 | 10/2003 | Reece |
| 2003/0195843 A1 | 10/2003 | Matsuda et al. |
| 2003/0200184 A1 | 10/2003 | Dominguez et al. |
| 2003/0218066 A1 | 11/2003 | Fernandes et al. |
| 2003/0220876 A1 | 11/2003 | Burger et al. |
| 2003/0222153 A1 | 12/2003 | Pentz et al. |
| 2003/0225623 A1 | 12/2003 | Wankmueller |
| 2003/0225713 A1 | 12/2003 | Atkinson et al. |
| 2003/0227550 A1 | 12/2003 | Manico et al. |
| 2003/0230514 A1 | 12/2003 | Baker |
| 2003/0233334 A1 | 12/2003 | Smith |
| 2004/0010462 A1 | 1/2004 | Moon et al. |
| 2004/0011877 A1 | 1/2004 | Reppermund |
| 2004/0015451 A1 | 1/2004 | Sahota et al. |
| 2004/0016796 A1 | 1/2004 | Hanna et al. |
| 2004/0026518 A1 | 2/2004 | Kudo et al. |
| 2004/0029569 A1 | 2/2004 | Khan et al. |
| 2004/0030601 A1 | 2/2004 | Pond et al. |
| 2004/0039814 A1 | 2/2004 | Crabtree et al. |
| 2004/0039860 A1 | 2/2004 | Mills et al. |
| 2004/0044627 A1 | 3/2004 | Russell et al. |
| 2004/0046034 A1 | 3/2004 | Ey Yamani et al. |
| 2004/0127256 A1 | 7/2004 | Goldthwaite et al. |
| 2004/0139021 A1 | 7/2004 | Reed et al. |
| 2004/0160310 A1 | 8/2004 | Chen et al. |
| 2004/0176071 A1 | 9/2004 | Gehrmann et al. |
| 2004/0177045 A1 | 9/2004 | Brown |
| 2004/0180657 A1 | 9/2004 | Yaqub et al. |
| 2004/0193676 A1 | 9/2004 | Marks |
| 2004/0235450 A1 | 11/2004 | Rosenberg |
| 2004/0236680 A1 | 11/2004 | Luoffo et al. |
| 2005/0004921 A1 | 1/2005 | Beenau et al. |
| 2005/0017068 A1 | 1/2005 | Zalewski et al. |
| 2005/0023157 A1 | 2/2005 | Logan |
| 2005/0033686 A1 | 2/2005 | Peart et al. |
| 2005/0035192 A1 | 2/2005 | Bonalle et al. |
| 2005/0035847 A1 | 2/2005 | Bonalle et al. |
| 2005/0038718 A1 | 2/2005 | Barnes et al. |
| 2005/0040272 A1 | 2/2005 | Argumedo et al. |
| 2005/0045718 A1 | 3/2005 | Bortolin et al. |
| 2005/0065872 A1 | 3/2005 | Moebs et al. |
| 2005/0113137 A1 | 5/2005 | Rodriguez et al. |
| 2005/0121512 A1 | 6/2005 | Wankmueller |
| 2005/0122209 A1 | 6/2005 | Black |
| 2005/0125312 A1 | 6/2005 | Dearing et al. |
| 2005/0125317 A1 | 6/2005 | Winkelman, III et al. |
| 2005/0127164 A1 | 6/2005 | Wankmueller |
| 2005/0149358 A1 | 7/2005 | Sacco et al. |
| 2005/0171905 A1 | 8/2005 | Wankmueller |

(56) References Cited

U.S. PATENT DOCUMENTS

| | | |
|---|---|---|
| 2005/0207002 A1 | 9/2005 | Liu et al. |
| 2005/0221853 A1 | 10/2005 | Silvester |
| 2006/0077034 A1 | 4/2006 | Hillier |
| 2006/0178937 A1 | 8/2006 | Rau et al. |

FOREIGN PATENT DOCUMENTS

| | | |
|---|---|---|
| DE | 2847756 | 5/1980 |
| DE | 29702538 | 4/1997 |
| EP | 0181770 | 5/1986 |
| EP | 0343829 | 11/1989 |
| EP | 0354817 | 2/1990 |
| EP | 0 358 525 A2 | 3/1990 |
| EP | 0368570 | 5/1990 |
| EP | 0388090 | 9/1990 |
| EP | 0 424 726 A1 | 10/1990 |
| EP | 0403134 | 12/1990 |
| EP | 0411602 | 2/1991 |
| EP | 0473998 | 3/1992 |
| EP | 0481388 | 4/1992 |
| EP | 0531605 | 3/1993 |
| EP | 0552047 | 7/1993 |
| EP | 0560318 | 9/1993 |
| EP | 0568185 | 11/1993 |
| EP | 0657297 | 6/1995 |
| EP | 0721850 | 7/1996 |
| EP | 0780839 | 6/1997 |
| EP | 0789316 | 8/1997 |
| EP | 0866420 | 9/1998 |
| EP | 0894620 | 2/1999 |
| EP | 0916519 | 5/1999 |
| EP | 0 933 717 A2 | 8/1999 |
| EP | 0949595 | 10/1999 |
| EP | 0 956 818 A1 | 11/1999 |
| EP | 0 959 440 A2 | 11/1999 |
| EP | 0 984 404 A2 | 3/2000 |
| EP | 1 016 947 A2 | 7/2000 |
| EP | 1 039 403 A2 | 9/2000 |
| EP | 1 104 909 A2 | 6/2001 |
| EP | 1 113 387 A2 | 7/2001 |
| EP | 1 199 684 A2 | 4/2002 |
| EP | 1 251 450 A1 | 10/2002 |
| EP | 1345146 | 9/2003 |
| GB | 1371254 | 10/1974 |
| GB | 2108906 | 5/1985 |
| GB | 2240948 | 8/1991 |
| GB | 2347537 | 9/2000 |
| GB | 2350021 | 11/2000 |
| JP | 62-043774 | 3/1987 |
| JP | 62-264999 | 11/1987 |
| JP | 63-071794 | 4/1988 |
| JP | 63-098689 | 4/1988 |
| JP | 63-072721 | 5/1988 |
| JP | 63-175987 | 7/1988 |
| JP | 64-004934 | 1/1989 |
| JP | 64-087395 | 3/1989 |
| JP | 64-087396 | 3/1989 |
| JP | 64-087397 | 3/1989 |
| JP | 02-130737 | 5/1990 |
| JP | 02-252149 | 10/1990 |
| JP | 03-290780 | 12/1991 |
| JP | 42-005596 | 7/1992 |
| JP | 04-303692 | 10/1992 |
| JP | 05-069689 | 3/1993 |
| JP | 05-254283 | 10/1993 |
| JP | 06-183187 | 7/1994 |
| JP | 06-191137 | 7/1994 |
| JP | 06-234287 | 8/1994 |
| JP | 07-173358 | 7/1995 |
| JP | 07-205569 | 8/1995 |
| JP | 08-244385 | 9/1996 |
| JP | 08-324163 | 12/1996 |
| JP | 09-050505 | 2/1997 |
| JP | 09-052240 | 2/1997 |
| JP | 09-274640 | 10/1997 |
| JP | 10-129161 | 5/1998 |
| JP | 10-289296 | 10/1998 |
| JP | 10302160 | 11/1998 |
| JP | 10-334206 | 12/1998 |
| JP | 10-340231 | 12/1998 |
| JP | 11-175640 | 7/1999 |
| JP | 11-227367 | 8/1999 |
| JP | 11-353425 | 12/1999 |
| JP | 2000-1109 A | 1/2000 |
| JP | 2000-015288 A | 1/2000 |
| JP | 2000-40181 A | 2/2000 |
| JP | 2000-048153 | 2/2000 |
| JP | 2000-67312 A | 3/2000 |
| JP | 2000-163538 | 6/2000 |
| JP | 2000-177229 | 6/2000 |
| JP | 2000-194799 | 7/2000 |
| JP | 2000-207641 A | 7/2000 |
| JP | 2000-222176 | 8/2000 |
| JP | 2000-252854 | 9/2000 |
| JP | 2001-5931 A | 1/2001 |
| JP | 2001-504406 | 4/2001 |
| JP | 2001-134536 | 5/2001 |
| JP | 2001-160105 | 6/2001 |
| JP | 2001-283122 A | 10/2001 |
| JP | 2001-315475 | 11/2001 |
| JP | 2002-109584 | 4/2002 |
| JP | 2002-133335 | 5/2002 |
| JP | 2002-157530 | 5/2002 |
| JP | 2002-274640 | 9/2002 |
| JP | 2003-288646 | 10/2003 |
| WO | WO 81/00776 | 3/1981 |
| WO | WO 89/03760 | 5/1989 |
| WO | WO 90/08661 | 8/1990 |
| WO | WO 92/16913 | 10/1992 |
| WO | WO 95/32919 | 12/1995 |
| WO | WO 95/35546 | 12/1995 |
| WO | WO 96/18972 | 6/1996 |
| WO | WO 97/09688 A2 | 3/1997 |
| WO | WO 97/40459 | 10/1997 |
| WO | WO 99/03057 A1 | 1/1999 |
| WO | WO 99/12136 | 3/1999 |
| WO | WO 99/14055 | 3/1999 |
| WO | WO 99/27492 | 6/1999 |
| WO | WO 99/40548 | 8/1999 |
| WO | WO 99/47983 | 9/1999 |
| WO | WO 99/49424 A1 | 9/1999 |
| WO | WO 00/10144 A1 | 2/2000 |
| WO | WO 00/38088 A1 | 6/2000 |
| WO | WO 00/49586 | 8/2000 |
| WO | WO 01/04825 A1 | 1/2001 |
| WO | WO 01/15098 A1 | 3/2001 |
| WO | WO 01/43095 A2 | 6/2001 |
| WO | WO 01/55955 | 8/2001 |
| WO | WO 01/72224 A1 | 10/2001 |
| WO | WO 01/77856 | 10/2001 |
| WO | WO 01/77856 A1 | 10/2001 |
| WO | WO 01/80473 A2 | 10/2001 |
| WO | WO 01/86535 A1 | 11/2001 |
| WO | WO 01/90962 A1 | 11/2001 |
| WO | WO 01/95243 A2 | 12/2001 |
| WO | WO 02/01485 A1 | 1/2002 |
| WO | WO 02/13134 A2 | 2/2002 |
| WO | WO 02/21903 A1 | 3/2002 |
| WO | WO 02/063545 A2 | 8/2002 |
| WO | WO 02/065246 A2 | 8/2002 |
| WO | WO 02/065404 A2 | 8/2002 |
| WO | WO 02/069221 A1 | 9/2002 |
| WO | WO 02/073512 A1 | 9/2002 |
| WO | WO 02/086665 A2 | 10/2002 |
| WO | WO 02/091281 A2 | 11/2002 |
| WO | WO 02/097575 A2 | 12/2002 |
| WO | WO 02/101670 A2 | 12/2002 |
| WO | WO 03/007623 | 1/2003 |

OTHER PUBLICATIONS http://www.semiconductors.phillips.com/news/content/file_878.html, Apr. 7, 2003.

(56) References Cited

OTHER PUBLICATIONS http://www.palowireless.com/infotooth/whatis.asp, Apr. 28, 2003.
http://www.palowireless.com/infotooth/tutorial.asp, Apr. 28, 2003.
http://www.palowireless.com/infotooth/tutorial/profiles.asp, Apr. 28, 2003.
http://www.palowireless.com/infotooth/tutorial/radio.asp, Apr. 28, 2003.
http://www.polowireless.com/infotooth/tutorial/baseband.asp, Apr. 28, 2003.
http://www.palowireless.com/infotooth/tutorial/lmp.asp, Apr. 28, 2003.
http://www.palowireless.com/infotooth/tutorial/hci.asp, Apr. 28, 2003.
http://www.palowireless.com/infotooth/tutorial/l2cap.asp, Apr. 28, 2003.
http://www.palowireless.com/infotooth/tutorial/rfcomm.asp, Apr. 28, 2003.
http://www.palowireless.com/infotooth/tutorial/sdp.asp, Apr. 28, 2003.
http://www.palowireless.com/infotooth/tutorialk1_gap.asp, Apr. 28, 2003.
"Sony, Phillips to Test RFID Platform", RFID Journal, May 8, 2003.
USBanker, Article 5, 1995, http://www.banking.com/us-banker/art5.
Financial Technology International Bulletin, V14, n1, p. 4, Sep. 1996.
ISO/IEC 7816-6:1996(E)—First Edition—May 15, 1996.
ISO/IEC 7816-4:1995(E)—First Edition—Sep. 1, 1995.
"What's New: Timex Watch Features Speedpass System" http://www.speedpass.com/news/article.jsp?id=51 (1 page).
"Physical Reality: A Second Look", Ken Sharp, Senior Technical Editor, http://www.idsystems.com/reader/1999_03/phys0399_pt2/phys0399_pt2.htm (6 pages).
"'Magic Wands' to Speed Mobile Sales", BobBrewin, Jan. 15, 2001, http://www.computerworld.com/mobiletopics/mobile/story/1,10801,563300.html (4 pages).
"Mobile Speedpass Goes Global as Mobil Singapore Rolls Out Asia's First RFID-Based Pay-At-The-Pump System", Press Release, Apr. 5, 1999, http://www.ti.com/tiris/docs/news_releases/rel12.htm (3 pages).
"Speedpass Unleashed", Jun. 4, 2002 http://www.cardweb.com/cardtrak/news/cf2_20a_97.html (2 pages).
Prophecy Central Update #9, Oct. 10, 1997, http://www.bible-prophecy.com/pcu9.htm (5 pages).
International Newsletter of the TI RFID Group, Issue 20, 2000 (12 pages).
"CES: Microsoft's SPOT Technology has Humble Origins", by James Niccolai, Jan. 10, 2003, http://archive.inforworld.com/articles/hn/xml/03/01/10/030110hnspot.xml?s=IDGNS (3 pages).
"Microsoft: See Spot Run on Your Wrist", by Richard Shim, Jun. 5, 2003, http://news.com.com/2100-1041_3-1013442.html?tag=fd_top (1 page).
"Networking: Microsoft SPOT", by Jeremy A. Kaplan, Jul. 1, 2003, http://www.pcmag.com/print_article/0,3048,a=43561,00.asp (2 pages).
"Microsoft Launches Smart Personal Object Technology Initiative", Press Release from COMDEX Fall 2002, Nov. 17, 2002, http://www.Microsoft.com/presspass/features/2002/nov02/11-17SPOT.asp (4 pages).
"Bank Extends RFID Payment Pilot: Bank of America will continue to test its QuickWave RFID payment card for another three months", RFID Journal, Jan. 23, 2003.
"MasterCard to Test RFID Card: Pilot will test whether consumers, merchants and credit card issuers value "contactless" payments", RFID Journal, Dec. 20, 2002.
"Vendors Target Amusement Parks: Protecting children and enabling cashless payments make RFID an appealing option for the entertainment industry", RFID Journal, Nov. 27, 2002.
"Inside's Next-Gen Smart Card: The French company plans to introduce an RFID card that uses a 16-bit microprocessor and new encryption technology", RFID Journal, Oct. 29, 2002.
"Sony, Philips Creating RFID Link: Consumer electronics giants are jointly developing a new RFID standard for payments and for communication between devices", RFID Journal, Sep. 17, 2002.
"Japan Gets Digital Ticket System: A national ticket seller and phone company are teaming up to create an electronic ticket", RFID Journal, Aug. 31, 2002.
"Security for Wireless Java: NTRU, a startup that offers security software, has relased of Java version of its NTRU encryption algorithm", RFID Journal, Jun. 27, 2002.
"Making RFID Payments Ubiquitous: Philips and Visa want people to be able to pay for goods and services anywhere by using RFID chips embedded in the phones and other devices", RFID Journal, Jun. 2, 20003.
"RFID Smart Cards Gain Ground: The convenience of contactless transactions is driving widespread adoption of contactless smart cards", RFID Journal, Apr. 9, 2003.
"TI Embarces Prox Card Standard: Texas Instruments ISO 14443 payment platform promises faster data transfer rates and more security", RFID Journal, Mar. 6, 2003.
"Multiple Frequency Transponders: Volume production of dual-band RFID chips begins", Frontline Solutions, Jul. 16, 2003.
Functional Specification, Standard Card IC MF1 IC S50, Philips Semiconductors, Product Specification Rev. 5.1 May 2001.
Green, Thomas C., "American Express Offers Temporary CC Numbers For the Web", Sep. 9, 2000, The Register, www.theregister.c.uk/c.
CNN.com, U.S.News, "American Express to Offer Disposable Credit Card Numbers", Sep. 8, 2000, Associated Press, www.cnn.com.
American Express, Private Payments(SM); A New Level of Security from American Express, America Express Website, Cards.
Martin, Zack, "One-Time Numbers Stop Web Hackers From Pilfering Data", Jan. 2001, Card Marketing, Thomson Financial, www.c rdf rum.c.
The Dollar Stretcher, "Disposable Credit Card Numbers", Jan. 2001, CardRatings.org, www.stretcher.c.
International Search Report and Written Opinion of the International Searching Authority, PCT/US05/26067, May 23, 2007.
Office Action dated Sep. 9, 2009 for U.S. Appl. No. 12/206,634.

* cited by examiner

LIMITING ACCESS TO ACCOUNT INFORMATION DURING A RADIO FREQUENCY TRANSACTION

CROSS REFERENCE TO RELATED APPLICATIONS

This application is a continuation U.S. patent application Ser. No. 09/800,461, filed Mar. 7, 2001, and titled "SYSTEM FOR FACILITATING A TRANSACTION." The '461 application is a non-provisional of U.S. Provisional Applications: (1) Ser. No. 60/187,620, filed Mar. 7, 2000, (2) Ser. No. 60/200,625, filed Apr. 28, 2000, and (3) Ser. No. 60/213,323, filed Jun. 22, 2000. This application is also a continuation in part of U.S. patent application Ser. No. 10/192,488 entitled "SYSTEM AND METHOD FOR PAYMENT USING RADIO FREQUENCY IDENTIFICATION IN CONTACT AND CONTACTLESS TRANSACTIONS," filed on Jul. 9, 2002, and has now issued as U.S. Pat. No. 7,239,226 on Jul. 3, 2007. The '488 application is a non-provisional of U.S. Provisional Patent Application No. 60/304,216, filed Jul. 10, 2001. All of the above applications are hereby incorporated by reference.

FIELD OF INVENTION

The present invention generally relates to a system for facilitating transactions utilizing a secondary transaction number that is associated with a primary transaction account. More particularly, the system allows an accountholder to pay a merchant with a private, limited-use, transaction number provided by a transponder enabled payment device without the need to disclose to the merchant or others the accountholder's primary transaction account number. Moreover, the present invention provides registration, number generation and association, authorization, settlement and customer service processes that achieve an improved secure and private transaction system.

BACKGROUND OF INVENTION

The proliferation of the Internet has resulted in a thriving electronic commerce industry, where more and more products and services are available to customers in a variety of non-traditional ways (e.g., Internet, telephone sales, wireless, interactive TV, etc.). In conventional transactions, customers typically provide merchants with transaction numbers (e.g., charge card numbers) associated with a customer's existing debit, phone, credit or other transaction enabling devices (e.g., private label cards, American Express® card, VISA® card, MasterCard® card, Discover Card®, AT&T® phone card, MCI® phone card, etc.). Where a transaction is completed "on-line" the transmission of the transaction number over an often insecure public access network (i.e., Internet) exposes the transaction number to theft by hackers and system eavesdroppers. This transmission of transaction numbers via online means has created increased opportunities for fraud since the customer often does not present a physical card for transaction completion. Namely, it is possible for these numbers to be intercepted during transmission, after transmission, while being stored electronically or at the merchant's online or offline location.

In light of the increase in charge card fraud involving situations where the physical charge card is not actually presented to the merchant, customers are becoming increasingly leery of giving out the customer's transaction account number to online merchants (or other unknown third parties asserting to be merchants).

Moreover, not only are the customers subject to incur unauthorized charges due to theft of the customer's charge card information, but the online merchant receiving the fraudulent or stolen credit card information is victimized as well. The merchant may receive charge card information belonging to a valid customer, which is not being used by the valid customer to complete an online transaction. For example, the charge card information may be used by a fraudulent person who has pirated the information, and not by someone who the customer has authorized to use the transaction account. Once a transaction request is processed, the merchant may have difficulty getting satisfaction of the transaction request, especially if, for example, the valid customer later disputes the transaction. Thus, a more secure means is needed of ensuring that the charge card number received by the merchant is not stolen.

Furthermore, with the introduction of new payment technologies, such as transponder devices using radio frequency to facilitate transactions, there is a need to protect and safeguard related account numbers or other sensitive information from fraud or theft. In addition to addressing security gaps, the invention can be used by a creditworthy accountholder to set up and administer secondary accounts to others (student, dependent, spouse, employees, etc.).

SUMMARY OF INVENTION

The present invention provides a system and methods for facilitating an online transaction, which enables a customer to complete a transaction while secreting the customer's transaction number. In accordance with one aspect of the present invention, a method for facilitating a transaction using a transponder, comprises the steps of identifying a primary transponder account, generating a secondary transaction number, associating the secondary transaction number with the primary transponder account and using the secondary transaction number to facilitate a transaction with a merchant.

More particularly, the system involves the process of registering a user (if not already pre-registered) to participate in an RF transaction system; generating a secondary transaction number and issuing this number to the user, where the user presents this number to a merchant to complete a sales transaction; the merchant processing this secondary transaction number, similar to any other transponder number, where the number is typically presented to the issuer for authorization. Throughout this process, the user's primary transponder number is never passed to the merchant or any other third party. Additionally, the secondary transaction number may also carry with it certain limitations-on-use conditions, where the transaction is not authorized unless these conditions are met.

BRIEF DESCRIPTION OF DRAWINGS

Additional aspects of the present invention will become evident upon reviewing the non-limiting embodiments described in the specification and the claims taken in conjunction with the accompanying figures, wherein like reference numerals denote like elements.

FIG. 13 is a web page screen shot of a card provider's exemplary online registration page for a transaction system;

FIG. 14 is a web page screen shot of a card provider's exemplary online log-in page for a transaction system;

FIG. 16 is a web page screen shot, displaying in the foreground, an exemplary secondary transaction number (e.g., Private Payments™ number) returned to the user; and in the background, a merchant's payment web page;

DETAILED DESCRIPTION

Figure 1:
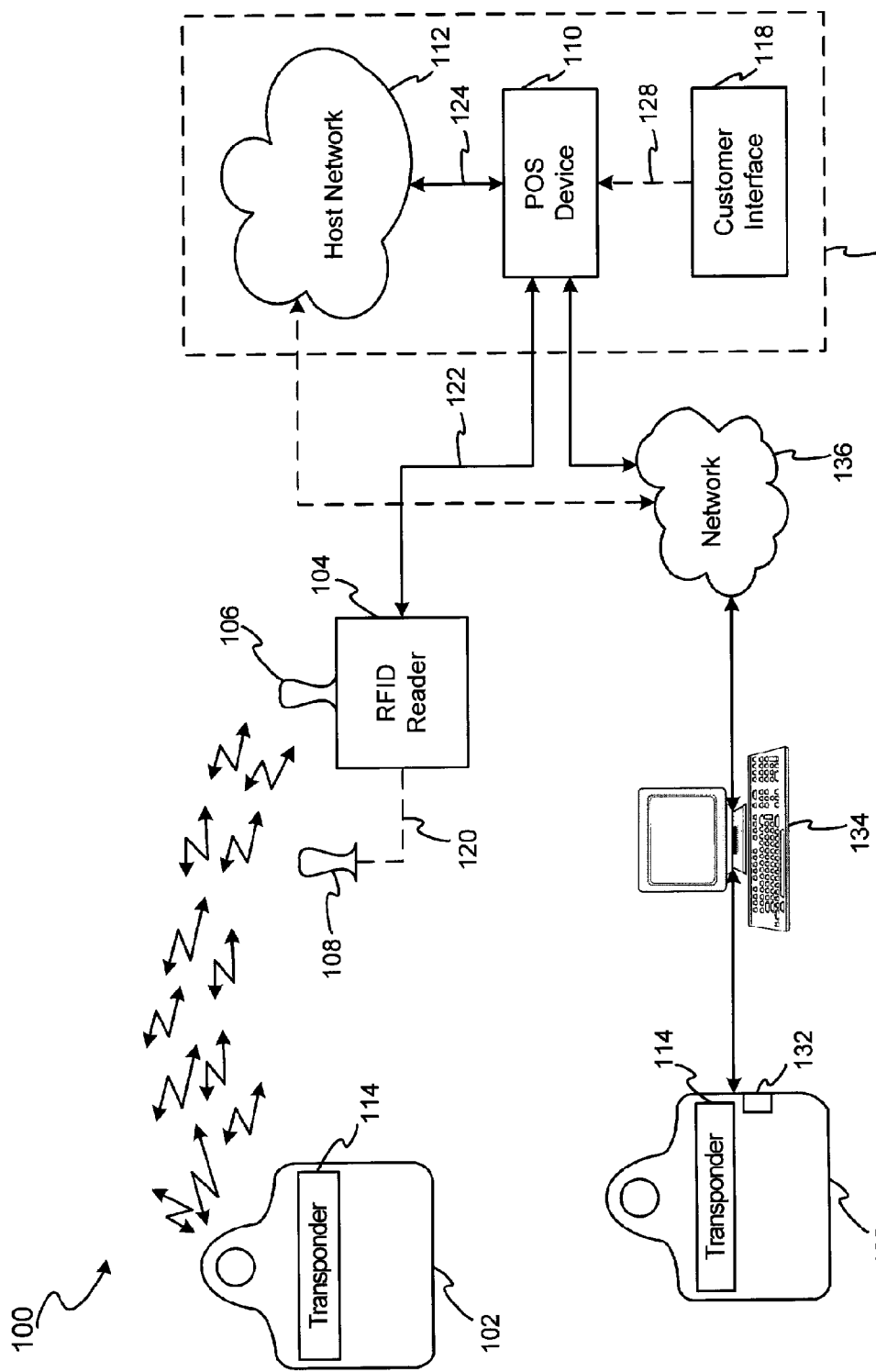
FIG. 1 illustrates an exemplary RF payment device transaction completion system in accordance with the present invention.

As background, the various prior art methods for implementing transactional systems utilizing temporary numbers have failed to satisfy certain customer demands for more secure and confident transactions. Specifically, the prior art systems have typically required, inter alia, (i) additional software to provide registration and transaction processes, (ii) the generation of a separate digital certificate embodying a non-physical online commerce card, (iii) separate activation of the temporary transaction number; or (vi) a deactivation of the temporary number if predefined conditions were not met. In short, previous transaction systems have not sufficiently adapted to real world demands for a more secure and confident transaction system that is readily compatible with existing banking and electronic commerce systems.

The present invention includes a unique system for facilitating transactions that is easily and readily adaptable to existing commercial transaction processing systems. While the system may contemplate upgrades or reconfigurations of existing processing systems, changes to cardholder or merchant systems are not necessarily required by the present invention. For example, the present system may contemplate, but does not require: downloading of software modules; a digitally-based, non-physical commerce card; activation or deactivation of the secondary transaction number; and certain embodiments do not require the existing online customer to separately register for the service. Moreover, the transaction system herein described can be seamlessly integrated into current electronic commerce processes with minimal to no changes to existing systems used by cardholders or merchants.

A "transaction," as defined herein, includes, inter alia, any exchange or delivery of value, exchange or delivery of data, gifting of value or data, etc. The term "transaction" not only contemplates an exchange of goods or services for value from one party to another, but also the gifting of something from one party to another. Additionally, transaction or charge card numbers are account numbers that are used to facilitate any type of transaction.

While an exemplary embodiment of the invention is described in association with a transaction system, the invention contemplates any type of networks or transaction systems, including, for example, unsecure networks, public networks, wireless networks, closed networks, open networks, intranets, extranets, and/or the like.

The transaction system of the present invention may be described herein in terms of functional block components, flow charts, screen shots, optional selections and various processing steps. It should be appreciated that such functional blocks may be realized by any number of hardware and/or software components configured to perform the specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. For a basic introduction of cryptography, please review a text written by Bruce Schneier which is entitled "Applied Cryptography: Protocols, Algorithms, And Source Code In C," published by John Wiley & Sons (second edition, 1995), which is hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development, methods of populating data onto databases and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

It will be appreciated, that many applications of the present invention could be formulated. One skilled in the art will appreciate that a network may include any system for exchanging data or transacting business, such as the Internet, an intranet, an extranet, WAN, LAN, satellite or wireless communications, and/or the like. The cardholder may interact with the card provider's transaction system or a merchant via any input device such as a telephone, keyboard, mouse, kiosk, personal digital assistant, touch screen, voice recognition device, transponder, biometrics device, handheld computer (e.g., Palm Pilot®), cellular phone, web TV, web phone, blue tooth/beaming device and/or the like. Similarly, the invention could be used in conjunction with any type of personal computer, network, computer, workstation, minicomputer, mainframe, or the like, running any operating system such as any version of Windows, Windows NT, Windows2000, Windows 98, Windows 95, MacOS, OS/2, BeOS, Linux, UNIX, MVS, OS, or the like. Moreover, although the invention uses protocols such as TCP/IP to facilitate network communications, it will be readily understood that the invention could also be implemented using IPX, Appletalk, IP-6, NetBIOS, OSI or any number of existing or future protocols. Moreover, the system contemplates the use, sale, exchange, transfer, or any other distribution of any goods, services or information over any network having similar functionality described herein.

The input device may also be a "pervasive computing device," which can be defined as a traditionally non-computerized device that is embedded with a computing unit. Examples can include watches, Internet enabled kitchen appliances, restaurant tables embedded with RF readers, wallets or purses with imbedded transponders, etc.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, flash card memory and/or the like.

Communication between the parties (e.g., transaction account issuer, transaction account user and/or merchant) to the transaction and the system of the present invention may be accomplished through any suitable communication means, such as, for example, a telephone network, intranet, Internet, point-of-interaction device (point-of-sale device, personal digital assistant, cellular phone, kiosk, etc.), online communications, offline communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, decryption, compression, decompression, and/or the like.

The present invention is described below with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Referencing the computer networked aspect of a preferred embodiment of this invention, each participant is equipped with a computing system to facilitate online commerce transactions. The computing units may be connected with each other via a data communication network. The network is a public network and assumed to be insecure and open to eavesdroppers. In the illustrated implementation, the network is embodied as the Internet. In this context, the computers may or may not be connected to the Internet at all times. For instance, the cardholder computer may employ a modem to occasionally connect to the Internet, whereas the card provider computing center might maintain a permanent connection to the Internet. It is noted that the network may be implemented as other types of networks, such as an interactive television (ITV) network.

The merchant computer and the transaction account issuer or provider computing systems may be interconnected via a second network, referred to as a payment network. The payment network represents existing proprietary networks that presently accommodate transactions for credit cards, debit cards, loyalty cards, and other types of financial/banking cards. The payment network is a closed network that is assumed to be secure from eavesdroppers. Examples of the payment network include the American Express®, VisaNet® and the Veriphone® network.

FIG. 1 illustrates an exemplary RFID transaction system 100 in accordance with the present invention, wherein exemplary components for use in completing a fob transaction using travel-related information are depicted. In general, the operation of system 100 may begin when fob 102 may be presented for payment, and may be interrogated by RFID reader 104 or, alternatively, interface 134. Fob 102 and RFID reader 104 may then engage in mutual authentication after which the fob 102 may provide the transponder identification, account identifier and/or travel-related information to the RFID reader 104 which may further provide the information to the merchant system 130 POS device 110.

System 100 may include a fob 102 having a transponder 114 and a RFID reader 104 in RF communication with fob 102. Although the present invention may be described with respect to a fob 102, the invention may not be so limited. Indeed, system 100 may include any device having a transponder which may be configured to communicate with a RFID reader 104 via RF communication. Typical devices may include, for example, a key ring, tag, card, cell phone, hat, shirt, audio entertainment device, wristwatch, clothes (e.g., jackets, raincoats, shoes), or any such form capable of being presented for interrogation. Other suitable devices include pervasive computing devices, such as, for example, devices which are traditionally not computing devices. Typical pervasive devices include Internet-enabled kitchen appliances, restaurant tables embedded with RF readers, wallets or purses embedded with transponders or integrated circuits, etc.

The RFID reader 104 may be configured to communicate using a RFID internal antenna 106. Alternatively, RFID reader 104 may include an external antenna 108 for communications with fob 102, where the external antenna may be made remote to the RFID reader 104 using a suitable cable and/or data link 120. RFID reader 104 may be further in communication with a merchant system 130 via a data link 122. The system 100 may include a transaction completion system including a point-of-interaction device such as, for example, a merchant point-of-sale (POS) device 110 or a computer interface (e.g., user interface) 134. In one exemplary embodiment the transaction completion system 100 may include a merchant system 130 including the POS device 110 in communication with a RFID reader 104 (via data link 122). As described more fully below, the transaction completion system 100 may include the user interface 134 connected to a network 136 and to the transponder via a USB connector 132.

Although the point-of-interaction device may be described herein with respect to a merchant point-of-sale (POS) device, the invention may not be so limited. Indeed, a merchant POS device may be used herein by way of example, and the point-of-interaction device may be any device capable of receiving fob account data. In this regard, the POS may be any point-of-interaction device enabling the user to complete a transaction using a fob 102. POS device 110 may be in further communication with a customer interface 118 (via data link 128) for entering at least a customer's identity verification information. In addition, POS device 110 may be in communication with a merchant host network 112 (via data link 124), an issuer host network, and/or any other access point for processing any transaction request. In this arrangement, information provided by RFID reader 104 may be provided to the POS device 110 of merchant system 130 via data link 122. The POS device 110 may receive the information (and alternatively may receive any identity verifying information from customer interface 118 via data link 128) and provide the information to host system 112 for processing.

A variety of conventional communications media and protocols may be used to connect or place the devices herein in communication. For example, the communications media may be an Internet Service Provider (ISP) configured to facilitate communications over a local loop as may be typically used in connection with standard modem communication, cable modem, dish networks, ISDN, Digital Subscriber Lines (DSL), or any wireless communication media. In addition, the merchant system 130 including the POS device 110 and host network 112 may reside on a local area network 130 which interfaces to a remote network (not shown) for remote authorization of an intended transaction. The merchant system 130 may communicate with the remote network via a leased line, such as a T1, D3 line, or the like. Such communications lines are described in a variety of texts, such as, "Understanding Data Communications," by Gilbert Held, which may be incorporated herein by reference.

An "account number" or "transaction number" as used herein, may include any identifier for a transaction account (e.g., credit, charge debit, checking, savings, reward, loyalty, travel or the like) which may be maintained by a transaction account provider (e.g., payment authorization center) and which may be used to complete a financial transaction. A typical account number (e.g., account data) may be correlated to a credit or debit account, loyalty account, travel or rewards account maintained and serviced by such entities as American Express, Visa and/or MasterCard or the like. For ease in understanding, the present invention may be described with respect to a credit card account. However, it should be noted that the invention may not be so limited and other accounts permitting an exchange of goods and services for an account data value may be contemplated to be within the scope of the present invention.

In addition, the account number (e.g., account data) may be associated with any device, code, or other identifier/indicia suitably configured to allow the customer to interact or communicate with the system, such as, for example, authorization/access code, personal identification number (PIN), Internet code, digital certificate, biometric data, and/or other identification indicia. The account number may be optionally located on a rewards card, loyalty card charge card, credit card, debit card, prepaid card, telephone card, smart card, magnetic stripe card, bar code card, and/or the like. The account number may be distributed and stored in any form of plastic, electronic, audio, magnetic, and/or optical device capable of transmitting or downloading data to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". In a typical example, the first five to seven digits are reserved for processing purposes and identify the issuing bank, card type, etc. In this example, the last sixteenth digit may be used as a sum check for the sixteen-digit number. The intermediary eight-to-ten digits are used to uniquely identify the customer. The account number may be stored as Track 1 and Track 2 data as defined in ISO/IEC 7813, and further may be made unique to fob 102. In one exemplary embodiment, the account number may include a unique fob serial number and user identification number, as well as specific application applets. The account number may be stored in fob 102 inside a database 214, as described more fully below. Database 214 may be configured to store multiple account numbers issued to the fob 102 user by the same or different account providing institutions. Where the account data corresponds to a loyalty or rewards account, the database 214 may be configured to store the attendant loyalty or rewards points data.

Figure 2:
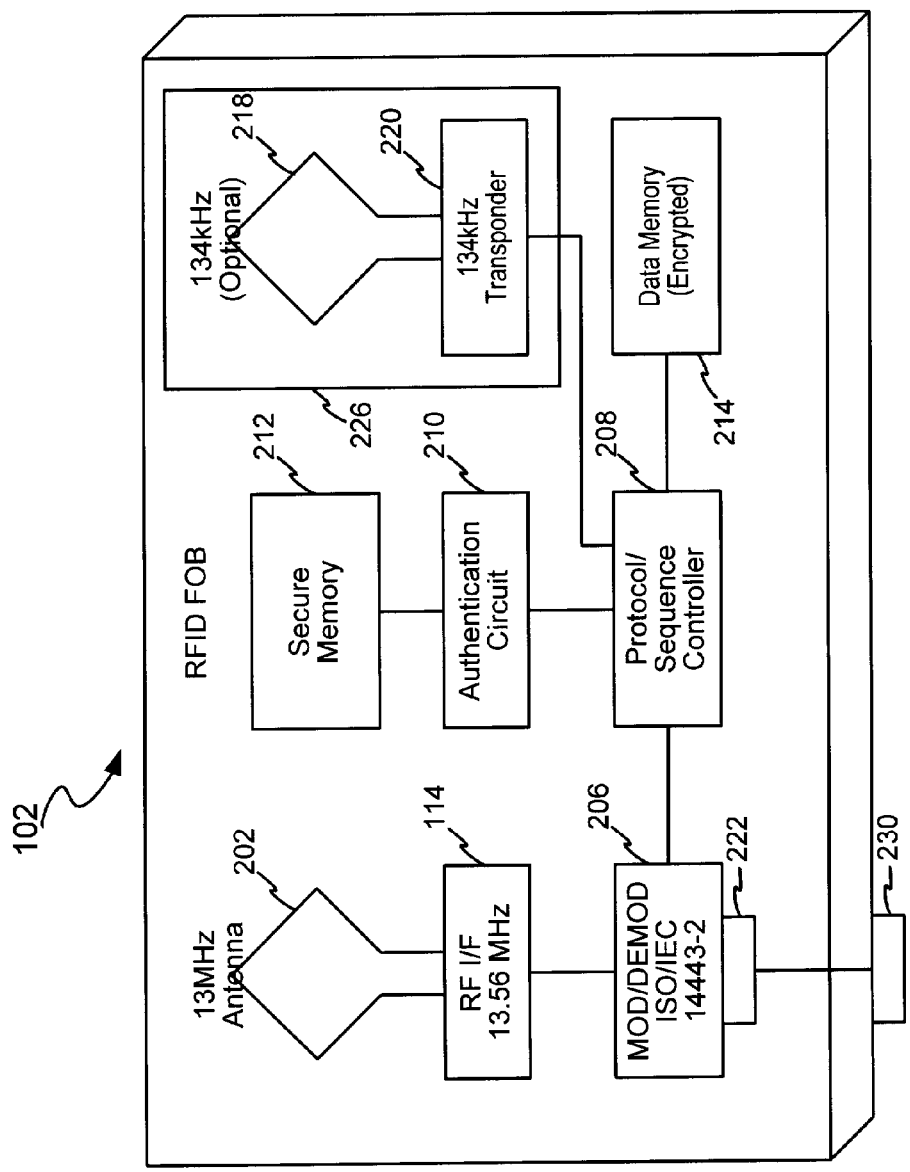
FIG. 2 is a schematic illustration of an exemplary fob in accordance with the present invention.

FIG. 2 illustrates a block diagram of the many functional blocks of an exemplary fob 102 in accordance with the present invention. Fob 102 may be a RFID fob 102 which may be presented by the user to facilitate an exchange of funds or points, etc., for receipt of goods or services. As described herein, by way of example, the fob 102 may be a RFID fob which may be presented for facilitating payment for goods and/or services.

Fob 102 may include an antenna 202 for receiving an interrogation signal from RFID reader 104 via antenna 106 (or alternatively, via external antenna 108). Fob antenna 202 may be in communication with a transponder 114. In one exemplary embodiment, transponder 114 may be a 13.56 MHz transponder compliant with the ISO/IEC 14443 standard, and antenna 202 may be of the 13 MHz variety. The transponder 114 may be in communication with a transponder compatible modulator/demodulator 206 configured to receive the signal from transponder 114 and configured to modulate the signal into a format readable by any later connected circuitry. Further, modulator/demodulator 206 may be configured to format (e.g., demodulate) a signal received from the later connected circuitry in a format compatible with transponder 114 for transmitting to RFID reader 104 via antenna 202. For example, where transponder 114 may be of the 13.56 MHz variety, modulator/demodulator 206 may be ISO/IEC 14443-2 compliant.

Modulator/demodulator 206 may be coupled to a protocol/sequence controller 208 for facilitating control of the authentication of the signal provided by RFID reader 104, and for facilitating control of the sending of the fob 102 account number. In this regard, protocol/sequence controller 208 may be any suitable digital or logic driven circuitry capable of facilitating determination of the sequence of operation for the fob 102 inner-circuitry. For example, protocol/sequence controller 208 may be configured to determine whether the signal provided by the RFID reader 104 may be authenticated, and thereby providing to the RFID reader 104 the account number stored on fob 102.

Protocol/sequence controller 208 may be further in communication with authentication circuitry 210 for facilitating authentication of the signal provided by RFID reader 104. Authentication circuitry may be further in communication with a non-volatile secure memory database 212. Secure memory database 212 may be any suitable elementary file system such as that defined by ISO/IEC 7816-4 or any other elementary file system allowing a lookup of data to be interpreted by the application on the fob. Databases may be organized in any suitable manner, including as data tables or lookup tables. Association of certain data may be accomplished through any data association technique known and practiced in the art. For example, the association may be accomplished either manually or automatically. Association techniques include common techniques such as using a key field in the tables to speed searches, sequential searches through all the tables and files, and sorting records in the file according to a known order to simplify lookup.

The data corresponding to the key field may be used by protocol/sequence controller 208 for data analysis and used for management and control purposes, as well as security purposes. Authentication circuitry may authenticate the signal provided by RFID reader 104 by association of the RFID signal to authentication keys stored on database 212. Encryption circuitry may use keys stored on database 212 to perform encryption and/or decryption of signals sent to or from the RFID reader 104.

In addition, protocol/sequence controller 208 may be in communication with a database 214 for storing at least a fob 102 account data, and a unique fob 102 identification code. Protocol/sequence controller 208 may be configured to retrieve the account number from database 214 as desired. Database 214 may be of the same configuration as database 212 described above. The fob account data and/or unique fob identification code stored on database 214 may be encrypted prior to storage. Thus, where protocol/sequence controller 208 retrieves the account data, and or unique fob identification code from database 214, the account number may be encrypted when being provided to RFID reader 104. Further, the data stored on database 214 may include, for example, an unencrypted unique fob 102 identification code, a user identification, Track 1 and Track 2 data, as well as specific application applets.

In accordance with another exemplary embodiment, the account number may be stored in magnetic stripe format. For example, where the account number may be in magnetic stripe format, the account number portions are governed by the International Standards Organization ISO/IEC 7811, et al. standards, which are hereby incorporated by reference. The standards require the magnetic stripe information to be encoded in three "tracks" (i.e., track 1, track 2, and track 3).

Fob 102 may be configured to respond to multiple interrogation frequency transmissions provided by RFID reader 104. That is, as described more fully below, RFID reader 104 may provide more than one RF interrogation signal. In this case, fob 102 may be configured to respond to the multiple frequencies by including in fob 102 one or more additional RF signal receiving/transmitting units 226. RF signal receiving/transmitting unit 226 may include an antenna 218 and transponder 220 where the antenna 218 and transponder 220 are compatible with at least one of the additional RF signals provided by RFID reader 104. For example, in one exemplary embodiment, fob 102 may include a 134 kHz antenna 218 configured to communicate with a 134 kHz transponder 220. In this exemplary configuration, an ISO/IEC 14443-2 compliant modulator/demodulator may not be required. Instead, the 134 kHz transponder may be configured to communicate directly with the protocol/sequence controller 208 for transmission and receipt of authentication and account number signals as described above.

In another embodiment, fob 102 may further include a universal serial bus (USB) connector 132 for interfacing fob 102 to a user interface 134. User interface 134 may be further in communication with a POS device 110 via a network 136. Network 136 may be the Internet, an intranet, or the like as may be described above with respect to network 112. Further, the user interface 134 may be similar in construction to any conventional input devices and/or computing systems aforementioned for permitting the system user to interact with the system. In one exemplary embodiment, fob 102 may be configured to facilitate online Internet payments. A USB converter 222 may be in communication with a USB connector 132 for facilitating the transfer of information between the modulator/demodulator 206 and USB connector 132. Alternatively, USB converter 222 may be in communication with protocol/sequence controller 208 to facilitate the transfer of information between protocol/sequence controller 208 and USB connector 132.

Where fob 102 includes a USB connector 132, fob 102 may be in communication with, for example, a USB port on user interface 134. The information retrieved from fob 102 may be compatible with credit card and/or smart card technology enabling usage of interactive applications on the Internet. No RFID reader may be required in this embodiment since the connection to POS device 110 may be made using a USB port on user interface 134 and a network 136.

Fob 102 may include means for enabling activation of the fob 102 by the user. In one exemplary embodiment, a switch 230 which may be operated by the user of the fob 102. The switch 230 on fob 102 may be used to selectively or inclusively activate the fob 102 for particular uses. In this context, the term "selectively" may mean that the switch 230 enables the user to place the fob 102 in a particular operational mode. For example, the user may place the fob 102 in a mode for enabling purchase of a good or of a service using a selected account number. Alternatively, the fob may be placed in a mode as such that the fob account number may be provided by USB port 132 (or serial port) only and the fob transponder 114 may be disabled. In addition, the term "inclusively" may mean that the fob 102 may be placed in an operational mode permitting the fob 102 to be responsive to the RF interrogation and interrogation via the USB connector 132. In one particular embodiment, the switch 230 may remain in an OFF position ensuring that one or more applications or accounts associated with the fob 102 are non-reactive to any commands issued by RFID reader 104. As used herein, the OFF position may be termed the "normal" position of the activation switch 230, although other normal positions are contemplated.

In another exemplary embodiment, when the switch 230 may be moved from the OFF position, the fob 102 may be deemed activated by the user. That is, the switch 230 may activate internal circuitry in fob 102 for permitting the fob 102 to be responsive to RF signals (e.g., commands from RFID reader 104). In this way, switch 230 may facilitate control of the active and inactive states of the fob 102. Such control increases the system security by preventing inadvertent or illegal use of the fob 102.

In one exemplary embodiment, switch 230 may be a simple mechanical device in communication with circuitry which may electrically prevent the fob from being powered by a RFID reader. That is, when switch 230 may be in its normal position, switch 230 may provide a short to the fob 102 internal circuitry, preventing fob 102 from being responsive to interrogation by RF or via the USB connector 132. In this arrangement, the switch 230 may be, for example, a "normally closed" (NC) configured switch, which may be electrically connected to the antenna 202 at the interface of the antenna 202 and the transponder 114. The switch 230 may be depressed, which may open the switch 230 fully activating the antenna 202.

In yet another exemplary embodiment, the fob 102 may include a biometric sensor and biometric membrane configured to operate as switch 230 and activate the fob 102 when provided biometric signal from the fob 102 user. Such biometric signal may be the digital reading of a fingerprint, thumbprint, or the like. Typically, where biometric circuitry may be used, the biometric circuitry may be powered by an internal voltage source (e.g., battery). In this case, the switch may not be a simple mechanical device, but a switch which may be powered. In yet another exemplary embodiment, switch 230 may be battery powered though no biometric circuitry may be present in the fob 102.

In yet another embodiment, the switch 230 may be a logic switch. Where switch 230 may be a logic switch the switch 230 control software may be read from the sequence controller 208 to selectively control the activation of the various fob 102 components.

Figure 3:
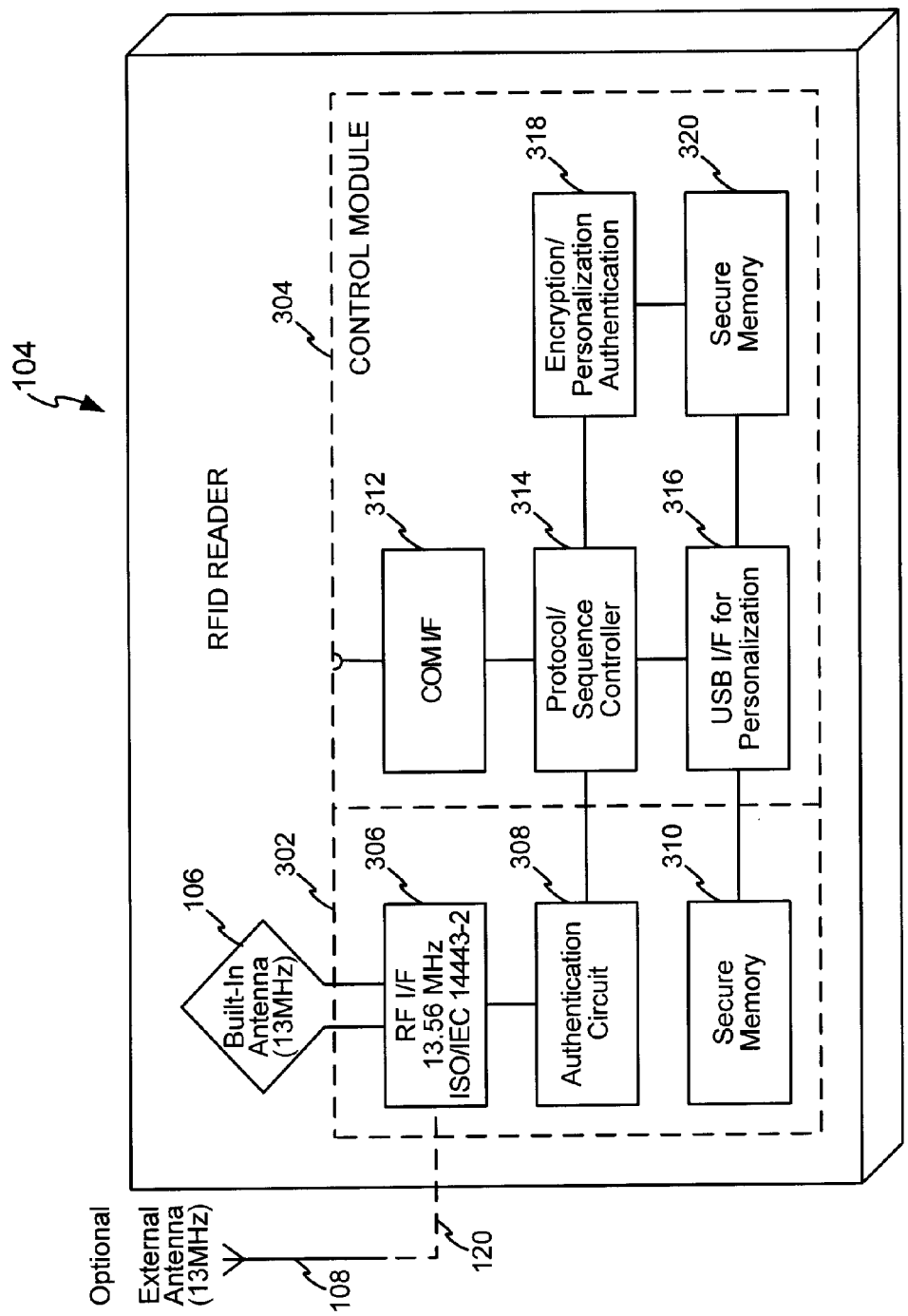
FIG. 3 is a schematic illustration of an exemplary RF reader in accordance with the present invention.

FIG. 3 illustrates an exemplary block diagram of a RFID reader 104 in accordance with an exemplary embodiment of the present invention. RFID reader 104 includes, for example, an antenna 106, 108 coupled to a RF module 302, which may be further coupled to a control module 304. In addition, RFID reader 104 may include an antenna 108 positioned remotely from the RFID reader 104 and coupled to RFID reader 104 via a suitable cable 120, or other wire or wireless connection.

RF module 302 and antenna 106, 108 may be suitably configured to facilitate communication with fob 102. Where fob 102 may be formatted to receive a signal at a particular RF frequency, RF module 302 may be configured to provide an interrogation signal at that same frequency. For example, in one exemplary embodiment, fob 102 may be configured to respond to an interrogation signal of about 13.56 MHz. In this case, RFID antenna 106, 108 may be 13 MHz and may be configured to transmit an interrogation signal of about 13.56 MHz. That is, fob 102 may be configured to include a first and second RF module (e.g., transponder) where the first module may operate using a 134 kHz frequency and the second RF module may operate using a 13.56 MHz frequency. The RFID reader 104 may include two receivers which may operate using the 134 kHz frequency, the 13.56 MHz frequency or both. When the reader 104 may be operating at 134 kHz frequency, only operation with the 134 kHz module on the fob 102 may be possible. When the reader 104 may be operating at the 13.56 MHz frequency, only operation with the 13.56 MHz module on the fob 102 may be possible. Where the reader 104 supports both a 134 kHz frequency and a 13.56 MHz RF module, the fob 102 may receive both signals from the reader 104. In this case, the fob 102 may be configured to prioritize selection of the one or the other frequency and reject the remaining frequency. Alternatively, the reader 104 may receive signals at both frequencies from the fob upon interrogation. In this case, the reader 104 may be configured to prioritize selection of one or the other frequency and reject the remaining frequency.

Further, protocol/sequence controller 314 may include an optional feedback function for notifying the user of the status of a particular transaction. For example, the optional feedback may be in the form of an LED, LED screen and/or other visual display which may be configured to light up or display a static, scrolling, flashing and/or other message and/or signal to inform the fob 102 user that the transaction may be initiated (e.g., fob may be being interrogated), the fob may be valid (e.g., fob may be authenticated), transaction may be being processed (e.g., fob account number may be being read by RFID reader), and/or the transaction may be accepted or denied (e.g., transaction approved or disapproved). Such an optional feedback may or may not be accompanied by an audible indicator (or may present the audible indicator singly) for informing the fob 102 user of the transaction status. The audible feedback may be a simple tone, multiple tones, musical indicator, and/or voice indicator configured to signify when the fob 102 may be being interrogated, the transaction status, or the like.

RFID antenna 106 may be in communication with a transponder 306 for transmitting an interrogation signal and receiving at least one of an authentication request signal and/or an account data from fob 102. Transponder 306 may be of similar description as transponder 114 of FIG. 2. In particular, transponder 306 may be configured to send and/or receive RF signals in a format compatible with antenna 106, 108 in similar manner as was described with respect to fob transponder 114. For example, where transponder 306 may be 13.56 MHz RF rated antenna 202 may be 13.56 MHz compatible. Similarly, where transponder 306 may be ISO/IEC 14443 rated, antenna 106 may be ISO/IEC 14443 compatible.

RF module 302 may include, for example, transponder 306 in communication with authentication circuitry 308 which may be in communication with a secure database 310. Authentication circuitry 308 and database 310 may be of similar description and operation as described with respect to authentication circuitry 210 and secure memory database 212 of FIG. 2. For example, database 310 may store data corresponding to the fob 102 which are authorized to transact business over system 100. Database 310 may additionally store RFID reader 104 identifying information for providing to fob 102 for use in authenticating whether RFID reader 104 may be authorized to be provided the fob account number stored on fob database 214.

Authentication circuitry 308 may be of similar description and operation as authentication circuitry 210. That is, authentication circuitry 308 may be configured to authenticate the signal provided by fob 102 in similar manner that authentication circuitry 210 may be configured to authenticate the signal provided by RFID reader 104. As may be described more fully below, fob 102 and RFID reader 104 engage in mutual authentication. In this context, "mutual authentication" may mean that operation of the system 100 may not take place until fob 102 authenticates the signal from RFID reader 104, and RFID reader 104 authenticates the signal from fob 102.

Figure 4:
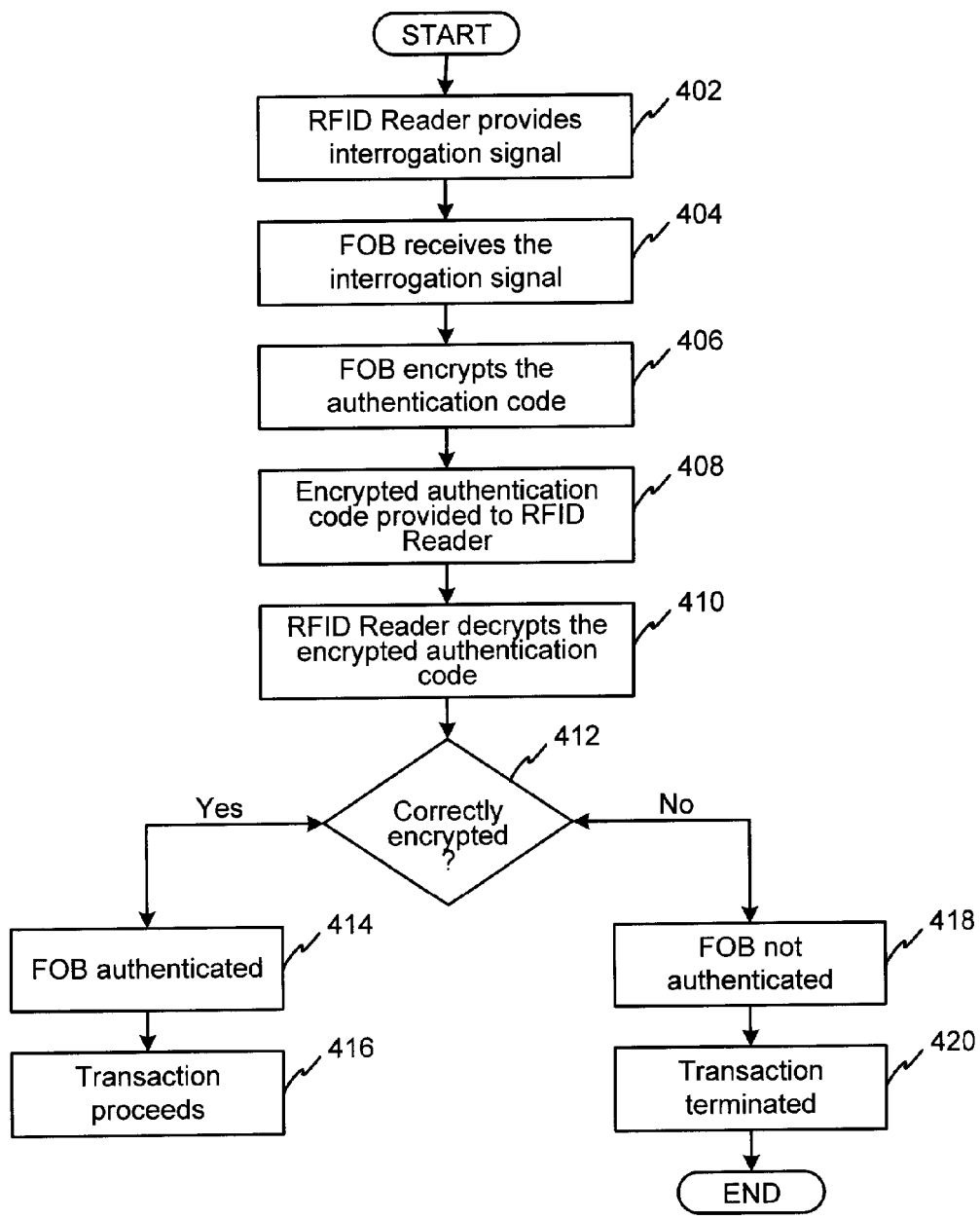
FIG. 4 is an exemplary flow diagram of an exemplary authentication process in accordance with the present invention.

FIG. 4 may be a flowchart of an exemplary authentication process in accordance with the present invention. The authentication process may be depicted as one-sided. That is, the flowchart depicts the process of the RFID reader 104 authenticating the fob 102, although similar steps may be followed in the instance that fob 102 authenticates RFID reader 104.

As noted, database 212 may store security keys for encrypting or decrypting signals received from RFID reader 104. In an exemplary authentication process, where RFID reader 104 may be authenticating fob 102, RFID reader 104 may provide an interrogation signal to fob 102 (step 402). The interrogation signal may include a random code generated by the RFID reader authentication circuit 210, which may be provided to the fob 102 and which may be encrypted using a unique encryption key corresponding to the fob 102 unique identification code. For example, the protocol/sequence controller 314 may provide a command to activate the authentication circuitry 308. Authentication circuitry 308 may provide from database 310 a fob interrogation signal including a random number as a part of the authentication code generated for each authentication signal. The authentication code may be an alphanumeric code which may be recognizable (e.g., readable) by the RFID reader 104 and the fob 102. The authentication code may be provided to the fob 102 via the RFID RF interface 306 and antenna 106 (or alternatively antenna 108).

Fob 102 receives the interrogation signal (step 404). The interrogation signal, including the authorization code, may be received at the RF interface 114 via antenna 202. Once the fob 102 is activated, the interrogation signal, including the authorization code, may be provided to the modulator/demodulator circuit 206 where the signal may be demodulated prior to providing the signal to protocol/sequence controller 208. Protocol/sequence controller 208 may recognize the interrogation signal as a request for authentication of the fob 102, and provide the authentication code to authentication circuit 210. The fob 102 may then encrypt the authentication code (step 406). In particular, encryption may be done by authentication circuit 210, which may receive the authentication code and encrypt the code prior to providing the encrypted authentication code to protocol/sequence controller 208. Fob 102 may then provide the encrypted authentication code to the RFID reader 104 (step 408). That is, the encrypted authentication code may be provided to the RFID reader 104 via modulator/demodulator circuit 206, RF interface 114 (e.g., transponder 114) and antenna 202.

RFID reader 104 may then receive the encrypted authentication code and decrypt it (step 410). That is, the encrypted authentication code may be received at antenna 106, 108 and RF interface 306 and may be provided to authentication circuit 308. Authentication circuit 308 may be provided a security authentication key (e.g., transponder system decryption key) from database 310. The authentication circuit may use the authentication key to decrypt (e.g., unlock) the encrypted authorization code. The authentication key may be provided to the authentication circuit based on the fob 102 unique identification code. For example, the encrypted authentication code may be provided along with the unique fob 102 identification code. The authentication circuit may receive the fob 102 unique identification code and retrieve from the database 310 a transponder system decryption key correlative to the unique fob 102 identification code for use in decrypting the encrypted authentication code.

Once the authentication code may be decrypted, the decrypted authentication code may be compared to the authentication code provided by the RFID reader 104 at step 402 (step 412) to verify its authenticity. If the decrypted authorization code may be not readable (e.g., recognizable) by the authentication circuit 308, the fob 102 may be deemed to be unauthorized (e.g., unverified) (step 418) and the operation of system 100 may be terminated (step 420). Contrarily, if the decrypted authorization code may be recognizable (e.g., verified) by the fob 102, the decrypted authorization code may be deemed to be authenticated (step 414), and the transaction may be allowed to proceed (step 416). In one particular embodiment, the preceding transaction may mean that the fob 102 may authenticate the RFID reader 104, although, it should be apparent that the RFID reader 104 may authenticate the fob 102 prior to the fob 102 authenticating the RFID reader 104.

It should be noted that in an exemplary verification process, the authorization circuit 308 may determine whether the unlocked authorization code may be identical to the authorization code provided in step 402. If the codes are not identical then the fob 102 may be not authorized to access system 100. Although, the verification process may be described with respect to identicality, identicality may be not required. For example, authentication circuit 308 may verify the decrypted code through any protocol, steps, or process for determining whether the decrypted code corresponds to an authorized fob 102.

Figure 5:
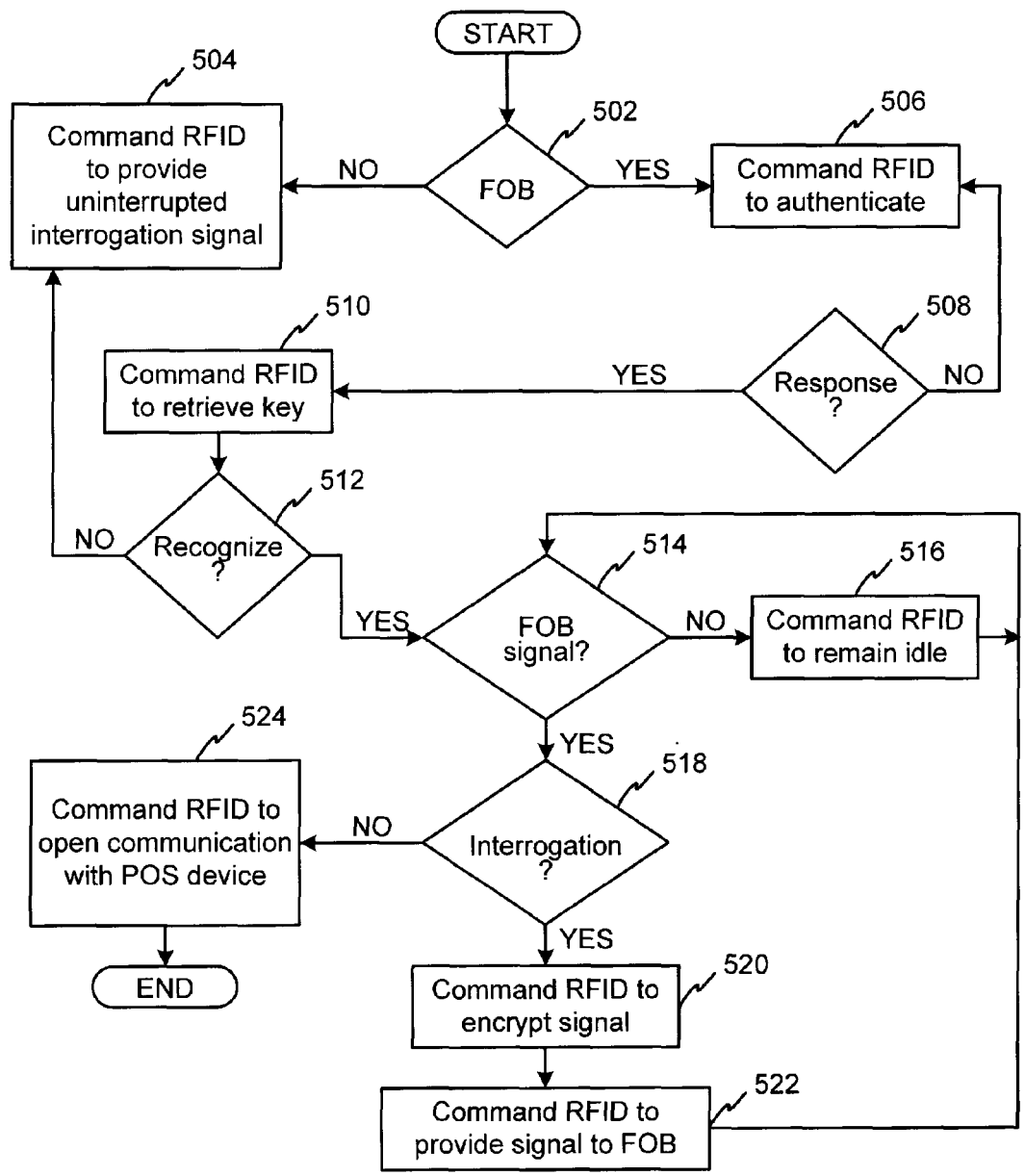
FIG. 5 is an exemplary flow diagram of an exemplary decision process for a protocol/sequence controller in accordance with the present invention.

Authentication circuitry 308 may additionally be in communication with a protocol/sequence controller 314 of similar operation and description as protocol/sequence controller 208 of FIG. 2. That is, protocol/sequence controller 314 may be configured to determine the order of operation of the RFID reader 104 components. For example, FIG. 5 illustrates an exemplary decision process under which protocol/sequence controller 314 may operate. Protocol/sequence controller 314 may command the different components of RFID reader 104 based on whether a fob 102 may be present (step 502). For example, if a fob 102 may not be present, then protocol/sequence controller 314 may command the RFID reader 104 to provide an uninterrupted interrogation signal (step 504). That is, the protocol/sequence controller may command the authentication circuit 308 to provide an uninterrupted interrogation signal until the presence of a fob 102 may be realized. If a fob 102 may be present, the protocol/sequence controller 314 may command the RFID reader 104 to authenticate the fob 102 (step 506).

As noted above, authentication may mean that the protocol/sequence controller 314 may command the authentication circuit 308 to provide fob 102 with an authorization code. If a response is received from fob 102, protocol/sequence controller 314 may determine if the response may be a response to the RFID reader 104 provided authentication code, or if the response may be a signal requiring authentication (step 508). If the signal requires authentication, then the protocol/sequence controller 314 may activate the authentication circuit as described above (step 506). On the other hand, if the fob 102 signal may be a response to the provided authentication code, then the protocol/sequence controller 314 may command the RFID reader 104 to retrieve the appropriate security key for enabling recognition of the signal (step 510). That is, the protocol/sequence controller 314 may command the authentication circuit 308 to retrieve from database 310 a security key (e.g., transponder system decryption key), unlock the signal, and compare the signal to the signal provided by the RFID reader 104 in the authentication process (e.g., step 506). If the signal may be recognized, the protocol/sequence controller 314 may determine that the fob 102 may be authorized to access the system 100. If the signal may be not recognized, then the fob 102 may be considered not authorized. In which case, the protocol/sequence controller 314 may command the RFID reader protocol/sequence controller 314 to interrogate for authorized fobs (step 512).

Once the protocol/sequence controller determines that the fob 102 may be authorized, the protocol/sequence controller 314 may seek to determine if additional signals are being sent by fob 102 (step 514). If no additional signal may be provided by fob 102, then the protocol/sequence controller 314 may command all the components of RFID reader 104 to remain idle until such time as a signal may be provided (step 516). Contrarily, where an additional fob 102 signal may be provided, the protocol/sequence controller 314 may determine if the fob 102 may be requesting access to the merchant point-of-sale terminal 110 (e.g., POS device) or if the fob 102 may be attempting to interrogate the RFID reader 104 for return (e.g., mutual) authorization (step 518). Where the fob 102 may be requesting access to a merchant POS device 110, the protocol/sequence controller 314 may command the RFID reader 104 to open communications with the POS device 110 (step 524). In particular, the protocol/sequence controller 314 may command the POS device 110 communications interface 312 to become active, permitting transfer of data between the RFID reader 104 and the merchant POS device 110.

On the other hand, with reference to FIG. 3, if the protocol/sequence controller 314 determines that the fob 102 signal may be a mutual interrogation signal, then the protocol/sequence controller 314 may command the RFID reader 104 to encrypt the signal (step 520). The protocol/sequence controller 314 may command the encryption authentication circuit 318 to retrieve from database 320 the appropriate encryption key in response to the fob 102 mutual interrogation signal. The protocol/sequence controller 314 may then command the RFID reader 104 to provide the encrypted mutual interrogation signal to the fob 102 (step 522). The protocol/sequence controller 314 may command the authentication circuit 318 to provide an encrypted mutual interrogation signal for the fob 102 to mutually authenticate. Fob 102 may then receive the encrypted mutual interrogation signal and retrieve from authentication circuitry 210 a RFID reader 104 decryption key.

Although an exemplary decision process of protocol/sequence controller 314 may be described, it should be understood that a similar decision process may be undertaken by protocol/sequence controller 208 in controlling the components of fob 102. Indeed, as described above, protocol/sequence controller 314 may have similar operation and design as protocol/sequence controller 208. In addition, to the above, protocol/sequence controllers 208 and 314 may incorporate in the decision process appropriate commands for enabling USB interfaces 222 and 316, when the corresponding device may be so connected.

Encryption/decryption component 318 may be further in communication with a secure account number database 320 which stores the security keys necessary for decrypting the encrypted fob account number. Upon appropriate request from protocol/sequence controller 314, encryption/decryption component (e.g., circuitry 318) may retrieve the appropriate security key, decrypt the fob account number and forward the decrypted account number to protocol sequence controller 314 in any format readable by any later connected POS device 110. In one exemplary embodiment, the account number may be forwarded in a conventional magnetic stripe format compatible with the ISO/IEC 7813 standard. Upon receiving the account number in magnetic stripe format, protocol/sequence controller 314 may forward the account number to POS device 110 via a communications interface 312, as best shown in FIG. 1. POS device 110 may receive the decrypted account number and forward the magnetic stripe formatted account number to a merchant network 112 for processing under the merchant's business as usual standard. In this way, the present invention eliminates the need for a third-party server. Further, where the POS device 110 receives a response from network 112 (e.g., transaction authorized or denied), protocol/sequence controller 314 may provide the network response to the RF module 302 for optically and/or audibly communicating the response to the fob 102 user.

RFID reader 104 may additionally include a USB interface 316, in communication with the protocol/sequence controller 314. In one embodiment, the USB interface may be a RS22 serial data interface. Alternatively, the RFID reader 104 may include a serial interface such as, for example, a RS232 interface in communication with the protocol/sequence controller 314. The USB connector 316 may be in communication with a personalization system (not shown) for initializing RFID reader 104 to system 100 application parameters. That is, prior to operation of system 100, RFID reader 104 may be in communication with personalization system 116 for populating database 310 with a listing of security keys belonging to authorized fobs 102, and for populating database 320 with the security keys to decrypt the fob 102 account numbers placing the account numbers in ISO/IEC 7813 format. In this way, RFID reader 104 may be populated with a unique identifier (e.g., serial number) which may be used by fob authentication circuitry 210 to determine if RFID reader 104 may be authorized to receive a fob 102 encrypted account number.

Figure 6:
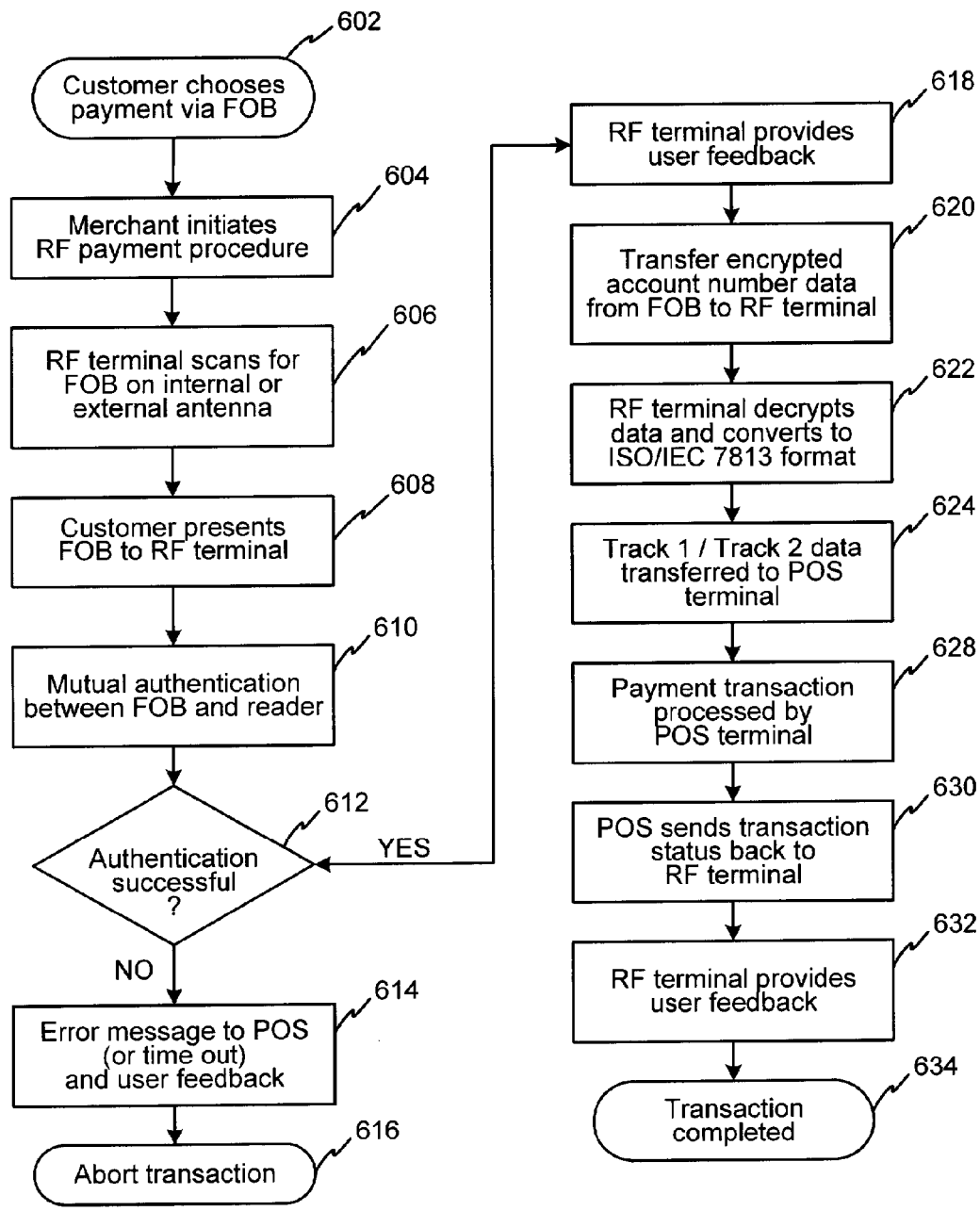
FIG. 6 is a flow diagram of an exemplary payment/transaction process in accordance with the present invention.

FIG. 6 illustrates an exemplary flow diagram for the operation of system 100 wherein the fob holders' account number is used to complete a transaction. The operation may be understood with reference to FIG. 1, which depicts the elements of system 100 which may be used in an exemplary transaction. The process may be initiated when a customer desires to present a fob 102 for payment (step 602). Upon presentation of the fob 102, the merchant initiates the RF payment procedure via an RFID reader 104 (step 604). In particular, the RFID reader sends out an interrogation signal to scan for the presence of fob 102 (step 606). The RF signal may be provided via the RFID reader antenna 106 or optionally via an external antenna 108. The customer then may present the fob 102 for payment (step 608) and the fob 102 may be activated by the RF interrogation signal provided.

The fob 102 and the RFID reader 104 may then engage in mutual authentication (step 610). Where the mutual authentication may be unsuccessful, an error message may be provided to the customer via the RFID optical and/or audible indicator (step 614) and the transaction may be aborted (step 616). Where the mutual authentication may be successful (step 612), the RFID reader 104 may provide the customer with an appropriate optical and/or audible message (e.g., "transaction processing" or "wait") (step 618). The fob protocol/sequence controller 208 may then retrieve from database 214 an encrypted fob account number and provide the encrypted account number to the RFID reader 104 (step 620).

The RFID reader 104 may then decrypt the account number and convert the account number into magnetic stripe (ISO/IEC 7813) format (step 622) and provide the unencrypted account number to the merchant system 130 (step 628). In particular, the account number may be provided to the POS device 110 for transmission to the merchant network 112 for processing under known business transaction standards. In one exemplary embodiment, the account number may be forwarded to POS device 110 in Track 1/Track 2 format (step 624). The POS device 110 may then send an optical and/or audible transaction status message to the RFID reader 104 (step 630) for communication to the customer (step 632), and the transaction is completed under business as usual standards (step 634).

It should be noted that the transaction account associated with the fob 102 may include a restriction, such as, for example, a per purchase spending limit, a time of day use, geographic location, type or nature of eCommerce cites, a day of week use, certain merchant use and/or the like, wherein an additional verification may be required when using the fob outside of the restriction. The restrictions may be personally assigned by the fob 102 user, or the account provider. For example, in one exemplary embodiment, the account may be established such that purchases above $X (i.e., the spending limit) must be verified by the customer. Such verification may be provided using a suitable personal identification number (PIN) which may be recognized by the RFID reader 104 or a payment authorization center (not shown) as being unique to the fob 102 holder (e.g., customer) and the correlative fob 102 transaction account number. Where the requested purchase may be above the established per purchase spending limit, the customer may be required to provide, for example, a PIN, biometric sample and/or similar secondary verification to complete the transaction. The restrictions may also be restricted by other user parameters, such as, geographic region (fob 102 may only be used in a certain geographic region), product type (fob 102 may only be used to purchase a certain product type), or eCommerce use only (fob 102) may be used only in eCommerce transactions).

Where a verification PIN may be used as secondary verification the verification PIN may be checked for accuracy against a corroborating PIN which correlates to the fob 102 transaction account number and/or the fob user's travel-related information. The corroborating PIN may be stored locally (e.g., on the fob 102, or on the RFID reader 104) or may be stored on a database (not shown) at the payment authorization center. The payment authorization center database may be any database maintained and operated by the fob 102 transaction account provider.

The verification PIN may be provided to the POS device 110 using a conventional merchant (e.g., POS) PIN key pad 118 in communication with the POS device 110 as shown in FIG. 1, or a RFID keypad in communication with the RFID reader 104. PIN keypad may be in communication with the POS device 110 (or alternatively, RFID reader 104) using any conventional data link described above. Upon receiving the verification PIN, the RFID reader 104 may seek to match the PIN to the corroborating PIN stored on the RFID reader 104 at database 310 or 320. Alternatively, the verification PIN may be provided to a payment authorization center to determine whether the PIN matches the PIN stored on the payment authorization center database which correlates to the fob 102 account. If a match may be made, the purchase may no longer be restricted, and the transaction may be allowed to be completed.

In another exemplary embodiment of the present invention, system 100 may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof. While the example discussed herein may include a particular biometric system or sample, the invention contemplates any of the biometrics discussed herein in any of the embodiments.

The biometric system may be configured as a security system and may include a registration procedure in which a user of a transaction instrument (e.g., fob 102) proffers a sample of his fingerprints, DNA, retinal scan, voice, and/or other biometric sample to an authorized sample receiver (ASR). An ASR may include a local database, a remote database, a portable storage device, a host system, an issuer system, a merchant system, a fob issuer system, an employer, a financial institution, a non-financial institution, a loyalty point provider, a company, the military, the government, a school, a travel entity, a transportation authority, a security company, and/or any other system or entity that is authorized to receive and store biometric samples and associate the samples with specific biometric databases and/or transaction instruments (e.g., fobs 102). As used herein, a user of a fob, fob user, or any similar phrase may include the person or device holding or in possession of the fob, or it may include any person or device that accompanies or authorizes the fob owner to use the fob. By proffering one or more biometric samples, a biometric may be scanned by at least one of a retinal scan, iris scan, fingerprint scan, hand print scan, hand geometry scan, voice print scan, vascular scan, facial and/or ear scan, signature scan, keystroke scan, olfactory scan, auditory emissions scan, DNA scan, and/or any other type of scan to obtain a biometric sample.

Upon scanning the sample, the system may submit the scanned sample to the ASR in portions during the scan, upon completing the scan or in batch mode after a certain time period. The scanned sample may include a hardcopy (e.g., photograph), digital representation, an analog version or any other configuration for transmitting the sample. The ASR receives the sample and the ASR may also receive copies of a fob user's biometric data along with the sample or at a different time (or within a different data packet) from receiving the sample.

The ASR and/or fob user 102 may store the sample in digital and/or any storage medium known in the art and correlate and/or register the sample with fob user information. By storing the sample in digital format, the ASR may digitize any information contained in one of the biometric scans described herein. By storing the sample in any storage medium, the ASR may print and/or store any biometric sample. Hardcopy storage may be desirable for back-up and archival purposes. As used herein, registered samples may include samples that have been proffered, stored and associated with user information.

The biometric sample may also be associated with user information. The sample may be associated with user information at any step in the process such as, for example, prior to submission, during submission and/or after submission. In one embodiment, the user may input a PIN number or zip code into the POS terminal, then scan the biometric to create the biometric sample. The local POS system may associate the biometric sample data with the PIN and zip code, then transmit the entire packet of information to the ASR. In another embodiment, the POS may facilitate transmitting the sample to an ASR, and during the transmission, the sample may be transmitted through a third system which adds personal information to the sample.

The information associated with the biometric sample may include any information such as, for example, fob user information, fob 102 information, fob 102 identifier information, fob 102 vender information, fob 102 operability information, and/or fob 102 manufacturing information. Fob 102 information is not limited to transponder information and may include information related to any transaction instrument such as smart cards, credit cards, debit cards, merchant-specific cards, loyalty point cards, cash accounts and any other transaction instruments and/or accounts. The fob user information may also contain information about the user including personal information—such as name, address, and contact details; financial information—such as one or more financial accounts associated with the fob user; loyalty point information—such as one or more loyalty point accounts (e.g., airline miles, charge card loyalty points, frequent diner points) associated with the fob user; and/or non-financial information—such as employee information, employer information, medical information, family information, and/or other information that may be used in accordance with a fob user.

For example, fob user may have previously associated a credit card account, a debit card account, and a frequent flier account with his biometric sample which is stored at an ASR. Later, when fob user desires to purchase groceries, fob user may submit his biometric sample while using fob 102 for the purchase at a POS. The POS may facilitate sending the biometric sample to the ASR such that the ASR authorizes the biometric sample and checks a look-up table in the ASR database to determine if any information is associated with the sample. If information (e.g., financial accounts) is associated with the sample, the ASR may transmit the information to the POS terminal. The POS terminal may then present fob user with a list of the three accounts associated with the biometric sample. Fob user and/or a merchant may then choose one of the accounts in order to continue and finalize the transaction.

The ASR and/or fob user may associate a specific fob 102 identifier with the biometric sample by any method known in the art for associating an identifier (e.g., through the use of software, hardware and/or manual entry.) The ASR may additionally verify the fob user and/or fob 102 by using one or more forms of the user's secondary identification. For example, the ASR may verify the fob user by matching the fob information to information retrieved from scanning information from a fob user's driver's license. The ASR may verify fob 102 by contacting the vendor of fob 102 to confirm that fob 102 was issued to a specific fob user. In another embodiment, the ASR may activate fob 102 during the registration procedure to confirm that the fob 102 transponder identifier and other information is properly associated with the fob user and the fob user's specific biometric samples. The ASR may additionally employ one or more verification methods to confirm that the biometric sample belongs to the user, such as, for example, the ASR may request from the user demographic information, further biometric samples and/or any other information. As used herein, "confirm", "confirmation" or any similar term includes verifying or substantially verifying the accuracy, existence, non-existence, corroboration, and/or the like of the information, component, or any portion thereof. The ASR may additionally employ one or more additional processing methods in order to facilitate association of a biometric sample. As used herein, the term processing may include scanning, detecting, associating, digitizing, printing, comparing, storing, encrypting, decrypting, and/or verifying a biometric and/or a biometric sample, or any portion thereof.

Upon association, authentication and/or verification of the biometric sample and fob 102, the system may store the sample and fob 102 identifier in one or more databases on and/or in communication with system 100 via a network, server, computer, or any other means of communicating as described herein. The database(s) may be any type of database described herein. For example, a biometric sample stored on fob 102 may be stored in database 212. The database (s) may be located at or operated by any of the entities discussed herein such as, for example, the ASR and/or by a third-party biometric database operator.

The system may further protect the samples by providing additional security with the sample. The security may include, for example, encryption, decryption, security keys, digital certificates, firewalls and/or any other security methods known in the art and discussed herein. One or more security vendors may utilize the security methods to store and/or access the biometric samples. The present invention anticipates that storage of the biometric samples may be such that a sample is first encrypted and/or stored under a security procedure, such that the sample may only be accessed by a vendor with the proper level of access or security which corresponds to or provides access to the stored sample. The samples may be accessible by certain vendors such as, for example, fob 102 transaction account provider system, an issuer system, a merchant system, a fob issuer system, an employer, a financial institution, a non-financial institution, a loyalty-point provider, a company, the military, the government, a school, a travel entity, a transportation authority, and/or a security company.

Figure 7:
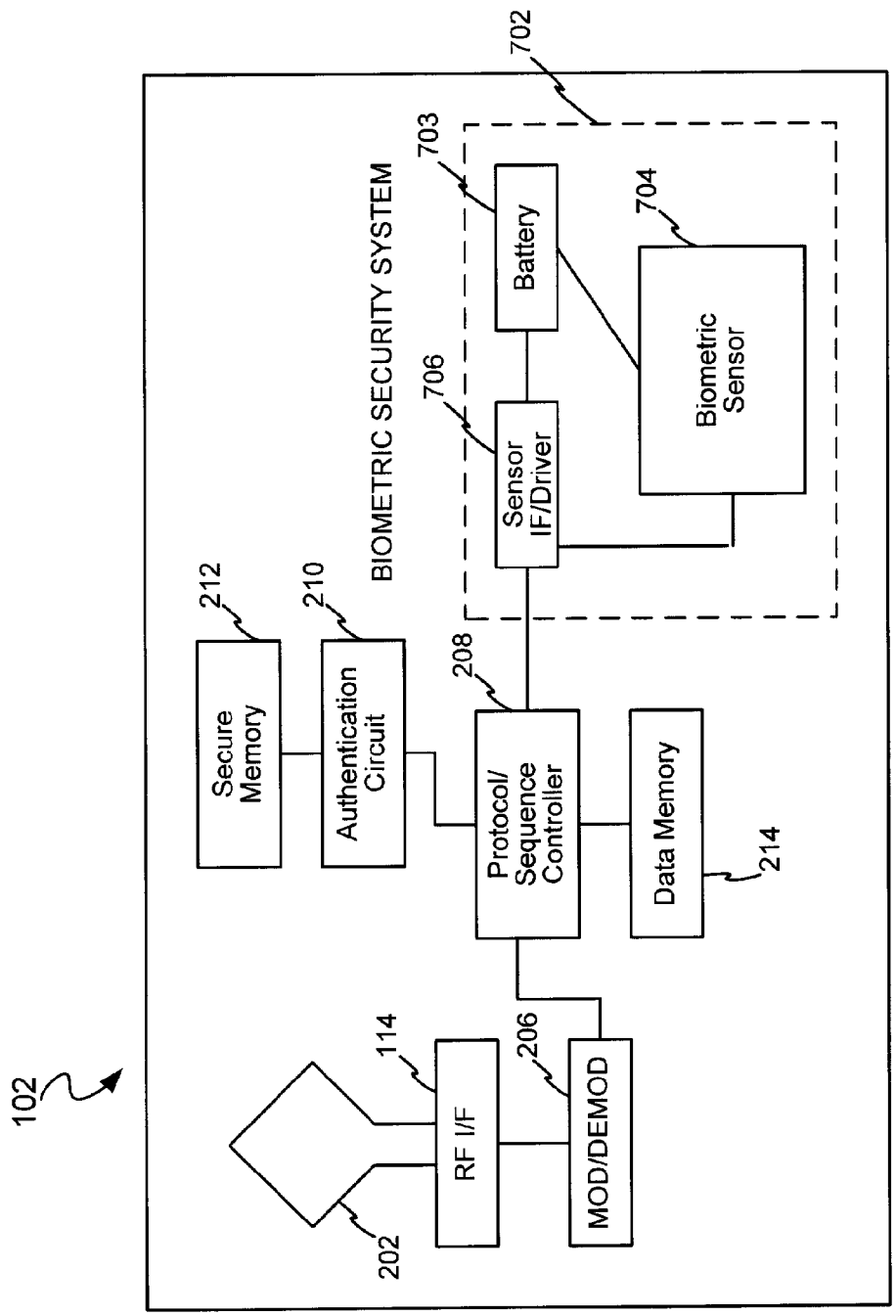
FIG. 7 is another schematic illustration of an exemplary fob payment device in accordance with the present invention.

The fob 102 of the invention may include a particular security system wherein the security system incorporates a particular biometric system. As shown in FIG. 7, fob 102 may include a biometric security system 702 configured for facilitating biometric security using, for example, fingerprint samples. As used herein, fingerprint samples may include samples of one or more fingerprints, thumbprints, palmprints, footprints, and/or any portion thereof. Biometric security system 702 may include a biometric sensor 704 which may be configured with a sensor and/or other hardware and/or software for acquiring and/or processing the biometric data from the person such as, for example, optical scanning, capacitance scanning, or otherwise sensing the portion of fob user. In one embodiment, biometric sensor 704 of the security system 702 may scan a finger of a fob user in order to acquire his fingerprint characteristics into fob 102. Biometric sensor 704 may be in communication with a sensor interface/driver 706 such that sensor interface 706 receives the fingerprint information and transmits a signal to controller 208 to facilitate activating the operation of fob 102. A power source (e.g., battery 703) may be in communication with biometric sensor 704 and sensor interface 706 to provide the desired power for operation of the biometric security system components.

In one exemplary application of fob 102 incorporating biometric security system 702, the user may place his finger on the biometric sensor to initiate the mutual authentication process between fob 102 and RFID reader 104, and/or to provide verification of the user's identity. Fob 102 may digitize the fingerprint and compare it against a digitized fingerprint stored in a database (e.g., security database 212) included on fob 102. The fingerprint information may additionally be compared with information from one or more third-party databases communicating with fob 102 through any communication software and/or hardware, including for example, RFID reader 104, a USB connection, a wireless connection, a computer, a network and/or any other means for communicating. This transfer of information may include use of encryption, decryption, security keys, digital certificates and/or other security devices to confirm the security of the sample. Fob 102 may additionally communicate with third-party databases to facilitate a comparison between fob 102 identifier and other fob identifiers stored with the biometric samples. As used herein, compare, comparison and similar terms may include determining similarities, differences, existence of elements, non-existence of elements and/or the like.

Protocol/sequence controller 208 may facilitate the local comparison to authenticate the biometric and authentication circuit 210 may validate the information. Any of the embodiments may alternatively or additionally include remote comparisons performed or controlled by one or more third-party security vendors. One or more comparison techniques and/or technologies may be used for comparisons. For example, for fingerprint comparisons, protocol/sequence controller 208 may utilize an existing database to compare fingerprint minutia such as, for example, ridge endings, bifurcation, lakes or enclosures, short ridges, dots, spurs and crossovers, pore size and location, Henry System categories such as loops, whorls, and arches, and/or any other method known in the art for fingerprint comparisons.

Fob 102 may additionally be configured with secondary security procedures to confirm that fake biometric samples are not being used. For example, to detect the use of fake fingers, fob 102 may be further configured to measure blood flow, to check for correctly aligned ridges at the edges of the fingers, and/or any other secondary procedure to reduce biometric security fraud. Other security procedures for ensuring the authenticity of biometric samples may include monitoring pupil dilation for retinal and/or iris scans, pressure sensors, blinking sensors, human motion sensors, body heat sensors and/or any other procedures known in the art for authenticating the authenticity of biometric samples.

After verifying the biometric information, fob 102 and RFID reader 104 may begin mutual authentication, and the transaction may proceed accordingly. However, the invention contemplates that the verification of biometric information may occur at any point in the transaction such as, for example, after the mutual authentication. At any point in the transaction, the system may additionally request fob user to enter a PIN and/or other identifier associated with the transaction account and/or biometric sample to provide further verification of fob user's identification. As part of the transaction, fob user payor may be requested to select from one of the financial accounts, loyalty accounts, credit accounts, debit account, and/or other accounts associated with the biometric sample. The user may be presented with a list of account options on a display associated with RFID reader 104, fob 102, a third-party security device and/or any other financial or transaction device associated with a transaction. In another embodiment, a payee may select one of the accounts. For example, a department store payee may manually and/or automatically select a department store issued account, if available, for a transaction. For more information on the use of biometrics, see U.S. patent application Ser. No. 10/708,822, titled "SYSTEM FOR BIOMETRIC SECURITY USING A FOB," filed Mar. 26, 2004; U.S. patent application Ser. No. 10/708,823, titled "METHOD FOR BIOMETRIC SECURITY USING A TRANSPONDER," filed Mar. 26, 2004; U.S. patent application Ser. No. 10/708,823, titled "METHOD FOR BIOMETRIC SECURITY USING A TRANSPONDER," filed Mar. 26, 2004; U.S. patent application Ser. No. 10/708,824, titled "METHOD FOR BIOMETRIC SECURITY USING A TRANSPONDER-READER," filed Mar. 26, 2004; U.S. patent application Ser. No. 10/708,825, titled "METHOD AND SYSTEM FOR FINGERPRINT BIOMETRICS ON A FOB," filed Mar. 26, 2004; U.S. patent application Ser. No. 10/708,826, titled "METHOD AND SYSTEM FOR FACIAL RECOGNITION BIOMETRICS ON A FOB," filed Mar. 26, 2004; U.S. patent application Ser. No. 10/708,827, titled "METHOD AND SYSTEM FOR VOICE RECOGNITION BIOMETRICS ON A FOB," filed Mar. 26, 2004; U.S. patent application Ser. No. 10/708,828, titled "METHOD AND SYSTEM FOR SIGNATURE RECOGNITION BIOMETRICS ON A FOB" filed Mar. 26, 2004; U.S. patent application Ser. No. 10/708,829, titled "METHOD AND SYSTEM FOR VASCULAR PATTERN RECOGNITION BIOMETRICS ON A FOB" filed Mar. 26, 2004; U.S. patent application Ser. No. 10/708,830, titled "METHOD AND SYSTEM FOR DNA RECOGNITION BIOMETRICS ON A FOB" filed Mar. 26, 2004; U.S. patent application Ser. No. 10/708,831, titled "METHOD AND SYSTEM FOR HAND GEOMETRY RECOGNITION BIOMETRICS ON A FOB" filed Mar. 26, 2004; U.S. patent application Ser. No. 10/708,832, titled "METHOD AND SYSTEM FOR AUDITORY EMISSIONS RECOGNITION BIOMETRICS ON A FOB" filed Mar. 26, 2004; U.S. patent application Ser. No. 10/708,833, titled "METHOD AND SYSTEM FOR SMELLPRINT RECOGNITION BIOMETRICS ON A FOB" filed Mar. 26, 2004; U.S. patent application Ser. No. 10/708,834, titled "METHOD AND SYSTEM FOR KEYSTROKE SCAN RECOGNITION BIOMETRICS ON A FOB" filed Mar. 26, 2004; U.S. patent application Ser. No. 10/708,835, titled "METHOD AND SYSTEM FOR IRIS SCAN RECOGNITION BIOMETRICS ON A FOB" filed Mar. 26, 2004; U.S. patent application Ser. No. 10/708,836, titled "METHOD AND SYSTEM FOR RETINAL SCAN RECOGNITION BIOMETRICS ON A FOB" filed Mar. 26, 2004; U.S. patent application Ser. No. 10/708,837, titled "SYSTEM AND METHOD FOR PROFFERING MULTIPLE BIOMETRICS FOR USE WITH A FOB" filed Mar. 26, 2004; U.S. patent application Ser. No. 10/708,838, titled "SYSTEM FOR REGISTERING A BIOMETRIC FOR USE WITH A TRANSPONDER" filed Mar. 26, 2004; U.S. patent application Ser. No. 10/708,839, titled "METHOD FOR REGISTERING BIOMETRIC FOR USE WITH A FOB" filed Mar. 26, 2004; U.S. patent application Ser. No. 10/708,840, titled "METHOD FOR USING A SENSOR REGISTER A BIOMETRIC FOR USE WITH A TRANSPONDER-READER SYSTEM" filed Mar. 26, 2004; U.S. patent application Ser. No. 10/708,841, titled "BIOMETRIC SAFEGUARD FOR USE WITH A FOB" filed Mar. 26, 2004; all of which are herein incorporated by reference.

Having thus described an exemplary fob 102 and a transaction completion system using the conventional account number, a method of completing a transaction using a secondary transaction number is described below. As noted, the secondary transaction number (STN) is associated with the conventional transaction account number and the STN is assigned to a conventional transaction account, to be used to complete a transaction. Completion of a transaction using the STN occurs in similar manner as is discussed above with respect to the conventional account number, with one exception. The fob user may forward the STN to a merchant for completing a transaction, while keeping the conventional transaction account number secreted.

Figure 8:
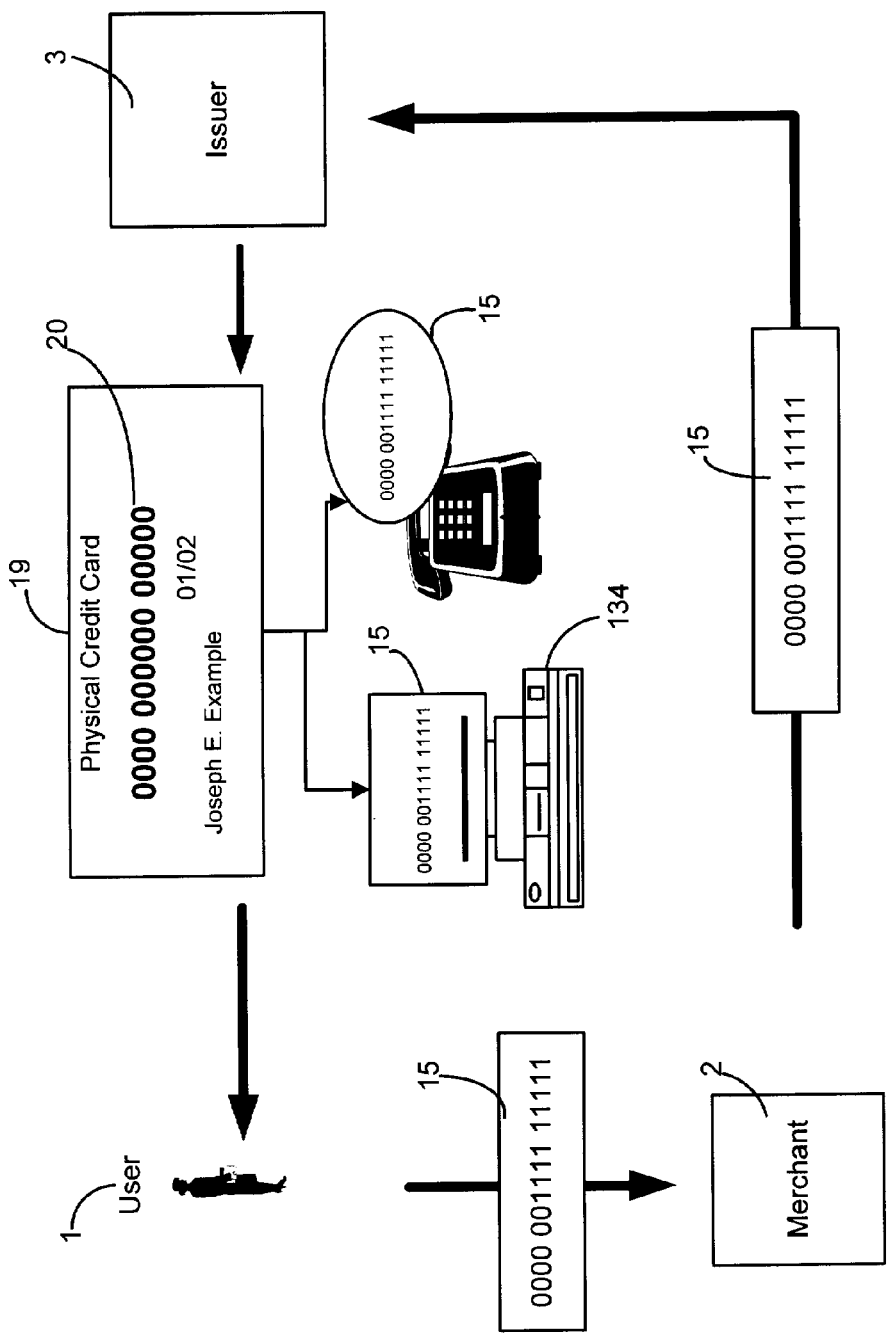
FIG. 8 is an overview of another exemplary system for facilitating a transaction.

As depicted in FIG. 8, the present invention generally relates to a transaction system where a first party to a transaction ("user 1") provides to a second party to a transaction ("merchant 2") a secondary transaction number (STN) 15 that was generated by an issuer ("issuer 3"). In a preferred embodiment, although not required, the STN 15 is immediately usable by the user 1 without need for activation and may have associated therewith user 1, issuer 3, or merchant 2 defined conditions or parameters of use restrictions which limit use of the STN 15.

The first party to the transaction (referred to herein as a "user 1") is any individual, business or other entity who uses a STN 15 to facilitate any transaction. In a preferred embodiment, the user 1 establishes a new or has an existing relationship or association with an issuer 3. For example, in one embodiment, a user 1 may be an American Express® card member. In another embodiment, a user 1 may be a participant in a frequent flyer rewards program. In a further embodiment, the user 1 is a member of any suitable organization that provides transaction products or services. Another embodiment contemplates the first party gifting a secondary transaction number to a second party. The term user 1 may also be referred to herein as "consumer," "fobholder," "fob user," "card member," "user," "customer" or the like.

The second party to the transaction (referred to herein as a "merchant 2") is any individual, business, or other entity who receives a secondary transaction number, whether or not in exchange for goods or services. For example, in one embodiment, a merchant 2 may be an online bookstore such as Amazon.com®. In another embodiment, a merchant 2 may be a local plumber. In yet another embodiment, a merchant 2 may be a local hardware store. In some instances, the user 1 and the merchant 2 may be the same. In other situations, the merchant 2 and the issuer 3 are the same. Although referred to herein as a "merchant," this term contemplates situations where any second party receives a secondary transaction number from the first party: such as, for example, where a user 1 gifts a secondary transaction number to another individual (i.e., second party merchant).

The transaction account issuer ("issuer 3") or provider includes any provider of products and/or services that facilitates any type of transaction. As contemplated by an exemplary embodiment of the present invention, the issuer 3 establishes and maintains account and/or transaction information for the user 1. The issuer 3 may issue products to the user 1 and may also provide both the user 1 and the merchant 2 with the processes to facilitate the transaction system of the present invention. The issuer 3 includes banks, credit unions, credit, debit or other transaction-related companies, telephone companies, or any other type of card or account issuing institutions, such as card-sponsoring companies, incentive rewards companies, or third-party providers under contract with financial institutions. Unless otherwise specifically set forth herein, although referred to as "issuer," this term should be understood to mean any entity issuing any type of account to facilitate any transaction, exchange or service, and should not be limited to companies possessing or issuing physical cards. In an exemplary system, the issuer 3 may be any transaction facilitating company such as a charge card provider like American Express®, VISA®, Mastercard®, Discover®, etc. In another embodiment, the issuer 3 could be any membership organization or union. In some instances, the issuer 3 and the merchant 2 may be the same, for example, where the STN 15 is issued by the same entity that provides the product or service. A phone card using a STN 15 issued by a telephone company, where the STN 15 phone card is tied to a primary telephone account is one such occasion.

An exemplary STN 15 is any transaction number, code, symbol, indicia, etc., that is associated with another number or account that has been designated by the user 1 or the issuer 3 as a primary fob identifier (PFI 20) (i.e., primary transponder account, fob serial number, primary transponder number). In an exemplary embodiment, the STN 15 is a purchasing number that acts as a charge card number and is associated with a PFI 20 account (e.g., a main charge card, credit card, debit card or other account number, such as a bank or brokerage account, reward program account, etc.). In an exemplary embodiment, a PFI 20 account is not identified by a STN 15. In certain embodiments, the PFI 20 account may have some identifying elements related to the STN 15. The PFI 20 is defined herein to include any type of transaction number that references any account, membership, affiliation or association. The PFI 20 may ordinarily be provided to the user 1 on a physical card 19. When more than one user 1 account exists, the PFI 20 is the account that has been designated by the user 1 or the issuer 3 as the primary account. Alternatively, there may be a hierarchy of accounts where the STN 15 is associated with one or more PFIs 20 in a designated order. Additionally, as depicted in at least one embodiment described herein, a STN 15 may be associated with two or more accounts. For example, a STN 15 could be associated with a non-currency based account and also a PFI 20 account.

As illustrated in FIG. 8, in a preferred embodiment, the STN 15 and the PFI 20 have the same format, although additional embodiments may provide for account numbers with varying formats. In an exemplary embodiment involving credit, debit or other banking cards, the STN 15 has the same industry standard format that is used for the regular banking cards (e.g., 15 or 16 digit numbers). Preferably, the numbers are formatted such that one is unable to tell the difference between a STN 15 and a conventional account number appearing for example, on a regular physical charge card, which is ordinarily processed by the merchant 2. Alternatively, however, the card provider/product identifier (e.g., BIN range, first 6 digits, etc.) numbers may be different so as to differentiate the STNs from regular charge card numbers. In referencing the STN 15 and the PFI 20 number, it should be appreciated that the number may be, for example, a sixteen-digit credit card number, although each card provider has its own numbering system, such as the fifteen-digit numbering system used by American Express, as is discussed above. The invention contemplates the use of other numbers, indicia, codes or other security steps in addition to the use of the STN 15, but in an exemplary embodiment, only the STN 15 is provided to the merchant 2.

In a preferred embodiment, the STN 15 is randomly and instantaneously generated by the issuer 3, usually upon a user's request, and can be distributed to the user 1 by a variety of methods (online, telephone, wireless, email, regular mail, etc.) all of which should be secure and dependent upon verification of the user's identity. Unlike the temporary transaction numbers disclosed in the prior art previously discussed, in a preferred embodiment, although not required, the STN 15 is immediately active (and usable) once it is associated with the user's designated PFI 20 and provided to the user 1. This feature minimizes the possibility that a merchant 2 will obtain a transaction number that will be worthless because it was not properly activated by the user 1. While the present invention may contemplate a previously allocated pool of numbers that needs to be activated, an exemplary embodiment of the present invention includes STNs 15 that are instantaneously and randomly generated, and are usable upon receipt by the user 1 without the need for separate activation.

In another preferred embodiment, the STN 15 may have limited-use (or conditions-of-use) parameters placed upon it by either the user 1, merchant 2, or the issuer 3 in order for the numbers to be restricted for particular uses. Alternatively, the user 1 is able to choose system default parameters of use. Parameters may include, for example: (i) use of the STN 15 is good for a predetermined number of transactions; (ii) user-determined expiration dates (i.e., STN 15 will be generated with expiration dates that are associated but unrelated to the expiration date of the user's PFI 20 number, other than that it cannot exceed the expiration date of the PFI 20 account); (iii) limiting use of the STN 15 to a specified dollar amount, dollar amount per transaction, total dollar amount for pro-designated number of transactions, maximum dollar amount per month, etc.; (iv) use of the STN 15 for a specified merchant only; (v) restricting use to a specified user, other than primary user (e.g., child, spouse, gift recipient, etc.); or (vi) any combination of these or similar features, for example, a number can be used at a specified merchant only for a pro-designated number of transactions and for a maximum dollar amount. In an exemplary online embodiment, a user 1 may desire to require all online transactions (e.g., purchases) be performed using only STNs, or alternatively, be performed only with specific merchants as defined. If the user (or another individual) uses a physical charge card number for an online payment in violation of this condition, the issuer 3 would decline the authorization.

These parameters not only provide increased security, allowing a user 1 to tailor the STN 15 to a particular use, but an ancillary benefit is the ability of a user to select preferences to control spending for her/himself or others who have registered eligibility to use the card (e.g., spouse, children, etc.). These preferences may include: restrictions (user 1 may choose to restrict use on certain sites or can pre-approve spending at particular sites); date range (user 1 can select a period of time when transactions may occur); maximum budget amount (user 1 can pre-set spending limits within certain periods of time or in certain categories (e.g., groceries, books, clothing)); credit and balance availability (user 1 can check credit or demand deposit balance availability prior to transacting); non-currency based accounts, such as reward points as currency (user 1 can use reward points (e.g., Membership Rewards™, Blue Loot™) as currency to pay for purchases); and gift products (user 1 can use a STN 15 to fund gift products to others for designated amounts).

Figure 9:
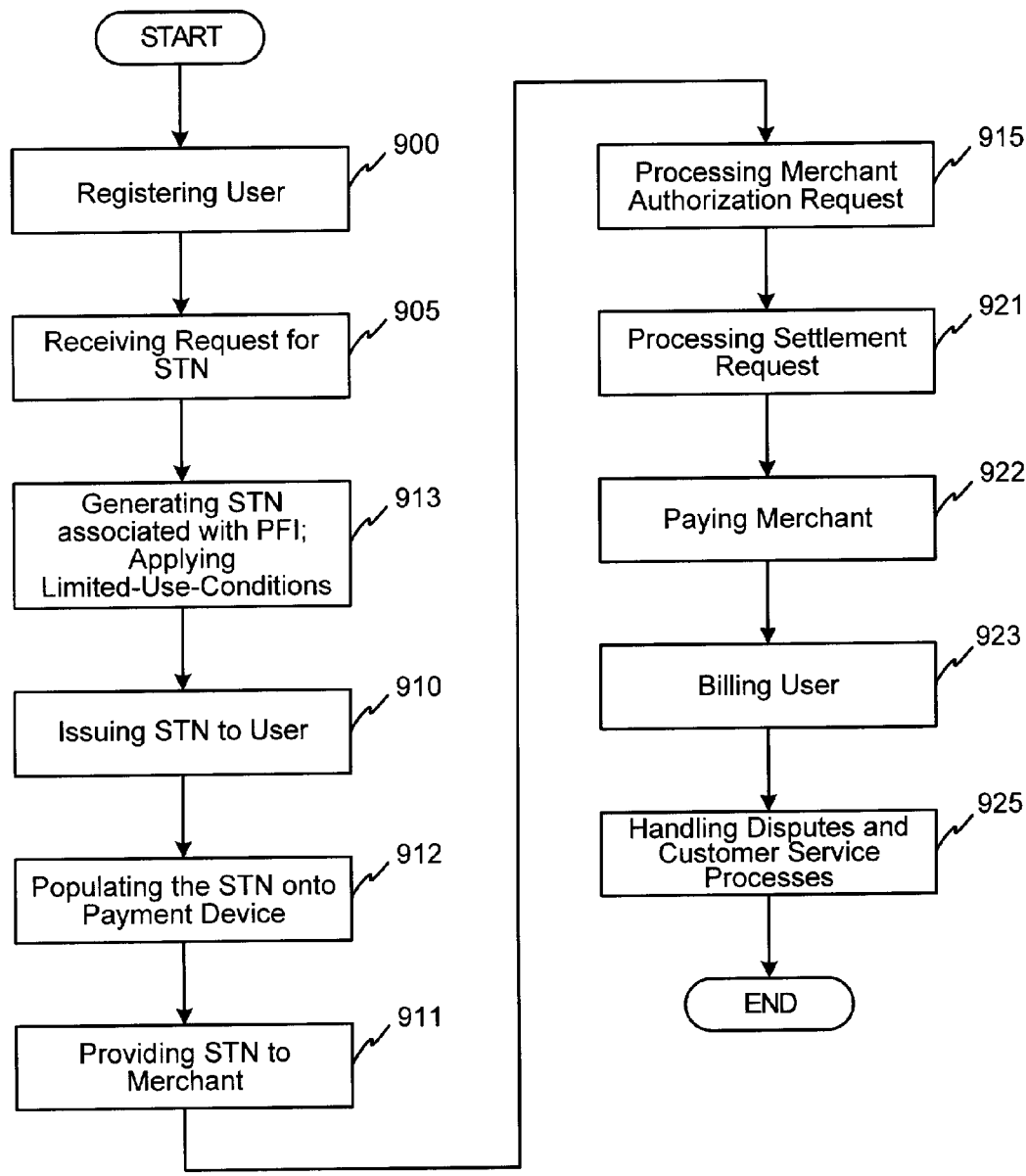
FIG. 9 is a flow diagram of exemplary processes of the present invention.

As shown in FIG. 9, an exemplary embodiment of the present invention includes steps for: (i) registering a user 1 to use the card provider's 3 transaction services (step 900); (ii) receiving from a user 1 a request for a STN 15 (step 905); (iii) generating a STN 15, associating the STN 15 with a PFI 20, applying limited-use conditions, if desired (step 913), and issuing the STN 15 to the user 1 (step 910); (iv) populating the STN 15 onto the fob 102 (step 912); (v) providing the STN 15 to a merchant 2 (step 911) either online or using a fob 102; (vi) processing a merchant's 2 authorization request involving the STN 15 to determine if use of the STN is authorized (step 915); (vii) processing a settlement request (step 921 ); (viii) paying the merchant (step 922), and billing the user 1 (step 923); and (ix) handling disputes and other customer service issues from the merchant or user relating to use of the STN 15 (step 925). In an exemplary system, the dispute handling and customer service processes (step 925) may include, inter alia, in addition to the systems described with respect to FIG. 10 below, a system for identifying a PFI 20 from a STN 15, a letter generating system for sending dispute inquiries to users 1 and merchants 2, and a system that accepts incoming communication from merchants 2 and converts the STN 15 received to the PFI 20 for the purpose of facilitating the dispute handling process.

Figure 10:
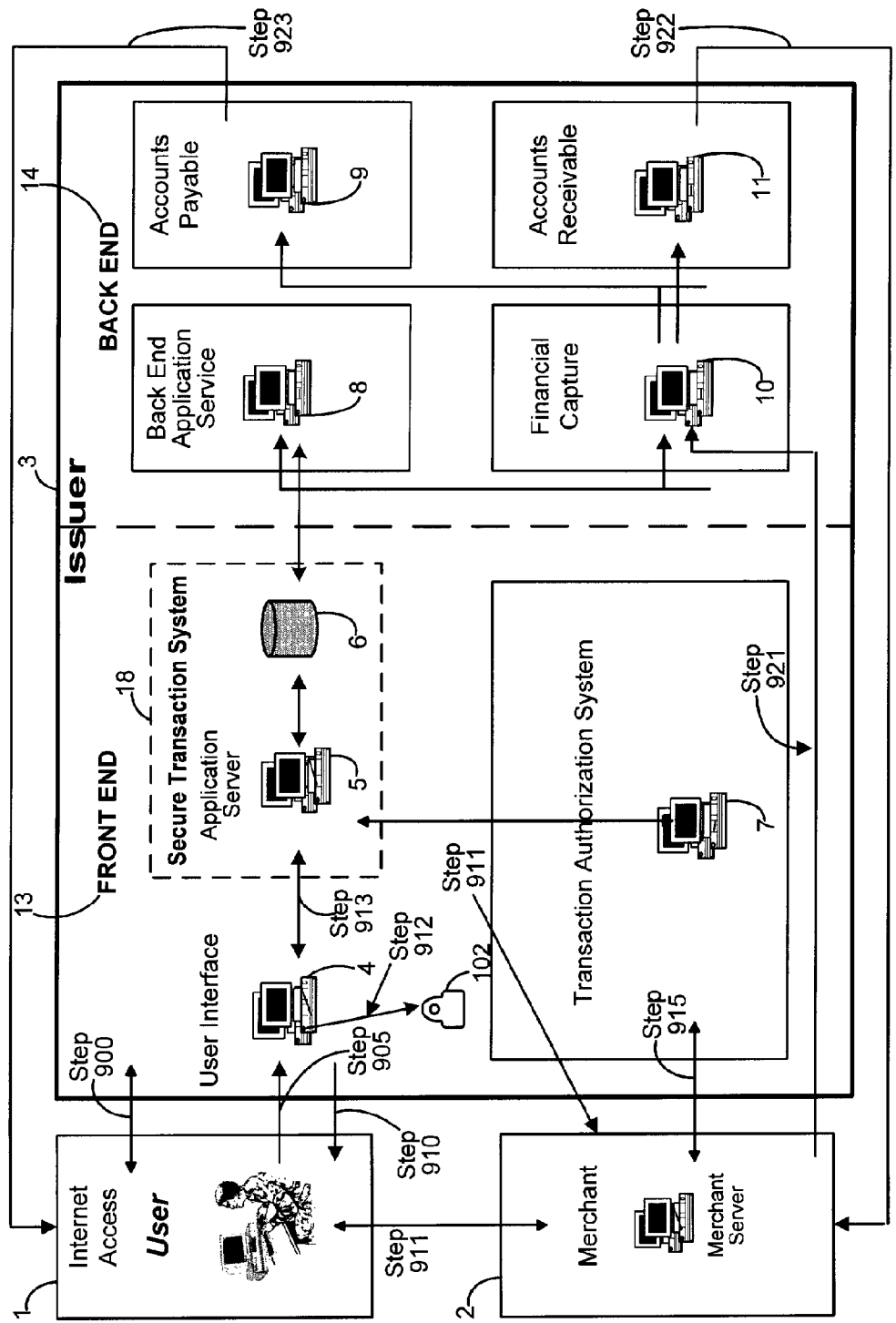
FIG. 10 is a system level flow diagram of an exemplary process of the present invention.

FIG. 10 depicts an overview of the components of another exemplary transaction system that may be used with the invention. In general, the system of FIG. 10 gives greater illustration of card provider's transaction processing system. The card provider's transaction processing system utilizes front end 13 and back end 14 processing systems. The front end 13 system comprises, inter alia, a user interface system 4 (e.g., web server, IVR, etc.), an application server 5, a STN database 6, and a card authorization system (CAS) 7. The application server 5 and STN database 6 may, at times, be referred to collectively as the STN transaction system (or service) 18. Referencing FIGS. 9 and 10, these front end 13 components facilitate (i) user registration (step 900), (ii) request for a STN 15 (step 905), (iii) generation and issuance of the STN 15 (step 913), and (iv) the STN authorization process (step 915). The back end 14 system comprises, inter alia, a financial capture system 10, a back end application service 8, an accounts payable system 9, and an accounts receivable system 11. Again referencing FIGS. 9 and 10, the back end 14 components facilitate transaction settlement (steps 921, 922, 923).

More specifically, as shown in FIG. 10, the issuer user interface system 4 provides the user 1 with access to the card provider's transaction services. It is through this interface that the user 1 may register with the issuer 3, may request a STN 15, and, in response thereto, may receive from the issuer 3 a STN 15 that is associated with his PFI 20.

The front end 13 system also utilizes at least one application server 5 that processes incoming information, applies the appropriate business rules/condition sets as necessary, and generates appropriate outgoing responses. The application server 5 is configured to support interaction with, inter alia, the user interface system 4 and a STN database 6. An exemplary STN database 6 is a relational database comprising various tables for managing and translating a variety of information, such as user 1 profiles, charge card data, transaction data, merchant data, conditions/rules set profiles, etc.

Figure 11:
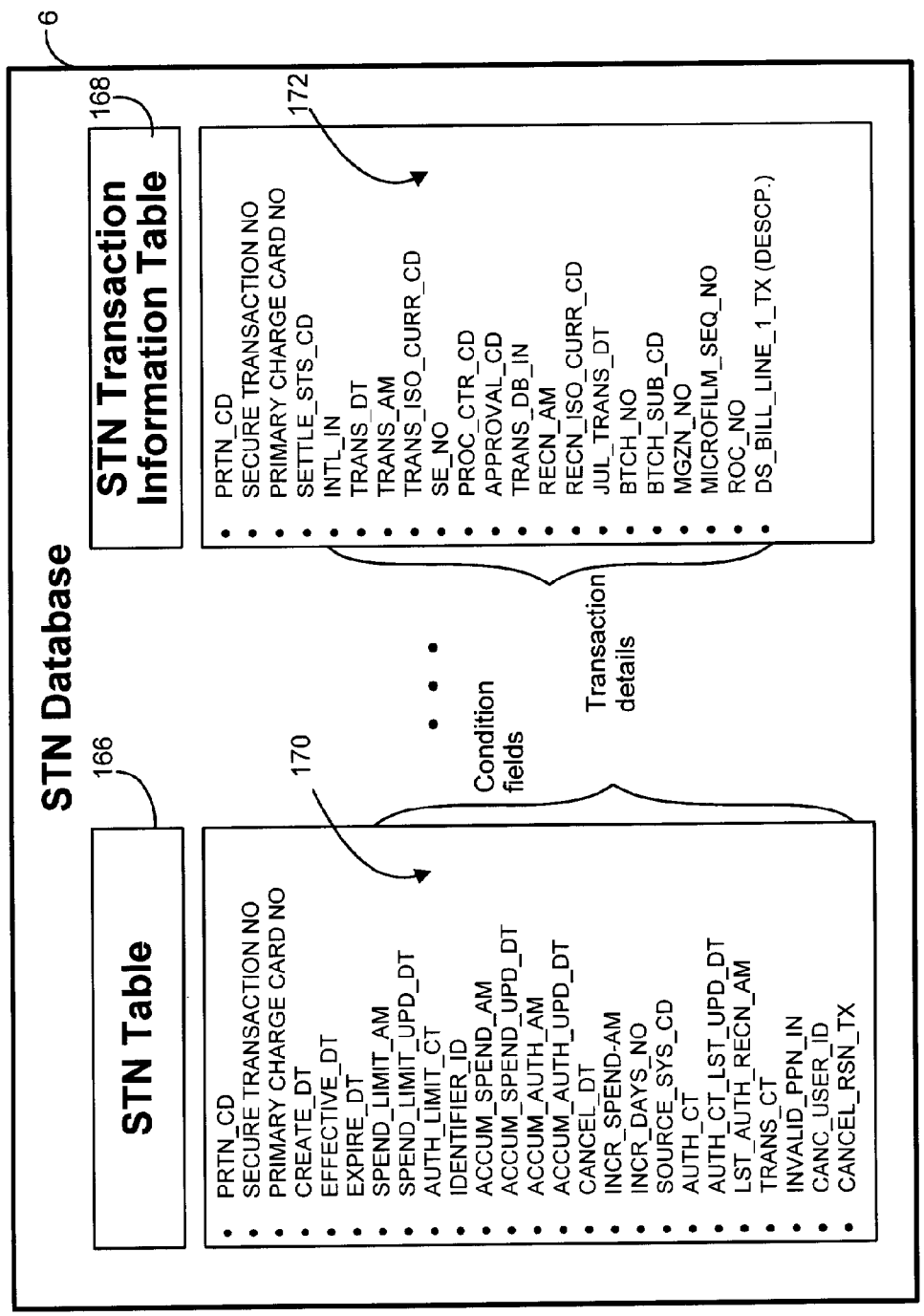
FIG. 11 is a block diagram of an exemplary data structure of the STN database in accordance with the present invention.

FIG. 11 illustrates two examples of exemplary tables within the STN database 6. STN table 166 may contain a variety of database fields 170 relating to the user's STN account. These fields may contain, in addition to general STN 15 and PFI 20 account information, the business rule/condition set profiles associated with use of the STN 15. A STN Transaction Information Table 168 contains database fields 172 for storing information relating to a particular transaction. As a skilled programmer can appreciate, the processing mechanisms and data structure methods can be structured in a variety of ways. In short, the user interface system 4, application server 5, and the STN database 6 are suitably connected to facilitate the generation and issuance of a STN 15 and are further associated with a card authorization system (CAS) 7, in order to process from the merchant 2 an authorization request involving a STN 15.

When processing a merchant's request for settlement (i.e., to be paid for a transaction), the financial capture (FINCAP) 10 system receives and captures the financial information (e.g., transaction amount, date, merchant identification (SE) number, STN 15, etc.). The back end application service 8 interfaces with the STN transaction system 18, as necessary, to determine if the number is a valid STN 15 (i.e., not a phony number). If the STN 15 is valid, the AP system 9 pays the merchant 2. The STN database 6 is updated to reflect the transaction information. The STN transaction system 18 (or alternatively the back end application service 8) substitutes the PFI 20 number for the STN 15 and forwards to the AR system 11 for billing.

Although the present system for facilitating transactions may exist within one transaction account issuer system, exemplary embodiments contemplate use with other third-party authorization and settlement systems and networks.

Exemplary processes of the present invention are discussed in greater detail below.

Figure 12:
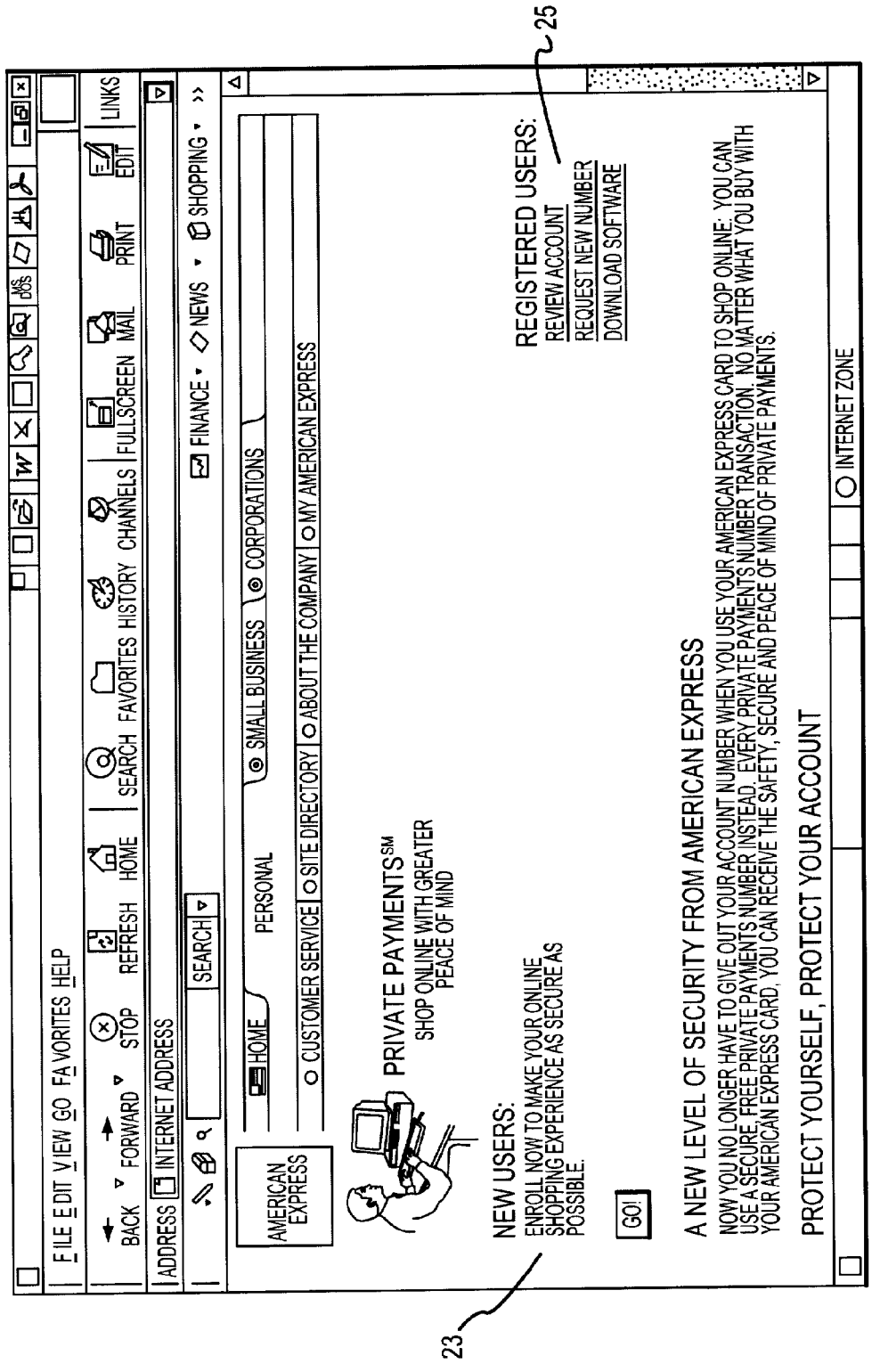
FIG. 12 is a web page screen shot of a card provider's exemplary splash page for a transaction system.
Figure 13:
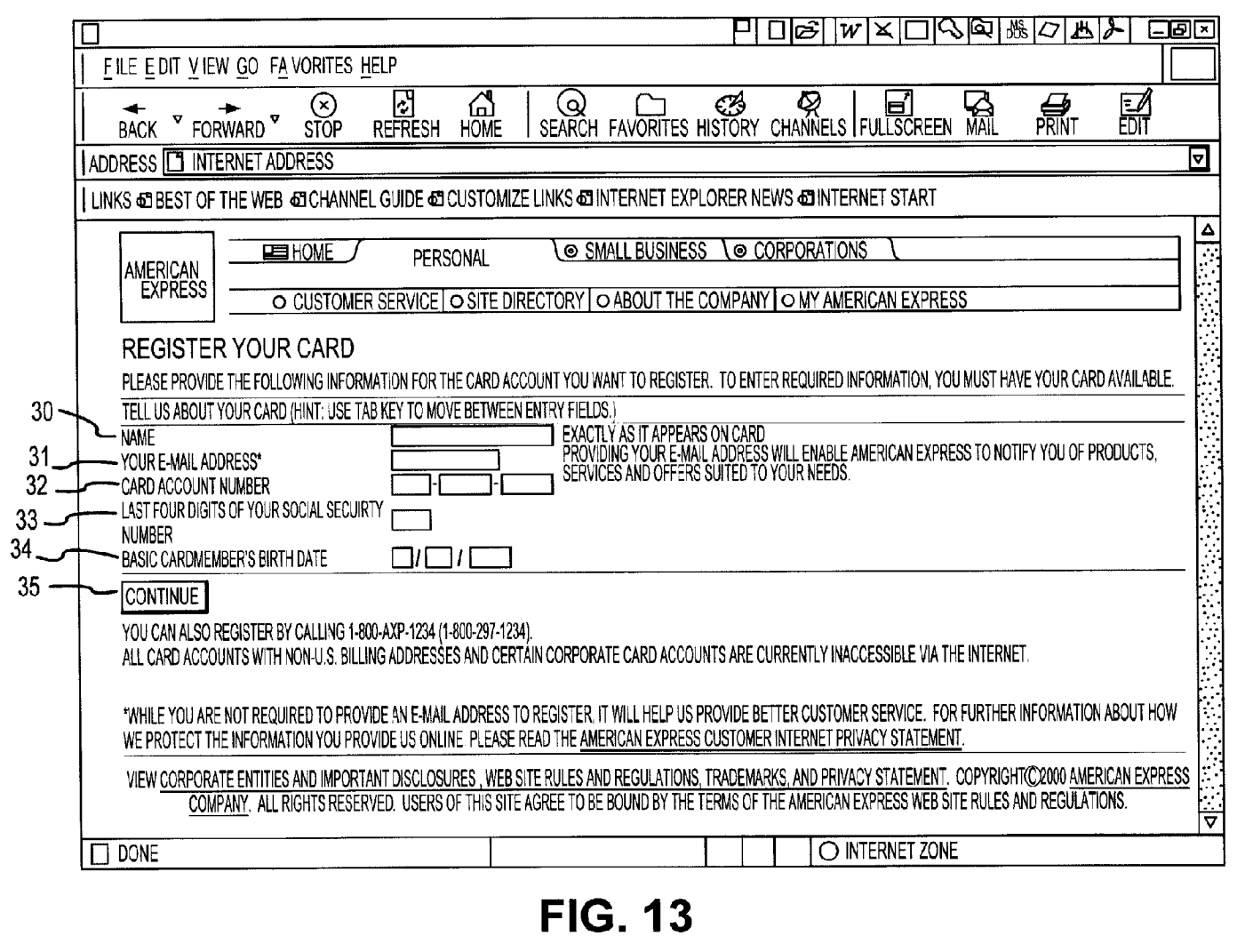

Two exemplary screen shots relating to an exemplary registration process are shown at FIGS. 12 and 13. FIG. 12 depicts a splash page for an American Express® Private PaymentsSM program. The Private PaymentsSM program is an exemplary embodiment of the present invention. Here, a new user 23 may enroll to use the program or an existing user may access a number of program features 25 (e.g., review account, request a new STN 15 number or download software). The user 1 generally enters this site by entering an appropriate fob provider URL into her browser, by clicking on a link provided by a merchant's website, or alternatively, by an automatic pop-up feature that may appear upon recognizing particular URL or HTML codes.

In one exemplary enrollment process, the user 1 may place the fob 102 in communication with the issuer interface 4 via, for example, the fob's USB port 132. The USB port 132 may be placed in communication with the interface 4 by connecting the USB port 132 to a user interface 134 so that data may be received from the fob 102 and written to the fob 102 by the issuer interface 4 or the user interface 134. In other exemplary embodiments, the fob 102 may be placed in communication with the issuer interface 4 using a contact or contactless reader capable of receiving information from and writing information to the fob 102 (e.g., reader 104). Using, for example, the user interface 134, the user 1 is linked to a registration page (FIG. 13) and prompted for information. Information may include the user's name 30, email address 31, credit account number 32 and/or fob account identifier (e.g., PFI 20), last four digits of social security number 33, user's date of birth 34, etc. Any suitable authenticating information will suffice. By selecting "continue" 35, the user 1 is provided with a username and password, or preferably, the user is allowed to select her own username and password. The user interface system 4 processes this information and suitably interfaces with the STN transaction system 18 (FIG. 10) to register the user. As one skilled in this art will appreciate, registration may take many forms and may be accomplished in a variety of ways. For example, an issuer 3 may choose to automatically enroll all new charge card applicants and return to the user a username and password with the physical credit card. Although FIGS. 12 and 13 show an online registration screen with which a registration process may be completed, it should be appreciated that this process may take place via any suitable user interface system.

In one embodiment, during the registration process, the user 1 may choose to select or define various parameters, preferences, and programs to tailor the transaction system to the user's particular needs. Additional embodiments allow the user 1 to select or define parameters, preferences or programs at any point in the transaction process. In other words, the user 1 has the flexibility to select parameters each time (e.g., during registration, log-in, upon STN request, etc.) a STN 15 is generated or may apply universal parameters to every STN 15 generated. With these selections, for example, the user 1 may (i) designate a specific credit card associated with a fob 102 to function as the primary charge card number; (ii) associate the transaction system with other programs such as a non-currency based membership rewards program, an online digital wallet, an online shopping gateway (e.g., American Express's "ShopAMEX"), an online gift check program (e.g., E-Gift), preferred buyer's programs, etc.; (iii) provide password protected access to family members; (iv) activate a smartcard feature allowing remote random generation of secondary transaction numbers; (v) designate cell phone, email or pager numbers to utilize with the voice or automated response secondary transaction number generation feature; (vi) and other banking and transaction features that may be apparent to those skilled in the art. Additionally, the user 1 may wish to associate multiple fobs with the STN 15 for use by third-party users (e.g., family members, employees, co-workers, friends, etc.). For more information on loyalty systems, transaction systems, electronic commerce systems and digital wallet systems, see, for example, the Shop AMEX™ system as disclosed in Ser. No. 60/230,190, filed Sep. 5, 2000; the MR as Currency™ System disclosed in Ser. No. 60/200,492, filed Apr. 28, 2000, and Ser. No. 60/201,114, filed May 2, 2000; Wireless MR as disclosed in Ser. No. 60/197,296, filed on Apr. 14, 2000; a digital wallet system disclosed in U.S. Ser. No. 09/652,899, filed Aug. 31, 2000; a stored value card as disclosed in Ser. No. 09/241,188, filed on Feb. 1, 1999, all of which are herein incorporated by reference.

Figure 14:
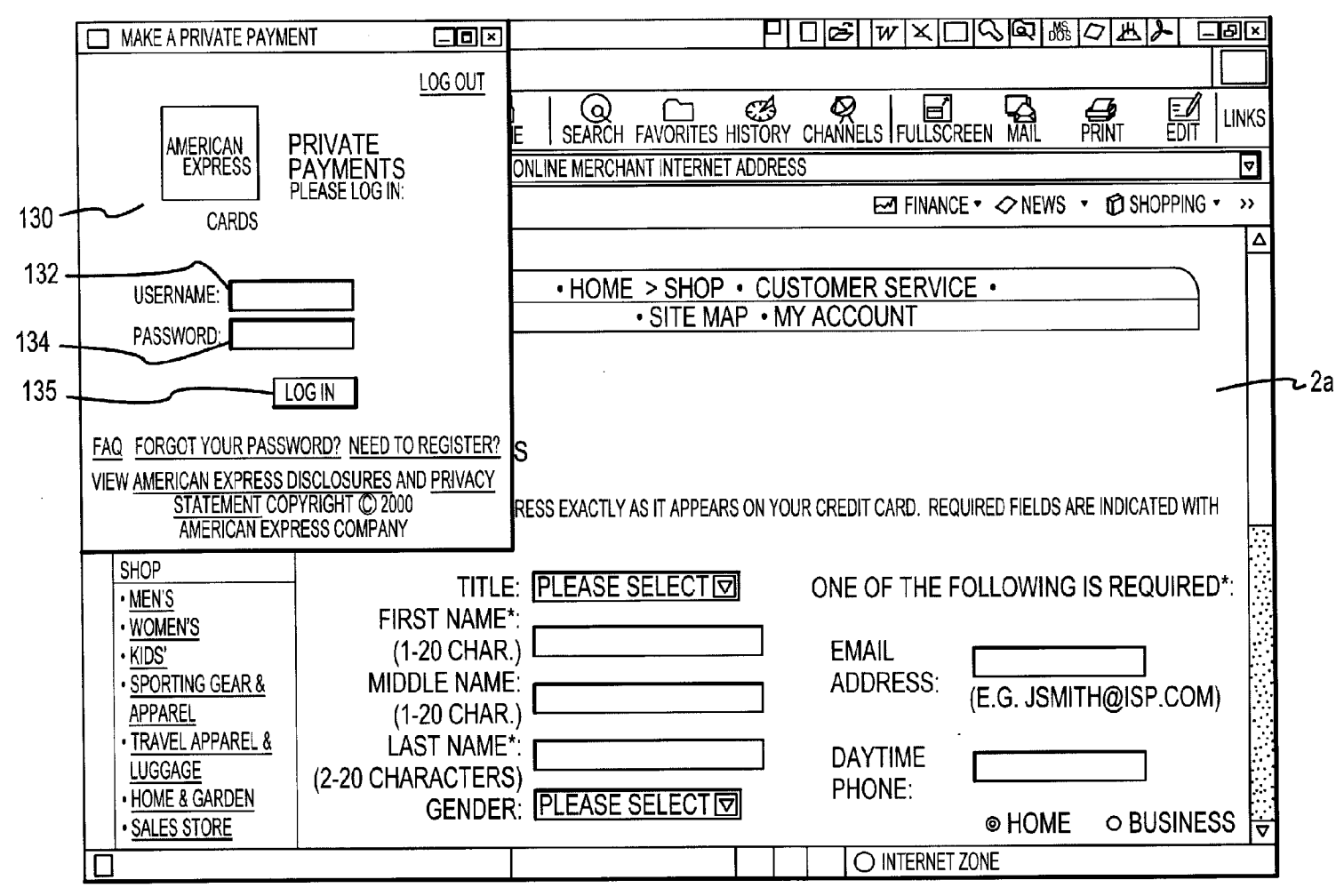
Figure 15:
FIG. 15 is a web page screen shot of a card provider's exemplary online drop-down menu used to select a primary charge card in the foreground and an online merchant's payment web page in the background.

A registered user 1 generally accesses the issuer's transaction system by logging into the system via any suitable user interface system 4. FIG. 14 depicts an exemplary online log-in screen 130, where the user 1 is prompted for authenticating information such as a username 132 and password 134. Alternative systems contemplate authentication via any suitable user interface system. For example, an embodiment employing a portable data device such as a fob facilitates authentication by holding the fob in front of a fob reader or connecting the fob using a USB port, and additionally, providing the appropriate PIN or biometric information and the like. After entering the appropriate authenticating information and clicking the log in button 135, the information is routed through the user interface system 4, for example, a web server, to the application server 5, where, as shown in FIG. 14, the application server 5 retrieves information relating to the user's account from the STN database 6. If the user 1 has registered multiple charge card accounts and/or fob accounts, in one embodiment 136, as depicted in FIG. 15, the program prompts the user 1 to choose from a list of accounts from a pull-down menu 138. The user 1 then selects at least one account and/or fob identifier to be the primary account and/or fob identifier or to be included in a primary group of accounts (when it is desired for the STN 15 to be associated with more than one account). In other embodiments, the user interface system 4 will return additional options for the user 1, such as prompting the user 1 to choose from several condition fields such as those previously mentioned (e.g., restricting use to a particular merchant, amount, allowing use by other recipients, etc.).

Figure 16:
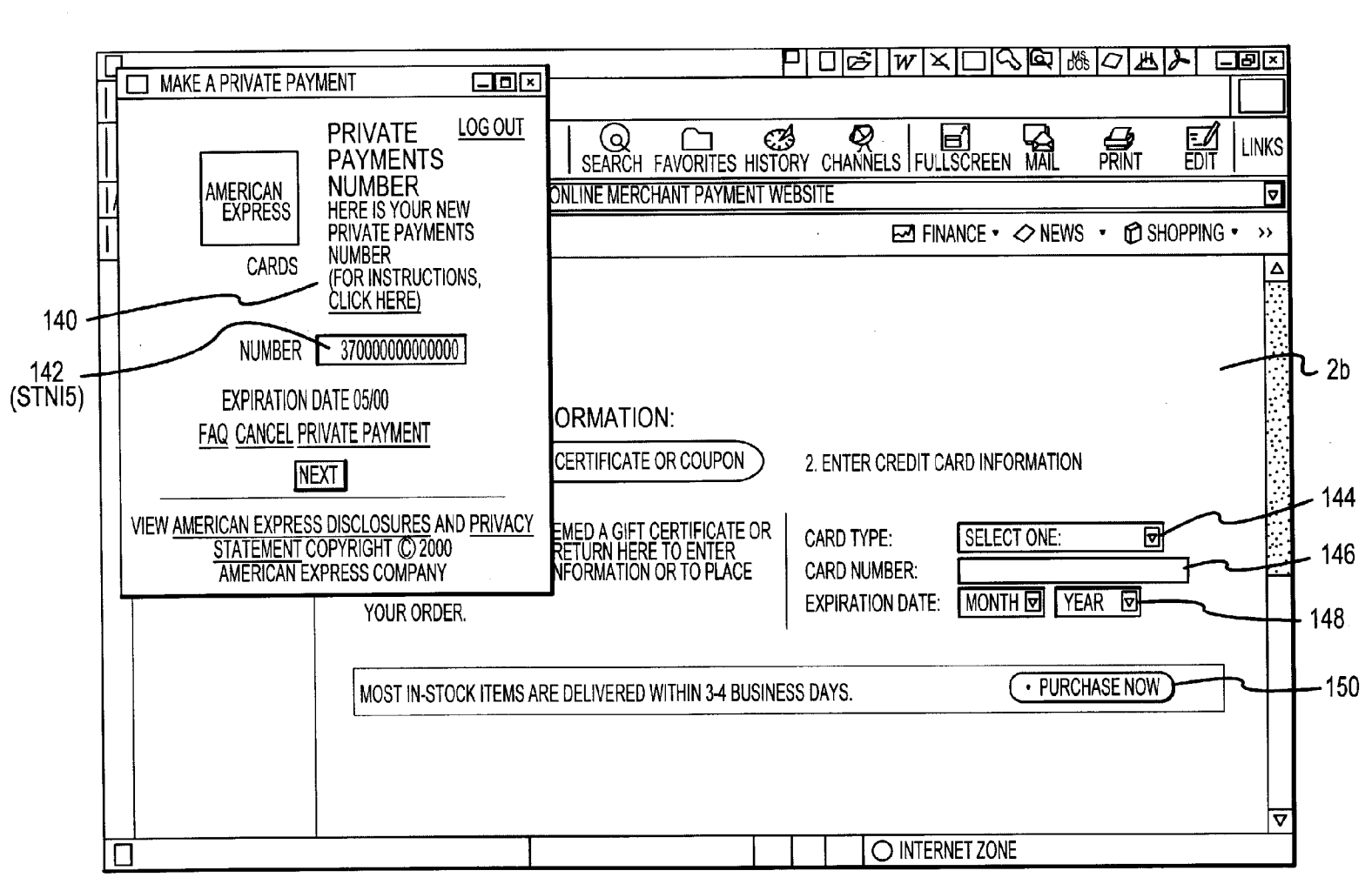

An exemplary online transaction process begins with a user 1 desiring to purchase products or services from an online merchant's website. In this exemplary online system, the user 1 selects products from a merchant's online website 2, is routed or clicks to the merchant's payment page 2a (FIG. 14). The user 1 is hyperlinked (manually or automatically) to a card provider's web site to log in 130 (FIG. 14), which resides on and is managed by the card provider's user interface system 4 (e.g., web server), and, upon logging in, obtains a STN 15 that may then be "cut and pasted," "dragged and dropped" (or alternatively, automatically filled by the issuer 3 or downloaded from a digital wallet) into the payment fields 144, 146, 148 (FIG. 16) on the payment web page 2b (FIG. 16). In alternative embodiments, the system includes one or more of the following: the issuer 3 sends the STN 15 directly to the merchant 2, the STN 15 is encrypted or encoded, the user 1 enters additional security numbers or other indicia or a biometric sample is required from the issuer 3. In an exemplary embodiment, the STN 15, as will be discussed next, is generated by the card provider's application server 5 and STN database 6. In another embodiment, the STN 15 may be populated on the fob secure memory 212 or database 214 via the user interface 4 and USB port 132. The user 1 may then use the fob 102 to complete subsequent online transactions by connection the fob 102 to the user interface system 4 and uploading the STN 15 to the merchant's website.

After authenticating a user 1 during the log-in process, and receiving a request for a STN 15, and before transaction completion, the process begins for generating a STN 15. The user interface system 4 prompts the initiation of the number generation process in the STN transaction system 18. In an exemplary random number generation process, the STN 15 is generated (preferably immediately) and provided to the user 1 (preferably contemporaneously with the user's request). As previously noted, the STN 15 may be populated onto the fob 102 using the USB port 132 via user interface system 4. The STN is immediately usable once received by the fob 102. This allows the STN 15 to be usable immediately upon receipt by the user 1 without the need for separate activation (although separate activation features are contemplated by the present invention), while minimizing any increased risk of theft or fraud.

Figure 17:
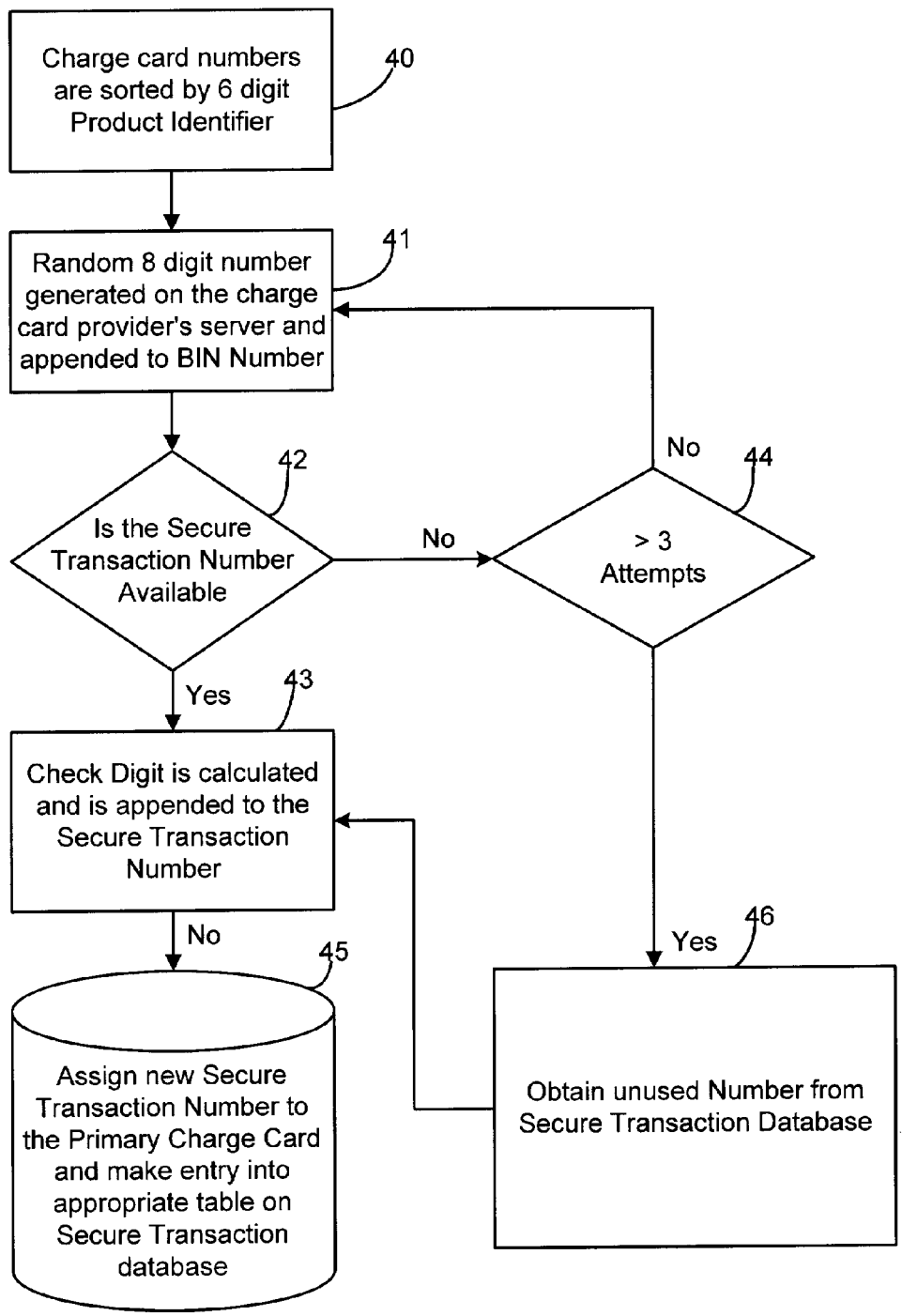
FIG. 17 is a flow chart of an exemplary secondary transaction number generation process of the present invention.

An exemplary STN 15 generation process is depicted in FIG. 17. In this exemplary embodiment, each issuer 3 (FIG. 10) is generally identified by a range of numbers, typically called the bank identification number (BIN) or conventional transaction account number. Each transaction account number may possess a product identifier (e.g., first 6 digits BIN, etc.) that is not part of the random number generation process, but in order to initiate the process, this product identifier is ordinarily selected first (step 40). It may be preferable for an issuer 3 to set aside a set of product identification numbers relating to secondary transaction numbers for specific use with the transaction system. Alternatively, however, some card providers may find it desirable to use the same BIN number designation for both STNS 15 and regular charge card numbers so that one cannot distinguish between the two types of numbers. As depicted in FIG. 17, a random number, such as a random eight digit number, may be generated by the account provider's application server 5 using an algorithmic process (step 41). The application server 5 verifies that the randomly generated number is available (i.e., it is not in use nor has it been used within a certain period of time) (step 42). If the transaction number is free (i.e., not in use), a check digit and the selected product identification number is appended to the number (step 43). This newly created STN 15 is then associated with the user's PFI 20 at the account issuer's system and is provided to the user 1 (step 45) using any method discussed above, whereupon the STN database 6 is updated to reflect that this particular STN 15 is in use and associated with a PFI 20 account. If, during step 42, it is determined that the number is in use, the number generation process is repeated up to a preset number of times (e.g., 3) (step 44). After attempting and failing to generate a non-used random number for a preset number of times, a non-used random number is physically selected from the STN database 6 (step 46).

After the STN 15 is generated, conditions of use parameters are applied, and are associated with the PFI 20 at the issuer's system, the STN 15 is then distributed (i.e., issued) to a user 1 for use in facilitating a transaction. Communication of the STN 15 may occur via a number of user interface systems 4. For example, FIG. 16 depicts an exemplary online interface where the STN 15 is returned to the user 1. This embodiment shows how the issuer window 140 overlays a merchant's online payment page 2b. The user 1 selects the appropriate transaction account (e.g., American Express®) from the credit type field 144. The user 1 is then able to "cut and paste" or "drag and drop" the STN 15 (present in the STN field 142) into the credit card field 146 on the webpage 2b. The STN 15 may additionally be added to the fob database 214 or secure memory 212. Finally, the user 1 chooses the appropriate expiration date 148 and completes the transaction by selecting the "purchase now" button 150. Although this embodiment describes linking to a issuer's web site to receive a STN 15, an additional embodiment configures the user interface 4 (e.g., web server) and STN transaction system 18 to seamlessly interact with the merchant's website to eliminate the need to separately link to the issuer 3. In this instance, the generation and issuance of the STN 15 would use the merchant 2 as a gateway to the issuer 3.

Any number of interface systems 4 can be used to facilitate the processes described above (FIG. 10 steps 900, 905, 913). For example, as just described, distribution of the STN 15 may occur via a "server to desktop" arrangement where a connection is established between the issuer's interface 4 and the user's 1 desktop computer, using SSL 3.0. With this exemplary system, the number is generated by the application server 5 (according to an algorithmic processing feature) utilizing a random number generation process such as that previously described and delivered to the issuer interface 4. The number is then displayed on the user's 1 desktop. While pre-registration is not required, in an exemplary embodiment, a user 1 will have previously registered at the issuer's 3 online web site providing all required personal information, primary charge card account numbers, and establishing a user ID and password (if not already established). The user ID and password are then used for verification of user 1 identity when logging into the issuer's interface 4.

Distribution of STNs 15 may also occur via a "server to IVR" arrangement, where a user 1 calls the issuer 3 in order to obtain a STN 15. In this exemplary embodiment, a voice response menu enables the user 1 to choose the transaction option, and allows the user 1 to enter a main account number. Once identity is verified, a link to the application server 5 is established, prompting generation and delivery of a STN 15 over the phone. In this embodiment, the user 1 provides authenticating information by providing date of birth (DOB), a PIN, etc. Once this verification number is matched to customer's records, the STN 15 is distributed. The STN 15 is immediately usable and the user 1 may then present the fob 102 to a read/write operable reader 104 at any time later for populating the STN 15 onto the fob 102. Of course, this process would also work with a live operator arrangement.

Additional distribution embodiments include a number of different delivery vehicles and/or portable data devices, such as use of wireless devices, smart chip encoded devices, personal digital assistants (PDAs), pagers, interactive IVs, etc. For example, a "server to wireless device" may be used where a wireless phone with Internet browser is able to access the issuer's transaction site via the issuer's online service web site, or when the user 1 desires to receive the STN 15 at a wireless payment device, such as the RF operable fob 102. Where a wireless phone is used, the STN 15 can be delivered via text or voice. Additionally, with the use of encryption keys, the wireless device can be used as payment vehicles (e.g., STN 15 is delivered from the user 1 to merchant 2 or other customer with Blue Tooth or other beaming technology). Again, verification of identity can be accomplished by a variety of means, including user ID and password, DOB, PIN number, SIM cards in phones, etc.

Another exemplary embodiment of the transaction system, utilizing one or more of the distribution arrangements above, includes situations where a point-of-sale terminal (POS) is not present (e.g., submitting a STN 15 to a merchant 2 such as, for example, a plumber at home). In this exemplary embodiment, the user 1 may not have cash or may not want to provide her PFI 20 number to the vendor due to concerns about unauthorized re-use. As such, the user 1 calls the issuer 3 seeking to obtain a STN 15 with either predefined conditions of use or user determined conditions of use. A voice recognition system asks for a PFI 20 number, the amount she wants to authorize, a merchant ID (e.g., SE number), or any other conditions of use. The voice recognition system communicates with the application server 5 and, alternatively, also CAS 7, to generate the STN 15. The STN 15 is then transmitted to the user 1 who in turn provides it to the merchant 2. Additionally, the merchant 2 can also receive, if desired, an immediate call from the voice response unit to provide an approval code. One skilled in the art will appreciate that this system can be used in association with landline phones, cellular phones, pagers, handheld computers or any other PDA devices.

Another exemplary embodiment of the present invention utilizes a fob system or similar portable data device to generate and/or distribute a STN 15 to the issuer 3 or merchant 2. The fob 102 may facilitate the generation of a STN 15 in a number of different ways. In one embodiment, the 102 fob interfaces with the issuer's user interface system 4 using USB port 132 to cause the issuer 3 to generate a number. In one exemplary online embodiment, the user 1 may install an RFID reader 104 (fob reader) and associated software to be used with the user's computer system 134 that is capable of connecting to the Internet. When desiring to make an online purchase, the user 1 holds or waves his fob 102 in front of a fob reader 104 and enters an appropriate PIN. Once properly authenticated, the issuer transaction system generates and issues a STN 15 to the user 1. In yet another embodiment, the fob 102 supports interaction with a merchant 2 processing system. The merchant 2 may have a fob reader 104 capable of interfacing with the user's fob 102. In this embodiment, the user 1 swipes or inserts the fob through the merchant's reader, a PIN is entered and the STN 15 is displayed to the merchant 2.

With an exemplary online fob embodiment, the user 1 interfaces with the issuer's user interface system 4 (e.g., website) and registers the fob 102 for use with the transaction system option. The user 1 may download a STN 15 generating or writing program for providing the STN 15 to the fob 102 and the program may be stored on the user's computer. A STN transaction icon (e.g., Private PaymentsSM button) may appear on the user's browser or an icon may appear on the display (e.g., Microsoft Windows® system tray). This button, driven by an issuer specific application (activator) for running the program for generating and writing the STN 15 that resides on the user's computer, appears each time the user 1 launches the browser (or alternatively the button appears at any predetermined intervals, cycles or URLs).

The user 1 suitably links to an online shopping site, orders a product or service or fills a shopping cart and goes to the payment page. The user 1 clicks the STN payments button on the browser or the icon on the display (or the activator automatically launches the STN button) and a pop-up window appears, asking the user 1 to wave the fob 102 in front of the fob reader 104 and, in a preferred embodiment, enter his PIN number. In an alternative embodiment, a PIN may not be necessary. In another embodiment, any other security data or functionality may be included.

Upon entering this information, the STN 15 will be generated by the issuer's STN secure transaction system 18 (FIG. 10), or, in another embodiment (discussed below) will be provided directly from the fob 102, secure memory 212 or database 214; and a pop-up screen containing the STN 15 number may be displayed on the computer. The user 1 may then "drag and drop" or "cut and paste" the randomly generated STN 15 and other transaction information (e.g., card type, expiration date) into the online order form and completes the transaction. In an alternative embodiment, the STN 15 and other transaction information are automatically filled into the web shopping page by the issuer's web server. In various embodiments, the STN 15 may be automatically retrieved from the fob 102 and provided to the appropriate portion of the merchant 2 web page.

Another exemplary embodiment of the present invention integrates a RF transponder or fob 102 with an online merchant's website, which may or may not be utilized by the user 1. For example, in one aspect of this embodiment the fob 102 user goes to a merchant website and a "fob payments" checkout button appears on the credit card payments page. The issuer's transaction system will be invoked if the user 1 checks out via the fob payments button.

In a preferred embodiment, the transaction system option is "behind the scenes." The user 1 goes to an online shopping site, orders a product or service or fills a shopping cart and goes to checkout page. The user 1 clicks the fob payments button on the browser and a pop-up window appears, asking the user 1 to wave the fob 102 in front of the fob reader 104 and, optionally, enter his PIN number. Upon entering this information, the system logs the user 1 into fob payments checkout process. The user 1 will hit "check out" and the fob payments checkout process may auto-generate and auto-fill the STN 15 and transaction information into the appropriate payment field (the information may be read off of the fob 102 by a reader 104 that is in communication with the user computer 134 that is configured to transfer STN 15 data to a merchant site). In one embodiment, a multitude of predetermined STN 15 may be associated with, and stored in a single fob 102. The fob may generate or retrieve one of the STN 15 for providing to the merchant 2 in this way. The fob may contain a pool of possible numbers (in order to avoid generating the same number twice). The multitude of predetermined STN's 15 are matched to the conventional account numbers (e.g., PFI 20) and provided to the fob 102 using any method discussed above. As such the STN transaction system 18 may be able to match the PFI 20 number with the STN's 15 to complete a desired transaction request.

Another embodiment contemplates the use of the STN 15 with a transponder system comprising a first means (e.g., fob 102) for generating or storing a signal that includes an encoded STN 15 and a second means for reading or receiving the signal (e.g., reader 104). In an exemplary embodiment, a user 1 waves a small transponder unit in front of the merchant's 2 receiving unit. The STN 15 information can be sent/received by a number of known methods (e.g., optical, magnetic, infrared, radio frequency, etc.). The merchant 2 reader captures the STN 15 and forwards the STN 15 (with the associated transaction information) to the issuer's CAS 7 as previously described. The transponder units may be set up in a number of ways. Each transponder device may hold one STN 15 with certain predefined parameters or each transponder device may have several STNs 15.

Figure 18:
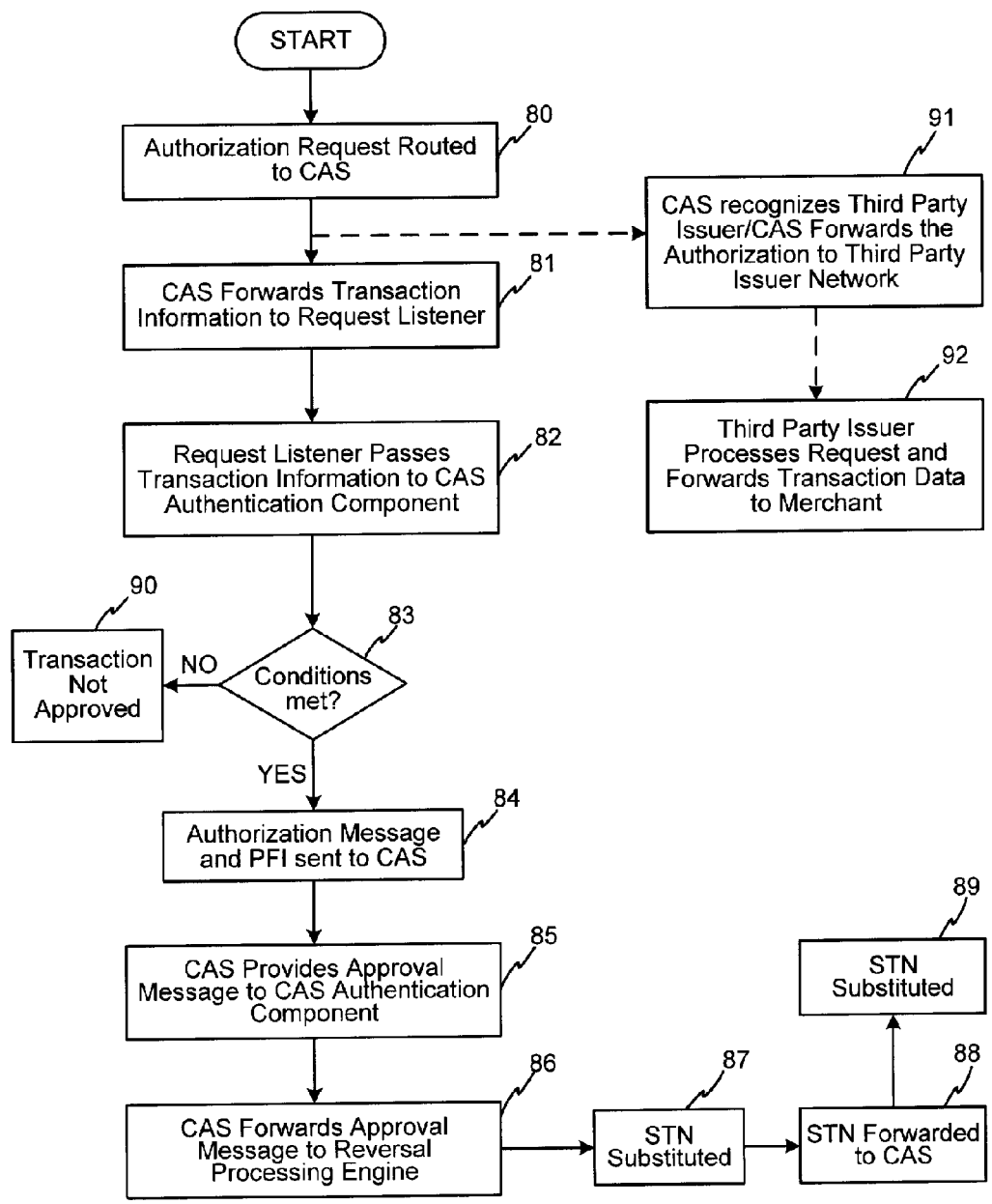
FIG. 18 is a flow diagram of an exemplary transaction authorization phase of the present invention.
Figure 19:
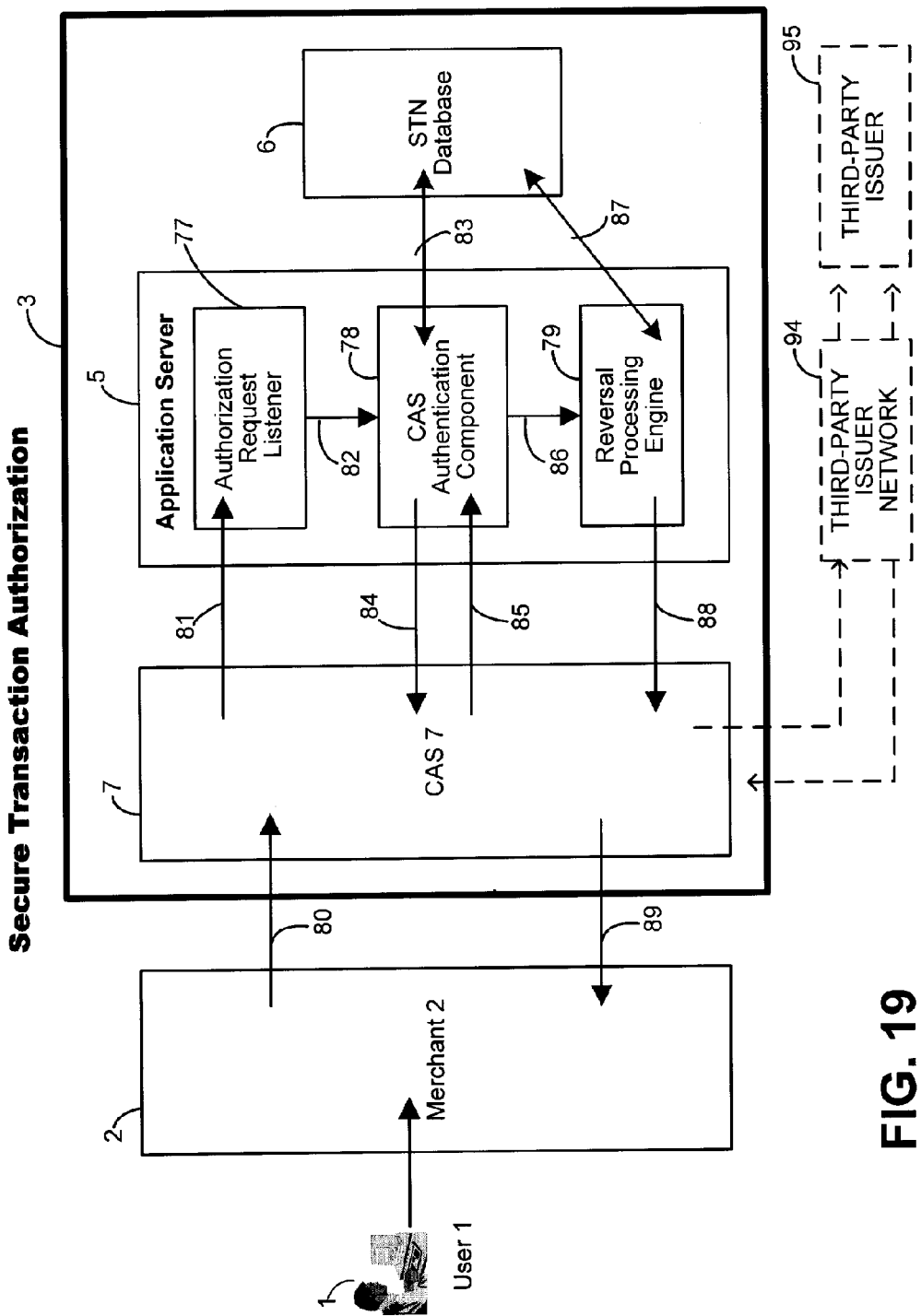
FIG. 19 is a system level flow diagram of an exemplary transaction authorization phase of the present invention.

Referencing FIGS. 18 and 19, after the secondary transaction number (STN 15) is provided to the merchant 2, the merchant 2 submits an authorization request to the issuer 3, as it would with any other credit card transaction. This request is routed to a card authorization system (CAS) 7 for authorization (step 80). The CAS 7 recognizes the transaction as involving a STN 15 and forwards the transaction information to the authorization request listener 77 program on the application server 5 (step 81). The STN 15 may include a unique STN 15 identifier or particular format which CAS 7 uses to identify the STN 15 or a secondary transaction number associated with PFI 20. The authorization request listener 77 passes the transaction information to a CAS authentication component 78 (step 82). The CAS authentication component 78 determines if use of the STN 15 has satisfied the previously defined conditions-of-use parameters. To determine this, the CAS authentication component 78 looks to the STN database 6 for the conditions-of-use rules and the primary charge card number (PFI 20) that are associated with the particular STN 15 (step 83). If the use of the STN 15 complies with the rules of use, the CAS authentication component 78 returns an authorization message and the associated PFI 20 to CAS 7 (step 84). CAS 7 then performs an authorization request for the PFI 20, as is typically done with any physical charge card, to ensure that any conditions associated with the PFI 20 (e.g., credit limit, expiration date, etc.) have been met.

If CAS 7 authorizes use of the PFI 20, the transaction involving the STN 15 is approved and an approval code will be generated. However, only the STN 15 is provided to the merchant 2 and the STN database 6 may ordinarily be updated to reflect this transaction data. This is accomplished by CAS 7 returning to the CAS authentication component 78 an approval message with the transaction data (step 85) and CAS authentication component 78 forwarding to a reversal processing engine 79 (step 86). The reversal processing engine 79 interfaces with the STN database 6 to re-substitute the STN 15 for the PFI 20 and also to update the STN database 6 to reflect the transaction information (step 87). For example, if the conditions of use parameters associated with the STN 15 authorized two transactions, this step 87 updates the user account in the STN database 6 to reflect that only one transaction remains. The reversal engine 79 substitutes the PFI 20 with the STN 15 and forwards to CAS 7 (step 88). CAS 7 then provides the results to the merchant 2 (step 89). If the CAS authentication component 78 does not authorize use under the STN 15 conditions or if CAS 7 does not authorize use under the PFI 20 conditions, the transaction will not be approved (step 90). When the use conditions of both the primary charge card and the secondary transaction numbers are satisfied, the transaction is approved. In this preferred embodiment, however, the STN 15 is not deactivated to prevent settlement. To the contrary, settlement may proceed (as discussed next) even when an authorization was declined.

Additionally, use of other third-party networks and systems are contemplated by the present system. One exemplary system allows a issuer 3 to associate STNs to third-party accounts by using a third-party identifier appended to or included in the STN 15. Here, in this exemplary system for authorizing STN 15, a merchant 2 submits an authorization request to an issuer 3. CAS 7, recognizes the STN 15 using the third-party identifier or STN identifier and forwards the request to application server 5. The conditions of use are checked and the authorization request is modified to substitute the STN 15 with the associated primary account (PFI 20). In some cases, the third-party identifier may be included in the authorization request. The authorization request is then provided to CAS 7 for a normal authorization. CAS 7 then recognizes the third-party identifier as originating from another issuer (third-party issuer 95), forwards the authorization request to a third-party issuer's network for processing (step 91). The network 94 routes the request to the appropriate third-party issuer 92 for an authorization determination. The third-party issuer 95 processes the authorization request and returns the result to CAS 7 for forwarding back to application server 5 (step 92). Application server 5 saves the authorization result (approval or denial) and provides the authorization result along with the STN 15 to CAS 7 for forwarding to the merchant 2.

The authorization and settlement processes may occur as separate steps or as a single step. In one embodiment, referred to herein as an electronic data capture (EDC) system, the merchant 2 sends an authorization request to an issuer 3 and if the authorization request is approved, a receipt of charges is created and submitted for the merchant 2. Separate sequences of file transmissions or messages are therefore not required. Various embodiments, hybrids, and modifications of these processes should be apparent to one skilled in this art.

Prior art systems typically deactivate a temporary transaction number during the authorization process if limited-use conditions are not met. As previously explained, because of the uncertainty and variability of the authorization processing, this often results in a transaction number being unintentionally deactivated, thereby bringing the transaction processing to a sudden halt. An exemplary embodiment of the present invention overcomes this problem by not "deactivating" the STN 15 when predetermined conditions are not met. But instead, allowing the transaction to proceed through settlement, albeit without a valid approval code, where the merchant 2 bears the risk that the amount will later be charged back by the issuer 3 if the transaction is disputed by the user 1.

An exemplary settlement process of this invention involves the back end systems shown in FIG. 10. Specifically, referencing FIGS. 9 and 10, the back end process utilizes a financial capture system (FINCAP) 10 to capture the settlement information (e.g., receipt of charges "ROC" and summary of charges "SOC") from the merchant 2, a back end application service 8 to ensure that proper account information is processed, an accounts payable system 9 to pay the merchant 2, and an accounts receivable system 11 to process the account statement that is provided to the user 1. An exemplary embodiment of the settlement process involves a settlement request being made by a merchant 2 for a transaction involving a STN 15. All settlement requests are forwarded to the issuer's back end system 14 for processing where the request is initially sent to FINCAP 10. FINCAP 10 captures the ROC and SOC data and identifies, via the card product identifier (or by any other suitable means), the transaction as involving a STN 15. In another embodiment, the product identifier (or BIN number) does not differentiate between a STN 15 and a regular charge card number. In that instance, it will be necessary for FINCAP 10 to call the back end application service 8 (which interfaces with the STN database 6) to identify the STN 15 from other charge numbers. After the STN 15 is distinguished from the ordinary physical charge cards, FIN-CAP 10 verifies that the number is valid (i.e., exists in the STN database 6). If the STN 15 is a valid number, FINCAP 10 creates a payment (accounts payable) file including the transaction data and sends a payment message to the AP system 9 instructing the merchant 2 to be paid. In paying the merchant 2, the issuer 3 references only the STN 15 and does not release the PFI 20 or any other regular charge card numbers.

The back end system 14 processes the user 1 STN account information as follows. After capturing the transaction information (ROC and SOC) from the merchant 2, FINCAP 10 creates a user account (accounts receivable) file and sends a message to the back end application service 8 to process the information for user billing. Recognizing that the transaction involves a STN 15, the back end application service 8 replaces the STN 15 with the PFI 20, updates the user STN account information in the STN database 6 to reflect the appropriate transaction settlement information, and processes the transaction as with any other transaction. The back end application service 8 sends the transaction details to the AR system 11, where the AR system 11 sends the proper statement to the user 1, typically referencing only the PFI 20 number. In another embodiment, the AR system 11 may process the statement where the transactions are further categorized and itemized by both the PFI 20 number and the STN 15.

As previously noted, it may often be the case with prior art systems, that the temporary transaction number is inadvertently deactivated during the authorization phase and completion of the transaction is not possible (e.g., multiple payment purchases). The present transaction system overcomes this problem by ensuring that valid transaction numbers will be processed. If the conditions-of-use parameters are not met, the user 1 is, under an exemplary embodiment of the present system, able to dispute the transaction and have the transaction charged back to the merchant 2 during the dispute handling process (discussed next). During this dispute handling phase, the issuer 3 will retrieve information from the STN database 6 to determine if the disputed information was "authorized" (i.e., has an associated approval code). If the transaction was not "authorized" because the conditions-of-use parameters were not satisfied, the amount will be charged back to the merchant 2 according to predefined business rules.

Another embodiment provides for checking the approval codes and other conditions during settlement. Here, transaction information (approval code, SE number, or other information) may be checked during settlement. For example, the back end application service 8 (or the application server 5) may compare transaction information to a business rule or conditions set associated with a user 1 STN 15 account. If conditions of use have not been met or if a valid approval code is missing, the back end application service 8 or the application server 5 may cause a charge back to be issued to the merchant 2 to offset the previous merchant payment. In other words, in this alternative embodiment, where an STN 15 transaction is processed through settlement, the following events may occur in sequence. First, a payment file is established once it is determined that the STN 15 is a valid number. Second, the merchant is paid. Third, the system applies the business rules or conditions for the particular account associated with the STN 15. Fourth, if it is determined that the merchant 2 should not have been paid in the first instance because the transaction conditions were not met or an approval code was not present, the system will execute a charge back to the merchant 2. This settlement processing may be transparent to the user 1 since, before the AR system 11 releases a user billing statement, merchant 2 is paid and then charged back resulting in no outstanding balance to the user 1.

Figure 20:
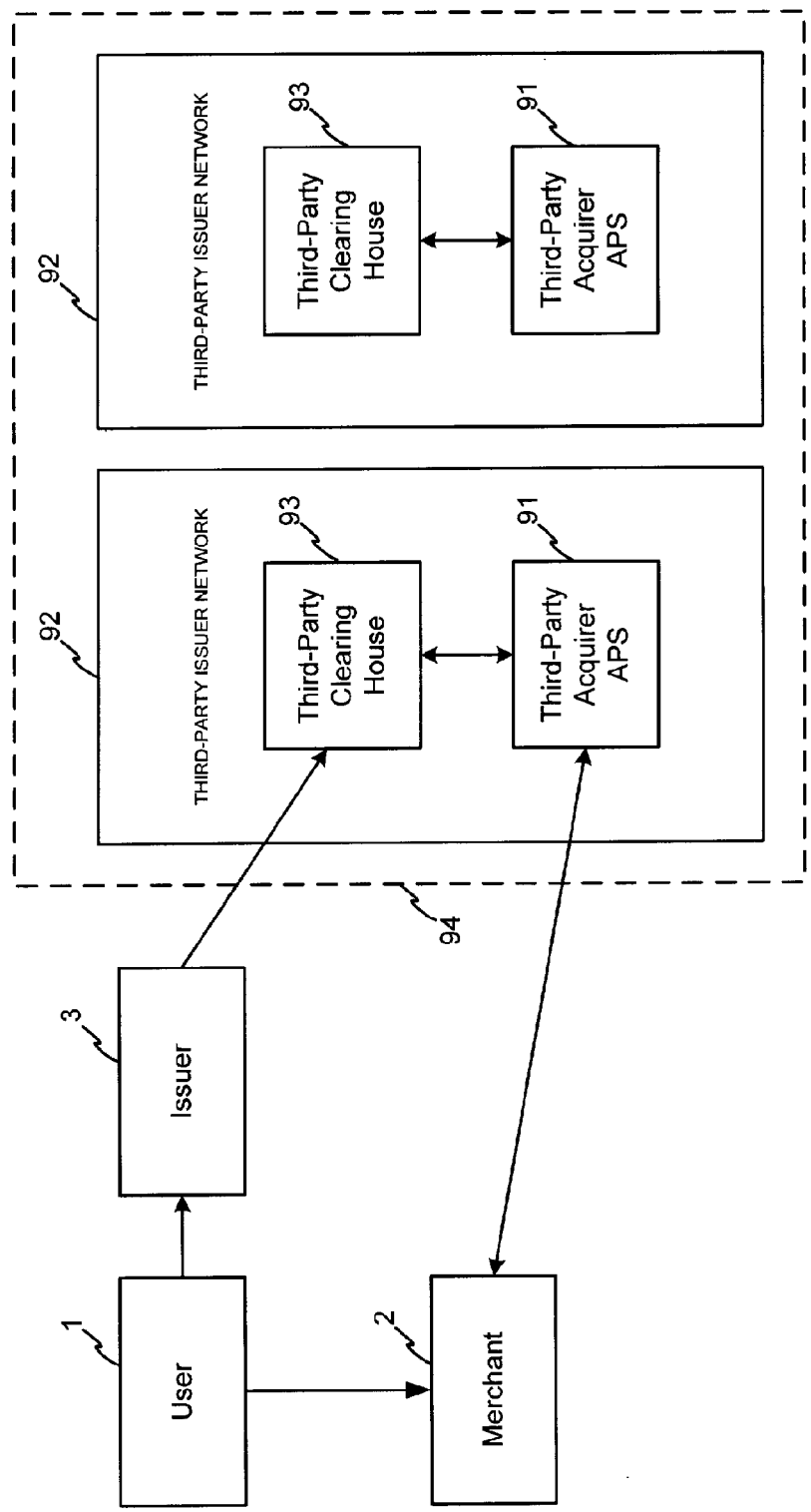
FIG. 20 is a system level flow diagram as an exemplary embodiment of the present invention depicting transaction completion using a third party payment network.

As shown in FIG. 20, the present invention contemplates the interaction of clearing and settlement systems other than those of the issuer 3. This exemplary system allows a issuer 3 to clear and settle STN transactions where an STN 15 is associated to a third-party account, meaning that the merchant 2 is paid and the charge is billed to the user 1. As such, an exemplary embodiment of the present invention is configured to support interaction with third-party networks and systems. Here, the back end application service 8, upon receiving a STN 15, recognizes that the associated PFI 20 originated with another transaction account issuer 92. The back end application service 8 separates the transaction into two transactions (a clearing transaction and a settlement transaction). A substitution occurs in the clearing transaction where the STN 15 is replaced by the associated PFI 20. Also, a translation may occur to substitute the issuer 3 merchant ID with the corresponding third-party card issuer ID. The transactions are then forwarded to a third-party clearing and settlement network 93. The third-party clearing and settlement network 93 handles the routing, as appropriate, to a merchant acquirer's accounts payable system 91 and an issuer's accounts receivable system 92. As noted above, the accounts payable system 91 ensures that all correspondence with the merchant 2 references the STN 15.

The dispute handling process of the present invention involves situations where a user 1 or merchant 2 disputes a charge that is associated with a transaction involving a STN 15. Generally, a user 1 disputes a charge by contacting the charge issuer 3 via phone, mail, or Internet. As previously noted, an exemplary AR system 11 typically bills the user 1 with reference to only the PFI 20 number. The computer systems of the present invention allow the issuer's customer service representatives to look up information based on, inter alia, the STN 15 or the PFI 20 number.

With respect to a user initiated dispute, the representative initiates a dispute through a dispute handling system (DHS) to obtain the case avoidance or case set rules for user disputed transactions. One of the case avoidance or case set rules provides for a look up from the STN database 6 to verify that the transaction was processed with an approval code. The rule set may provide for, inter alia, an automatic charge back of the transaction amount to the merchant if an STN 15 transaction is submitted without an approval code. The DHS or the representative initiates a user 1 or merchant 2 contact (via phone, mail, Internet). Disputes involving STNs 15 may be automatically routed to predefined STN queues based on industry type (i.e., airline, car rental, etc.). Contact letters may be automatically filled with information retrieved from the STN database 6. The adjustment file accesses the application server 5 (or back end application service 8) to substitute the PFI 20 number with the STN 15. A letter file is then generated and an electronic transmission system routes electronic contacts to and from various merchant interfaces.

In an exemplary system for handling disputes from merchant 2, a merchant 2 contacts the issuer 3 via normal channels. The issuer's representative generally accesses a customer service application that is used to service merchants. This customer service application identifies the account by a STN 15 in dispute. A case is set-up with the STN 15 and is managed via adjustment management systems. The adjustment management system and a letter generating system access the STN transaction system 18 for the account number swap, where the PFI 20 number is replaced with the STN 15 for financial adjustments intended for the user 1. The remaining inquiry is processed as with existing dispute handling systems.

Although the previously described embodiments generally relate to a user's 1 request for a STN 15, the merchant 2 may also find it desirable to request secondary transaction numbers from the issuer 3 in order to limit exposure to credit card fraud. In traditional transaction processes, upon completing a transaction, the merchant 2 stores transaction information (including the customer's credit card number) in a merchant database. This database of information is subject to credit card fraud in that a thief could hack into the merchant's computers to steal its customer's credit card numbers. To limit exposure, the merchant 2 may desire to replace those customer credit card numbers with STNs 15 that are associated with the user's primary credit card number (e.g., PFI 20), i.e., the merchant may not want its database filled with actual customer credit card numbers. In this situation, only the issuer 3 maintains the actual credit card number and the merchant 2 retains only the STN 15. In an exemplary process, the merchant receives a regular credit card number from a user 1 to facilitate a transaction. The merchant 2 submits the number to a issuer 3 for authorization, requesting that the issuer 3 instead of returning the regular credit card number, return a STN 15 (and approval code) that is associated with the regular credit card. In response, the issuer generates a STN 15, associates the number to the regular credit card number (which becomes the primary account (e.g., PFI 20)), checks to see if authorization is appropriate and returns the authorization record (only referencing the STN 15) to the merchant 2. The merchant 2 processes the transaction through the normal settlement channels, referencing the STN 15 instead of the regular credit card number. When retaining transaction records, the merchant 2 replaces the primary credit card number with the STN 15 and maintains the STN 15 in its database.

In another embodiment, the merchant 2 accepts only STNs 15—not regular credit card numbers—from users to complete transactions. For the same reasons stated above, the merchant 2 may desire to limit receipt of regular charge card numbers to limit exposure to credit card fraud. In one exemplary embodiment, the merchant 2 computer system differentiates between STNs and regular charge card numbers and will not allow customers to use regular charge card numbers to facilitate a transaction (i.e., will refuse the transaction). As previously described, however, the STN 15 and the regular charge card may be transparent to the merchant 2 making it difficult for the merchant 2 to differentiate between the STN 15 and the regular charge card. In this situation, in an exemplary embodiment, the STN 15 will be identified during the authorization process by the issuer 3, where if the STN 15 does not meet certain conditions defined by the merchant 2, the transaction will not be authorized. For example, the merchant could require that all customer transactions be completed with a STN 15 that has limited-use conditions restricting use to the amount of the transaction or restricting use to the particular merchant. During the authorization process, the STN 15 is compared with the merchant-defined conditions where if the conditions are not satisfied, the authorization request will be denied. After completion of the transaction, and upon satisfying the merchant 2 conditions, the STNs 15 have little to no value and would be of minimal value to a potential thief.

In one embodiment, the STN database 6 is used to facilitate the merging of a newly acquired user base with an established user base. For example, when a bank or other institution sells a user base to a issuer 3, the issuer 3 creates new physical accounts for the acquired users and does not issue new cards. The STN database 6 is updated to associate the acquired user account numbers to the newly created accounts. This allows the users' existing physical cards to still be used and processed appropriately. The issuer (BIN) routing is modified for the acquired accounts so authorization requests and settlements are sent to the issuer 3 instead of to the bank or other institution. CAS 7 and FINCAP 10 recognize these acquired accounts as STN 15 accounts and translate the numbers appropriately. The end result is that charges made by the acquired users end up on a statement generated by the issuer 3.

In another exemplary embodiment of the transaction system, a issuer 3 may provide a line of credit to a customer or to a merchant 2 or group of merchants who can private label for use by their customers. This allows the merchant 2 to provide a branded line of credit with minimal or no changes to the credit card authorization and settlement process. In one embodiment, the merchant 2 approves a line of credit or asks the issuer 3 to approve a line of credit for the customer. The issuer would then issue a STN 15 to the customer via the merchant 2. This STN 15 is generally used with the merchants 2 who are issuing the line of credit. When the customer wants to make a purchase using the merchant's line of credit, the merchant forwards a standard credit request to the issuer 3 with the STN 15 used as the credit card number in the transaction protocol. The issuer 3 verifies that the line of credit is authorized and was submitted by the merchant 2 issuing the line of credit associated with this STN 15. The issuer transaction system (via the STN transaction system 18) is capable of denying usage of this line of credit at another non-participating site. The issuer 3 may provide a private label or co-branded web, site to apply for the line of credit. The issuer's 3 back end system 14 then bills the customer and pays the merchant 2. The merchant 2 may keep the electronic line of credit privately at its site, or provide it to the customer. The authorization system would not authorize usage at other sites.

Figure 21:
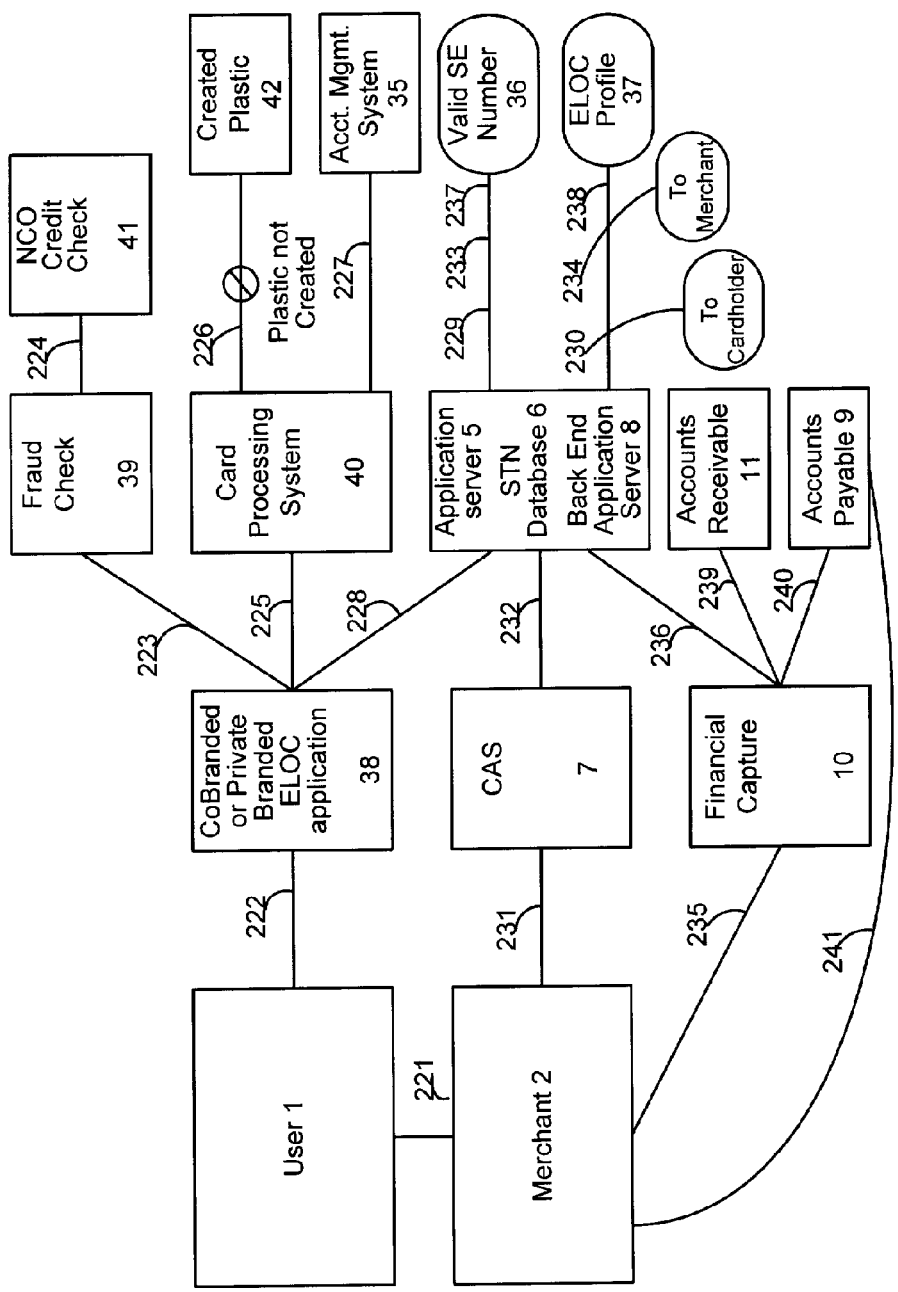
FIG. 21 is a flow diagram depicting an exemplary embodiment of the present invention involving an electronic line of credit system.

FIG. 21 depicts an exemplary transaction process for use in providing lines of credit to merchants 2. A user 1 or customer (who may or may not be an existing card member of the participating issuer 3) applies for an electronic line of credit (ELOC) with a merchant 2 (step 221), the merchant 2 redirects the user 1 to the issuer's 3 website to fill out the ELOC application 38 (step 222). A fraud check 39 is performed (step 223) and a credit inquiry is typically performed by any credit bureau company 41 (step 224). If a transaction account processing system 40 determines that the user's credit is acceptable, a transaction account is set up (step 225). A physical card 42 is not generated as with typical processes and may need to be purged depending on the particular system set-up (step 226). The account is sent to the account management system 35 (step 227) and then forwarded to the STN database 6 and the application server 5 (step 228). The user 1 account is then related to a valid merchant identification number such as the SE number 36 (step 229). An account is then set-up with a ELOC profile 37 and at this point the secondary transaction ELOC number is passed back to the user 1 (step 230). The merchant 2 submits the ELOC payment request to CAS 7 (step 231), and CAS 7 routes the ELOC to the STN system (step 232), where the STN system verifies that the SE number is approved for this particular ELOC (step 233). The STN system translates the ELOC STN to the related account in the account management system and returns the ELOC STN to merchant 2 (step 234). The merchant 2 is then required to submit the authorization code with the receipt of charges (ROC) and summary of charges (SOC). The merchant 2 submits the ROC and/or SOC to the issuer's FINCAP 10 (step 235), whereupon FINCAP forwards the ELOC to the STN system (step 236). The STN system verifies that (i) this SE number is valid for the particular ELOC account (step 237) and (ii) the particular transaction was authorized for the specific ELOC account (step 238). The STN system then flips the card number, returns it to FINCAP 10, whereupon, the number is forwarded to the issuer's accounts receivable system 11 (step 239). FINCAP 10 forwards the ELOC STN and associated information to the accounts payable system 9 (step 240) and pays the merchant 2 (step 241).

Another exemplary embodiment allows a user to fund an online digital wallet with the secondary transaction number. In this embodiment, after generation and association with the primary charge card, the secondary transaction number is provided to the user to use within a designated digital wallet, which may reside locally at the user's computer or may be stored in an online password protected account.

In yet another alternative embodiment, the system may be used to facilitate programs involving non-currency tender, such as the American Express® Membership Rewards as Currency™ system that is detailed in U.S. Provisional Application No. 60/200,492, filed on Apr. 28, 2000, and U.S. Provisional Application No. 60/201,114, filed on May 2, 2000, which are hereby incorporated by reference. One embodiment of this system, depicted in FIG. 22, allows a user 1 to create a STN 15 to be used to spend membership rewards points. In general, a membership or incentive rewards program is a loyalty program that rewards users for using their charge card to make purchases. Users accumulate points by using a participating charge card or by purchasing products at a participating merchant. These points may then be converted to a monetary value and redeemed to purchase merchandise.

Figure 22:
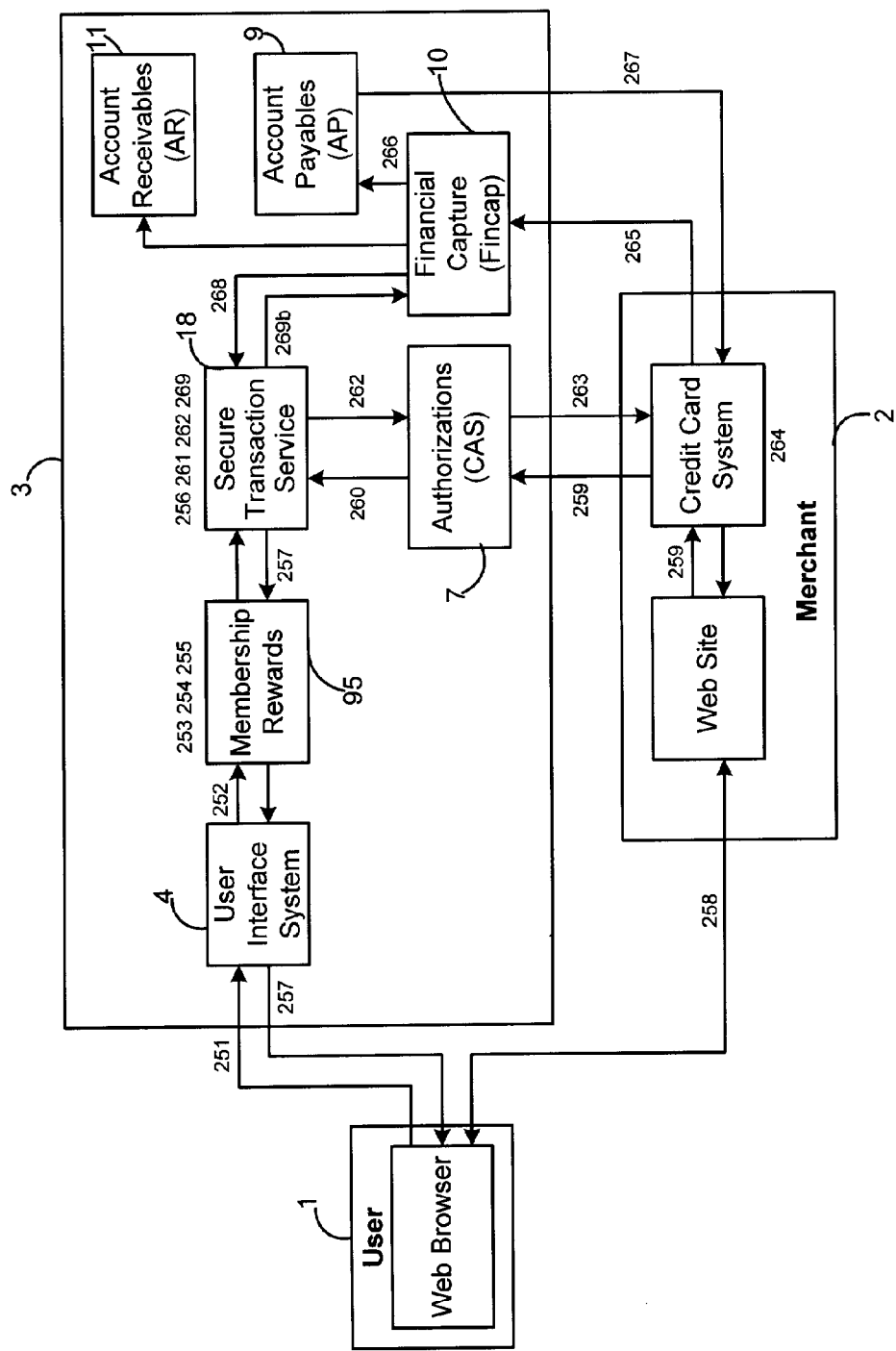
FIG. 22 is a flow diagram depicting one embodiment of an exemplary transaction system of the present invention used to facilitate a non-currency based membership rewards program.

As depicted in FIG. 22, a user 1 accesses and logs onto the issuer's 3 services via a user interface system 4 (e.g., an Internet connection) (step 251). The user 1 proceeds (clicks on hyperlink) to the membership rewards (MR) system 95, where she indicates that she would like to use her membership reward points that are available in her MR account (step 252). The MR system 95 reports to the user 1 how much the available MR points are worth (step 253). The user 1 indicates how many of the MR points (converted to monetary value) should be loaded info an account that can be used for purchases (step 254). In an exemplary embodiment, the STN 15 can be associated with a MR account (i.e., a primary charge card account that is funded with these MR points). Use of this MR account may be limited by the user 1 or the issuer 3, or could be further limited by the MR system rules of use that may have been predefined by participating merchants (step 255). Once the MR system 95 has approved the request and allocated the requested MR points, the STN system 18 associates a STN 15 and establishes an MR-STN 15 profile (step 256). The MR-STN profile contains the options that will be applied and the amount that will be available to the resulting STN 15. The STN system 18 returns the STN 15 (and other account information) to the MR system 95 to provide to the user 1 for use in completing subsequent transactions (e.g., online purchases) (step 257).

When desiring to purchase products using the MR point-funded STN 15, the user 1 proceeds to a merchant 2 site (e.g., online website), selects goods and is requested by the merchant 2 to provide payment information (e.g., via an online payment web page). The user 1 chooses the appropriate issuer 3 as the form of payment (e.g., American Express®, Visa®, etc.) and enters the STN 15 (and other needed information) into the appropriate payment fields (step 258). The merchant 2 processes the STN 15 authorization as discussed above (step 259), where the issuer CAS 7 recognizes the transaction as involving a STN 15, and forwards the request to the STN system 18 containing, inter alia, an application server (FIG. 10, number 5) and a STN database (FIG. 10, number 6). It should be appreciated that profile information may be stored in a MR database, STN database 6 or any other suitable database (step 260). The STN system 18 recognizes the account as a MR account, and verifies that optional conditions, if any, are met. If the conditions are not met, an error is returned to CAS 7 and then to the merchant 2 (step 261). If the conditions are met, the balance available on the MR-STN profile is reduced by the purchase amount, a record of the purchase is recorded in the MR-STN profile, and an approval code is returned to the authorization system (step 262) and then to the merchant 2 (step 263). Although additional CAS 7 processing is contemplated by this embodiment, application of additional rules and validations—which would typically be applied—are not required for this type of account. The approved purchase is finalized by the merchant 2 with the STN 15 transaction being submitted through the merchant's 2 existing POS network for settlement (step 264). The STN 15 transaction is received by the issuer's 3 financial capture system (FINCAP) 10 (step 265). The FINCAP 10 forwards the STN transaction to the appropriate AP system 9 (step 266). The AP system 9 then pays the merchant 2 according to the appropriate settlement terms and conditions (step 267). The FINCAP 10, having identified the transaction as involving an STN 15, sends the transaction information to the STN system 18 (via a back end application service 8) to identify the actual account number (i.e. PFI 20) (step 268). The STN system 18 recognizes that the STN 15 is associated with a MR account, searches for the MR-STN profile and passes a credit request to the appropriate user 1 MR account to reduce the available MR points (step 269), and (ii) the transaction record is used to build a credit against the actual charge card account (e.g., PFI 20) that will offset the charged STN 15 transaction (step 269b). In the first instance (step 269), the STN system 18 passes a request to the MR system 95 to deduct the appropriate number of MR points. In the second instance (step 269b), both the original transaction and the credit are passed back to FINCAP 10 with the actual charge card account number (e.g., PFI 20 number). The FINCAP 10 then forwards the charge and credit transactions to the appropriate AR system 11 for normal billing processing.

As shown, the embodiment depicted in FIG. 22 allows the user 1 to spend the MR points in at least two ways. First, the membership reward points can be deducted at the time of the transaction processing, or second, the transaction can be reflected on the user's bill along with an associated credit that reflects the payment with reward points. It should also be appreciated that a user 1 may choose to use MR points on a transaction by transaction basis, and preferably, is able to combine variations of currency (e.g., credit, debit cards etc.) and non-currency tender (MR points), as desired, to effectuate a transaction. Additionally, both currency and non-currency tender may be integrated into a STN gift, where a first party gifts to a second party a secondary transaction number that has some currency or non-currency value.

Figure 23:
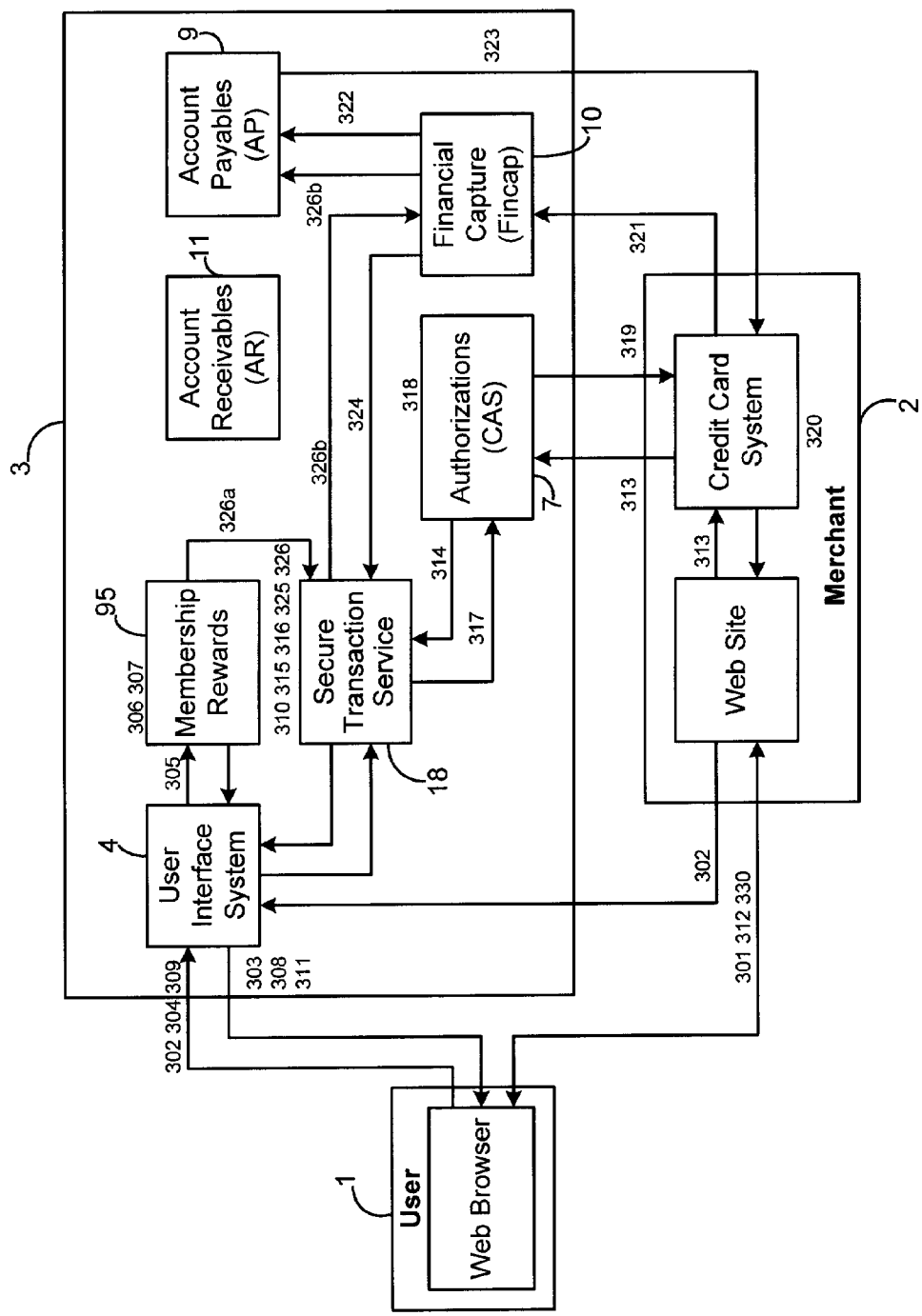
FIG. 23 is a flow diagram depicting a second embodiment of an exemplary transaction system of the present invention used to facilitate a membership rewards program.

Another membership rewards embodiment is shown in FIG. 23. Here, the user 1 is able to choose to use membership reward points when shopping at a merchant 2 site that supports the membership rewards as a payment option. Referencing FIG. 23, the user 1 goes to a participating merchant's 2 site (e.g., online website) to shop for goods or services. The user 1 selects merchandise and continues to a payment site, where the issuer's 3 MR points is one of the payment options (step 301). When the user 1 selects this option, a secure connection is established with the issuer 3 that authenticates both the user 1 and the merchant 2 (step 302). The issuer 3 requests the user's 1 user ID and password, either through a pop-up screen, a http redirect link, or an applet downloaded by the merchant 2 (step 303). The user 1 supplies the user ID and password which is returned to the issuer 3 with the purchase amount (step 304). The issuer user interface 4 (e.g., online services) causes the user 1 to be authenticated, collects the associated registered card accounts and invokes the MR system 95 (step 305). The MR system 95 uses these card accounts to identify the user's 1 MR account (step 306). If none of the registered accounts are related to a MR account, the user 1 is not able to use MR points to pay for her purchase and an error is returned to the user 1. After identifying the MR account, the MR points available are converted to the corresponding cash equivalent and compared to the purchase amount being requested. If the purchase amount is greater than the MR cash equivalent, an error is returned to the user 1 (step 307). If the MR cash equivalent is greater than the purchase amount, all card accounts participating in the MR account are collected and returned to the user 1 (step 308). The user 1 designates the card account to be used to house all succeeding financial activity, which is then returned to the issuer 3 (step 309). The issuer 3 then triggers the STN system 18 to establish a STN 15 that is associated to the selected MR account number and a MR-STN account profile is set up (step 310). The STN system 18 returns the STN 15 to the user interface system 4 and then on to the user 1 (step 311). The user 1 cuts and pastes, drags and drops, or auto-fills the STN 15 (and needed information) into the appropriate merchant payment field (step 312).

As previously noted, the merchant 2 uses the existing authorization network to request authorization for the STN transaction (step 313). The CAS 7 recognizes the transaction as one involving a STN 15 and forwards to the STN system 18 (step 314). The STN system 18 identifies the associated actual account number (e.g., PFI 20 number) for the STN 15 (step 315) and also recognizes the account as a MR account. At this point, although all MR transactions would have been previously verified, the MR account balance is again checked to minimize possible fraud (e.g., fraud involving two requests using the same MR points). The cash equivalent for the MR points for the actual account are then retrieved from the MR system 95 and if the purchase amount is greater than the available amount, a denial is returned to the authorization system and to the merchant 2 (step 316). If the cash equivalent value of the MR points exceeds the purchase amount, the STN system records the purchase in the MR-STN profile and returns the STN 15 to the CAS 7 (step 317). The CAS 7 then completes the authorization for the actual account (e.g., ensuring that the limits for the PFI 20 are complied with) (step 318), and returns the results (e.g., approval code) to the merchant 2 (step 319).

The approved transaction is finalized by the merchant 2 with the STN transaction being submitted through the existing point-of-sale network for settlement (step 320). As before, the transaction information is received by the issuer FINCAP 10 (step 321) and then forwarded to the appropriate AP system 9 (step 322) for payment (step 323). Since the transaction involves a STN 15, FINCAP 10 directs the transaction to the STN system 18 to identify the PFI 20 (step 324). The STN system 18 identifies the PFI 20 (step 325) and also recognizes the STN 15 account is set up using MR points, where the STN system 18 searches the MR-STN profile for the associated purchase record (step 326). The STN system either (i) passes a credit request to MR to reduce the MR points (step 326*a*), or (ii) creates a credit against the billing transaction (step 326*b*). In step 326*a*, the STN system 18 passes a request to the MR system 95 to deduct the appropriate number of MR points. Here it is not necessary to return the AR transaction information to FINCAP 10 for forwarding to the AR system 11, but a reconciliation entry is created to reconcile the AR for FINCAP 10. In step 326*b*, a transaction record is used to build a credit against a real account number (e.g., PFI 20) that will offset the charge transaction. The STN system 18 forwards this credit to the FINCAP 10. The original billing transaction is returned to the FINCAP 10 to appear on the user's 1 statement. The FINCAP 10 then forwards the charge transaction to the appropriate AR system 11 for normal processing. The FINCAP 10 forwards the credit issued by the MR system 95 to the appropriate AR system 11 for normal billing processing. Accordingly, the user 1 will see on her statement a credit reflecting the currency value of the MR points used and a charge in the amount of the transaction.

Another embodiment provides for the generation of one or more STNs 15 that are subordinate to and associated with a main secondary transaction number that, as described above, is associated with the user's PFI 20 account. As noted above, these subordinate numbers may also be digitally stored in devices such as wireless telephones, PDAs, handheld computers, writeable fobs, and the like. Providing multiple layers of secondary transaction numbers provides the user 1 with greater flexibility. For example, a user on vacation could structure the main STN 15 to be valid for the duration of the vacation. The user 1 is then able to generate subordinate secondary transaction numbers (or tertiary numbers) with varying preferences to take into account various activities that may occur during the vacation. A user 1 could structure the main secondary transaction number to have a maximum credit limit of $3,000 (this assumes that the associated primary charge card credit limit is equal to or greater than $3,000) that is good for the duration of the vacation. A subordinate secondary transaction number may then be provided to the spouse with a $1,000 limit and additional secondary transaction numbers, restricted to $500 limits, could be provided to the children. Each subordinate card would be valid only for the duration of the vacation and would only be valid for the maximum dollar amount specified.

What is claimed is:

1. A method, comprising:
    generating, by an issuer computer, a secondary transaction code (STC), wherein the generating the STC comprises:
        generating a random number,
        determining whether the random number is available for use, and
        in response to a determination that the random number is available for use, appending a product identifier number to the available random number such that the STC has a format equivalent to a transaction account code format;
    associating, by the issuer computer, the STC to a transaction account code;
    issuing, by the issuer computer, a transaction account associated with the STC and an available account balance;
    assigning, by the issuer computer, the STC to an RF transaction device;
    submitting an RF transaction authorization request from a merchant computer to the issuer computer, wherein the RF transaction authorization request includes a request that the issuer computer return to the merchant computer the STC associated with the transaction account code;
    receiving, by the merchant computer, an authorization record from the issuer computer in response to the RF transaction authorization request, wherein the authorization record includes the STC; and storing a transaction record of the RF transaction in a merchant database, wherein the transaction record includes the STC.

2. The method of claim 1, further comprising submitting a processing request from the merchant computer to a transaction processing entity, wherein the processing request includes the STC.

3. The method of claim 1, wherein the merchant computer does not maintain a copy of the transaction account code in response to the receiving the authorization record that includes the STC.

4. The method of claim 2, wherein the transaction processing entity receives the STC to facilitate a settlement of the RF transaction against the available account balance.

5. The method of claim 1, further comprising associating conditions-of-use parameters with the STC at the merchant computer, wherein the conditions-of-use parameters place limits on how the STC may be used.

6. The method of claim 5, further comprising receiving the conditions-of-use parameters from an account holder during the RF transaction.

7. The method of claim 5, wherein the conditions-of-use parameters comprise at least one of an STC credit limit, an expiration date, a per purchase spending limit, a time of day use, a geographic location, a time of week use, or a specified merchant requirement.

8. The method of claim 1, wherein the RF transaction device and the RF reader mutually authenticate to initiate the RF transaction.

9. A system, comprising:
an issuer computer comprising a processor and memory communicatively coupled to the processor storing instructions that in response to being executed, cause the processor of the issuer computer to perform operations comprising:
generating a secondary transaction code (STC), wherein the generating the STC comprises:
generating a random number,
determining whether the random number is available for use, and
in response to a determination that the random number is available for use, appending a product identifier number to the available random number such that the STC has a format equivalent to a transaction account code format;
associating the STC to a transaction account code,
issuing a transaction account associated with the STC and an available account balance, and
assigning the STC to an RF transaction device;
a merchant computer comprising a processor and memory communicatively coupled to the processor storing instructions that in response to being executed, cause the processor of the merchant computer to perform operations comprising:
communicating an RF transaction authorization request to the issuer computer, wherein the RF transaction authorization request includes a request that the issuer computer return to the merchant computer the STC associated with the transaction account code,
receiving an authorization record from the issuer computer in response to the RF transaction authorization request, wherein the authorization record includes the STC, and
storing a transaction record of the RF transaction, wherein the transaction record includes the STC.

10. A non-transitory computer-readable medium having stored thereon computer-executable instructions that, in response to execution by one or more computing devices, cause the one or more computing devices to perform operations comprising:
generating, by an issuer computer, a secondary transaction code (STC), wherein the generating the STC comprises:
generating a random number,
determining whether the random number is available for use, and in response to a determination that the random number is available for use, appending a product identifier number to the available random number such that the STC has a format equivalent to a transaction account code format;
associating, by the issuer computer, the STC to a transaction account code;
issuing, by a the issuer computer, a transaction account associated with the STC and an available account balance;
assigning, by the issuer computer, the STC to an RF transaction device;
submitting an RF transaction authorization request from a merchant computer to the issuer computer, wherein the RF transaction authorization request includes a request that the issuer computer return to the merchant computer the STC associated with the transaction account code;
receiving, by the merchant computer, an authorization record from the issuer computer in response to the RF transaction authorization request, wherein the authorization record includes the STC; and
storing a transaction record of the RF transaction in a merchant database, wherein the transaction record includes the STC.

11. A method, comprising:
generating, by an issuer computer, a secondary transaction code (STC), wherein the generating the STC comprises:
generating a random number,
determining whether the random number is available for use, and
in response to a determination that the random number is available for use, appending a product identifier number to the available random number such that the STC has a format equivalent to a transaction account code format;
associating, by the issuer computer, the STC to a transaction account code;
receiving, by the issuer computer, a radio frequency (RF) transaction authorization request from a merchant computer, wherein the RF transaction authorization request includes a request that the issuer computer return to the merchant computer the STC associated with a transaction account code assigned to an RF transaction device by the issuer computer;
issuing, by the issuer computer, a transaction account associated with the STC and with an available account balance;
transmitting an authorization record from the issuer computer to the merchant computer in response to the issuer computer authorizing the RF transaction, wherein the authorization record includes the STC;
submitting the RF transaction for processing in response to the transmitting the authorization record from the issuer computer to the merchant computer; and
storing a transaction record of the RF transaction in a merchant database, wherein the transaction record includes the STC.

12. The method of claim 11, wherein the issuer computer decides conditions-of-use parameters associated with the STC.

13. The method of claim 11, further comprising receiving conditions-of-use parameters from an account holder associated with the RF transaction device.

14. The method of claim 11, further comprising billing an RF transaction amount against the available account balance associated with the STC.

15. The method of claim 14, wherein the available account balance includes at least one of a monetary value, a credit value, a loyalty points value, or a reward points value.

* * * * *